US012719143B2

(12) United States Patent
Morishita et al.

(10) Patent No.: US 12,719,143 B2
(45) Date of Patent: Aug. 25, 2026

(54) WAVEGUIDE

(71) Applicant: Panasonic Intellectual Property Management Co., Ltd., Osaka (JP)

(72) Inventors: Yohei Morishita, Kanagawa (JP); Ken Takahashi, Ishikawa (JP); Tomohiro Murata, Kanagawa (JP); Ushio Sangawa, Nara (JP); Koji Takinami, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 75 days.

(21) Appl. No.: 18/727,606

(22) PCT Filed: Dec. 28, 2022

(86) PCT No.: PCT/JP2022/048553
§ 371 (c)(1),
(2) Date: Jul. 9, 2024

(87) PCT Pub. No.: WO2023/140090
PCT Pub. Date: Jul. 27, 2023

(65) Prior Publication Data
US 2025/0167417 A1 May 22, 2025

(30) Foreign Application Priority Data
Jan. 20, 2022 (JP) ................................ 2022-007114

(51) Int. Cl.
*H01P 3/12* (2006.01)

(52) U.S. Cl.
CPC .................................... *H01P 3/121* (2013.01)

(58) Field of Classification Search
CPC . H01P 3/121; H01P 3/12; H01P 11/00; H01L 21/3205; H01L 21/768; H01L 23/522
See application file for complete search history.

(56) References Cited

U.S. PATENT DOCUMENTS 7,994,881 B2 * 8/2011 Suzuki .................... H01P 3/121 333/254
8,058,953 B2 * 11/2011 Cho ........................ H01P 3/003 257/664

(Continued)

FOREIGN PATENT DOCUMENTS

FR 2885735 A1 * 11/2006 .............. H01P 3/084
JP H10303607 A 11/1998

(Continued)

OTHER PUBLICATIONS

International Search Report, mailed Mar. 28, 2013, for International Application No. PCT/JP2022/048553, 5 pages. (With English Translation).

*Primary Examiner* — Andrea Lindgren Baltzell
*Assistant Examiner* — Kimberly E Glenn
(74) *Attorney, Agent, or Firm* — Seed Intellectual Property Law Group LLP

(57) ABSTRACT

This waveguide comprises: three or more conductor layers that are stacked; two or more dielectric layers that are stacked, each being formed between two conductor layers adjacent to each other among the three or more conductor layers; and a first via group and a second via group each including one or more vias disposed in at least one dielectric layer among the two or more dielectric layers. The first via group and the second via group are arrayed in parallel. Among the vias included in the first via group and the second via group, the vias disposed in at least one of the two or more dielectric layers differ in position on the plane of the dielectric layer from the vias disposed in the remaining dielectric layer.

8 Claims, 38 Drawing Sheets

(56) References Cited

U.S. PATENT DOCUMENTS

| | | | | |
|---|---|---|---|---|
| 2008/0150821 | A1 | 6/2008 | Koch et al. | |
| 2016/0197391 | A1* | 7/2016 | Li | H01P 3/026 29/600 |
| 2022/0209385 | A1* | 6/2022 | Lim | H01P 3/082 |
| 2024/0380089 | A1* | 11/2024 | Takahashi | H01P 1/02 |
| 2025/0167096 | A1* | 5/2025 | Tsukahara | H01L 23/49822 |

FOREIGN PATENT DOCUMENTS

| | | | | |
|---|---|---|---|---|
| JP | 2008-193663 | A | | 8/2008 |
| JP | 7672818 | B2 | * | 5/2025 |
| KR | 2025151930 | A | * | 10/2025 |

* cited by examiner

EMBODIMENT 1: Land

EMBODIMENT 2: Line

EMBODIMENT 3: Stub

FULL-STACK (FIG. 2, REFERENCE): Full-stack

EMBODIMENT 4: Land-2
EMBODIMENT 5: Line-2
EMBODIMENT 6: Stub-2
FULL-STACK, ONE ROW (FIG. 2, REFERENCE): Full-stack-1

EMBODIMENT 7: Land
EMBODIMENT 8: Line
EMBODIMENT 9: Stub
FULL-STACK, ONE ROW (FIG. 2, REFERENCE): Full-stack

WAVEGUIDE

TECHNICAL FIELD

The present disclosure relates to a waveguide.

BACKGROUND ART

As a method of constituting a waveguide in a dielectric substrate, there is an example in which conductors are provided on and under a dielectric and a large number of vias for electrically connecting these conductors are provided to constitute a waveguide. Such a waveguide is sometimes called a post-wall waveguide, a substrate integrated waveguide (SIW), or the like. While the basic configuration of these waveguides uses a single-layer dielectric substrate, there is also an example in which a multilayer dielectric substrate is used and a waveguide is formed on the multilayer dielectric substrate (see Patent Literature 1, for example).

In the configuration in which the post-wall waveguide is formed in the multilayer dielectric substrate according to the existing technique, posts of a plurality of layers are formed at the same position when viewed in an axial direction perpendicular to the substrate. When a through hole is used as the post, the through hole penetrates all layers of the multilayer substrate, it is difficult to form other circuits in upper and lower layers of the post-wall waveguide, and the advantage of forming dielectric layers also on and under the post-wall waveguide is lost.

When the posts are formed using laser vias, it is considered that post-wall waveguide 20 illustrated in FIG. 2A to FIG. 2D is constituted using stack vias illustrated in FIG. 1A and having a configuration in which a via is stacked directly on a via. Hereinafter, vias stacked directly on one another in all layers may be referred to as full-stack vias, and a post-wall waveguide using the full-stack vias may be referred to as a post-wall waveguide having a full-stack configuration, a full-stack post-wall waveguide, or the like. However, the shape of the vias is not limited to the shapes illustrated in FIG. 1A and FIG. 1B, and the vias are described as having a cylindrical shape in the explanation of the post-wall waveguide in the present description.

FIG. 2A is a perspective view of post-wall waveguide 20 having a full-stack configuration including two sets (two rows) of vias parallel to the Y-axis. FIG. 2B is a cross-sectional view of a23-a24 plane of post-wall waveguide 20 having the full-stack configuration as viewed in the Y-axis direction. FIG. 2C provides a sectional view of c21-c22 plane, a sectional view of c23-c24 plane, and a sectional view of c25-c26 plane of post-wall waveguide 20 having the full-stack configuration as viewed in the Z-axis direction (vertical direction, stacking direction). FIG. 2D is a partial sectional view of a21-a22 plane of post-wall waveguide 20 having the full-stack configuration as viewed in the X-axis direction.

For example, as illustrated in FIG. 2D, post-wall waveguide 20 having the full-stack configuration includes dielectric layers 2-1-1 to 2-1-4 that are stacked in four layers, conductor layers 2-2-1 to 2-2-5 that are stacked in five layers, and two sets of vias 2-3-1-*k* to 2-3-4-*k* (k is any integer satisfying 1≤k≤N (N is an integer of 2 or more); in the example illustrated in FIG. 2A to FIG. 2D, N=14). Vias 2-3-1-1 to 2-3-1-N are disposed at equal intervals in a plane perpendicular to the Z-axis, and the same applies to vias 2-3-2-1 to 2-3-2-N, vias 2-3-3-1 to 2-3-3-N, and vias 2-3-4-1 to 2-3-4-N. Each dielectric layer is formed between two conductor layers adjacent to each other in the Z-axis direction. However, each dielectric layer is in contact with a dielectric layer adjacent thereto when there is no conductor in the conductor layer. Note that one set of the two sets of vias 2-3-1-*k* to 2-3-4-*k* (k is any integer satisfying 1≤k≤N (N is an integer of 2 or more) corresponds to via group A illustrated in FIG. 2C, and the other set corresponds to via group B illustrated in FIG. 2C, which are via groups in a21-a22 plane illustrated in FIG. 2D.

As illustrated in FIG. 2C and FIG. 2D, waveguide 20 is constituted of lowermost conductor layer 2-2-1 and uppermost conductor layer 2-2-5 in a central portion, and via group A and via group B. As illustrated in FIG. 2C, when high-frequency electromagnetic waves are input from IO1, the electromagnetic waves propagate in a region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1.

CITATION LIST

Patent Literature

PTL 1

Japanese Patent Application Laid-Open No. 2008-193663

SUMMARY OF INVENTION

However, full-stacking of vias (stacking of vias directly on one another in all layers) involves a risk of breakage due to thermal expansion, and may result in a decrease in reliability and a deterioration in yield during waveguide manufacturing.

Non-limiting embodiments of the present disclosure facilitate providing a waveguide capable of reducing the risk of breakage due to thermal expansion caused by full-stacking of vias and suppressing a decrease in reliability and a deterioration in yield during manufacturing.

A waveguide according to one example of the present disclosure includes: three or more conductor layers that are stacked; two or more dielectric layers that are stacked, each being formed between adjacent two of the three or more conductor layers; and a first via group and a second via group each including one or more vias disposed in at least one of the two or more dielectric layers, in which: the first via group and the second via group are arrayed in parallel to each other, and among the vias included in the first via group and the second via group, a via disposed in at least one of the two or more dielectric layers differs in position on a plane of the dielectric layer from a via disposed in remaining one or more of the two or more dielectric layers.

According to one embodiment of the present disclosure, the vias constituting the waveguide overlap in not all of the dielectric layers constituting the waveguide when viewed in the stacking direction. Thus, since the vias are not fully stacked, it is possible to reduce the risk of breakage due to thermal expansion caused by full-stacking of the vias and to suppress a decrease in reliability and a deterioration in yield.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with appropriate reference to the drawings. However, any unnecessarily detailed description may be omitted. For example, detailed descriptions of already well-known matters and repeated descriptions for substantially the same configuration may be omitted. This is to avoid the unnecessary redundancy of the following description and to facilitate understanding of those skilled in the art.

Note that, the accompanying drawings and the following description are provided so that a person skilled in the art understands the present disclosure sufficiently, and are not intended to limit the subject matters recited in the claims.

Embodiment 1

Figure 1A:
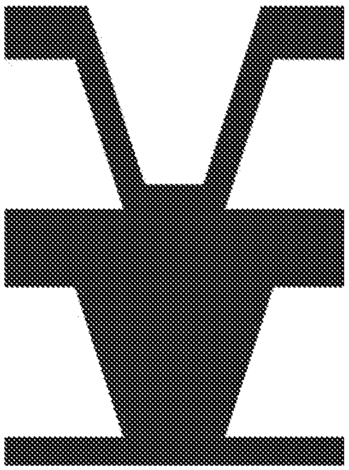
FIG. 1A is a view illustrating a configuration of stack vias.
Figure 1B:
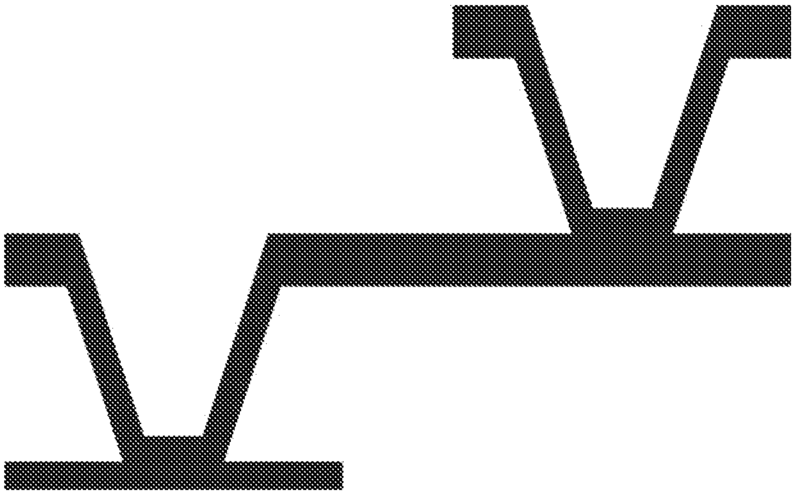
FIG. 1B is a view illustrating a configuration of staggered vias.
Figure 2A:
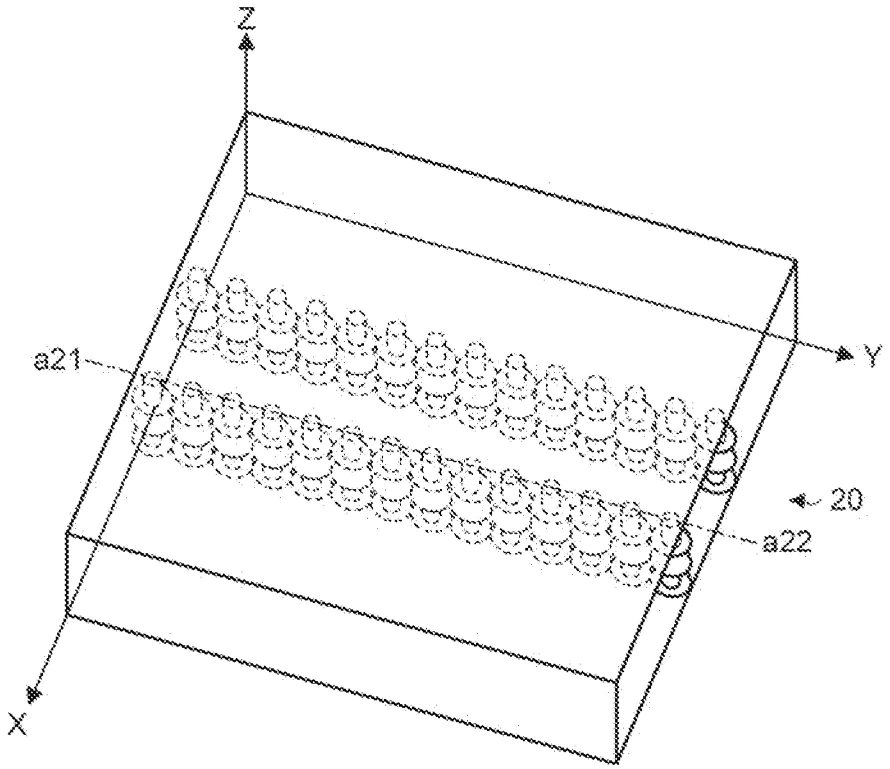
FIG. 2A is a perspective view of a post-wall waveguide using full-stack vias.
Figure 2B:
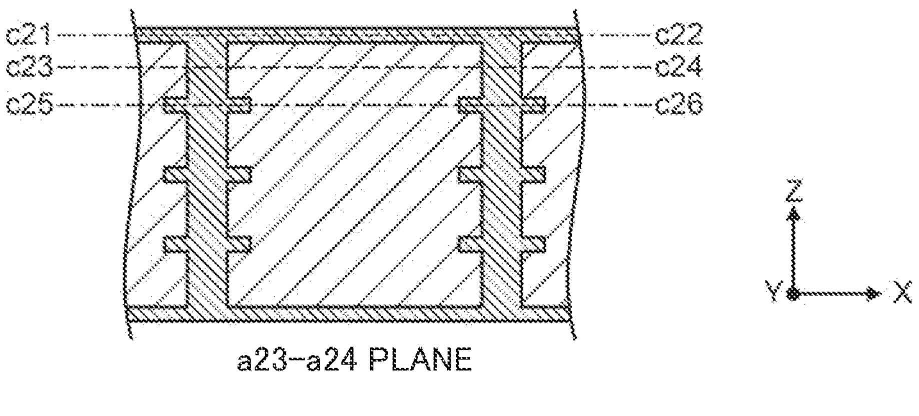
FIG. 2B is a sectional view of the post-wall waveguide using the full-stack vias as viewed in the Y-axis direction.
Figure 2C:
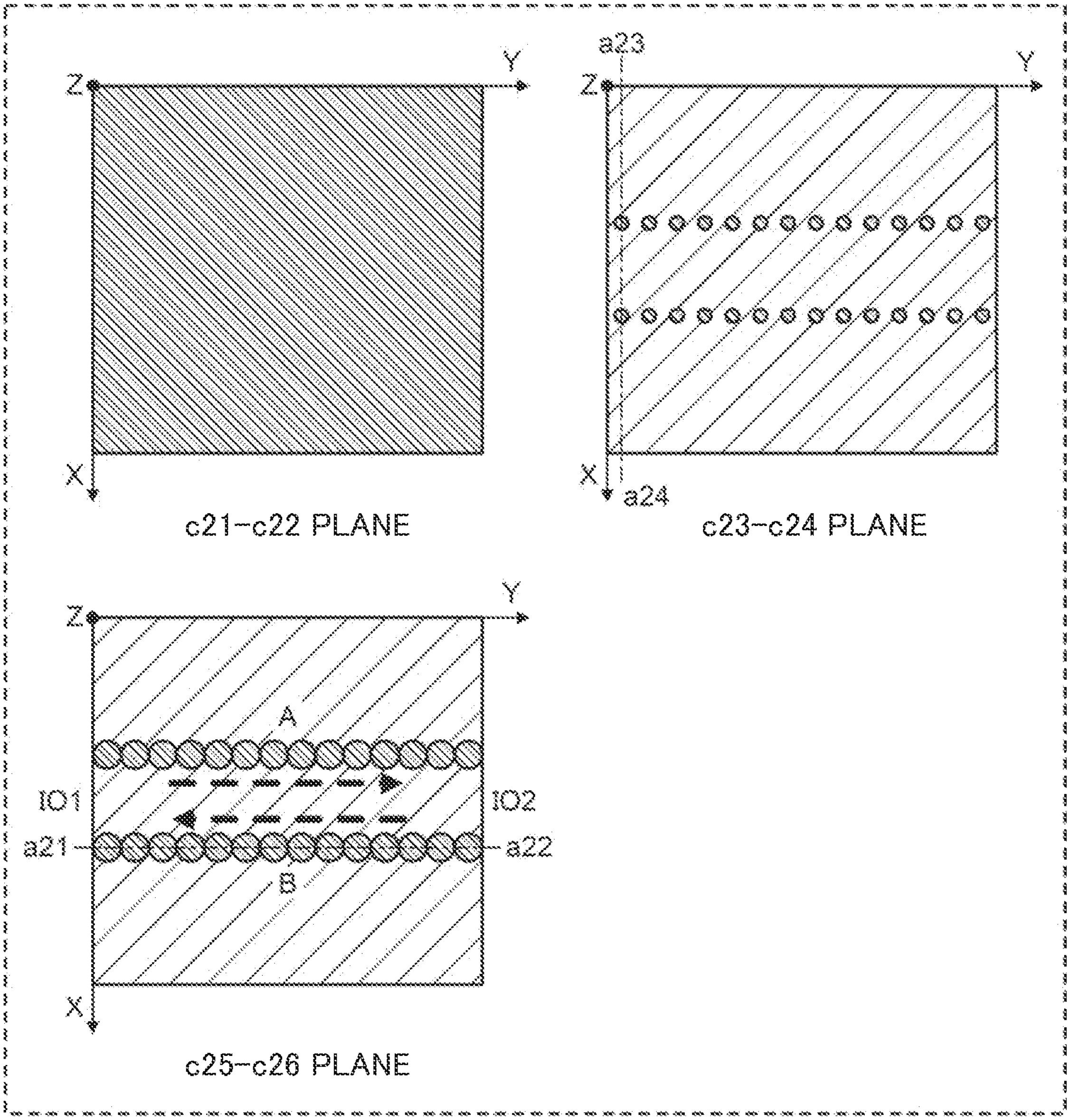
FIG. 2C provides sectional views of the post-wall waveguide using the full-stack vias as viewed in the Z-axis direction.
Figure 2D:
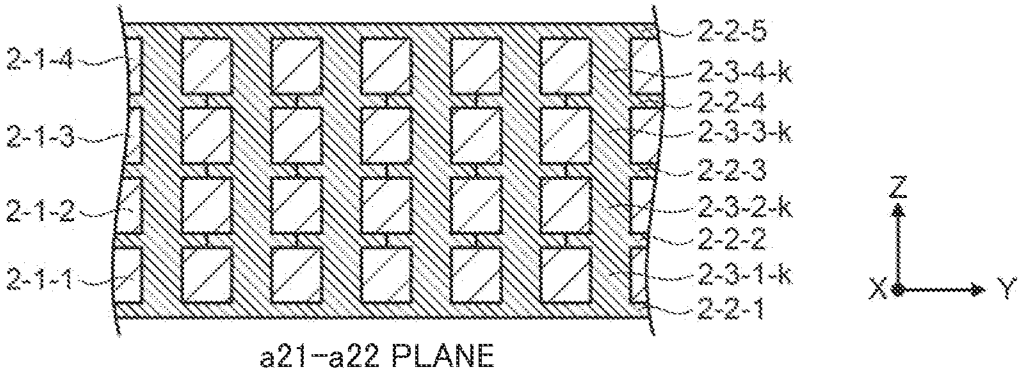
FIG. 2D is a partial sectional view of the post-wall waveguide using the full-stack vias as viewed in the X-axis direction.

In Embodiment 1 of the present disclosure, a post-wall waveguide is constituted using staggered vias illustrated in FIG. 1B having a configuration in which the positions of vias are shifted in a stepwise manner instead of stack vias. Thus, in the staggered vias, the vias are disposed to be shifted to positions different for respective layers adjacent to each other when viewed in the Z-axis direction in a multi-layer dielectric substrate.

Figure 3A:
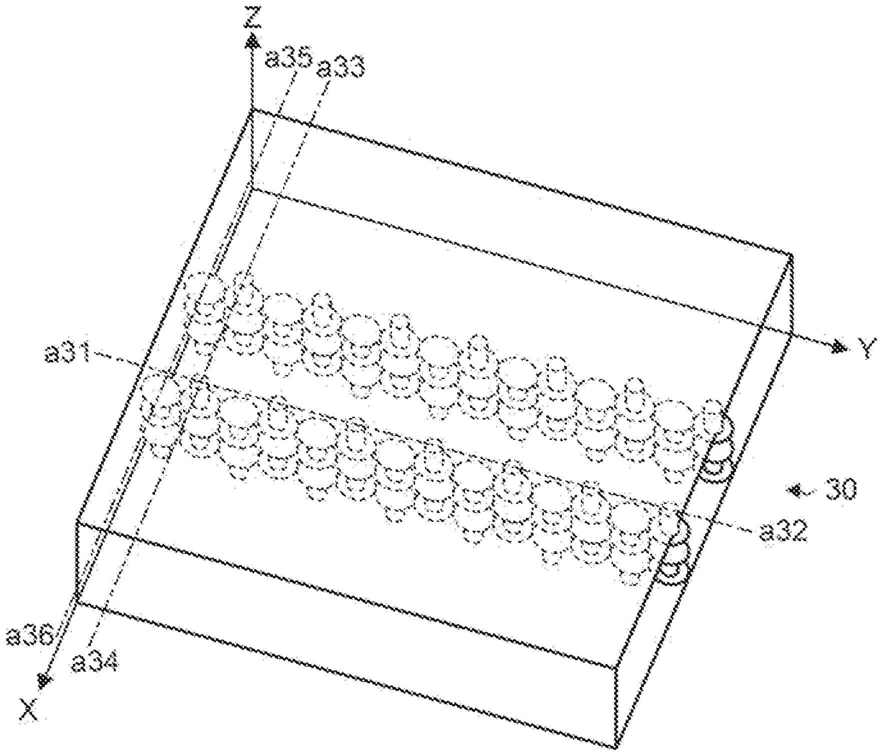
FIG. 3A is a perspective view illustrating an example of a post-wall waveguide according to Embodiment 1 of the present disclosure.
Figure 3B:
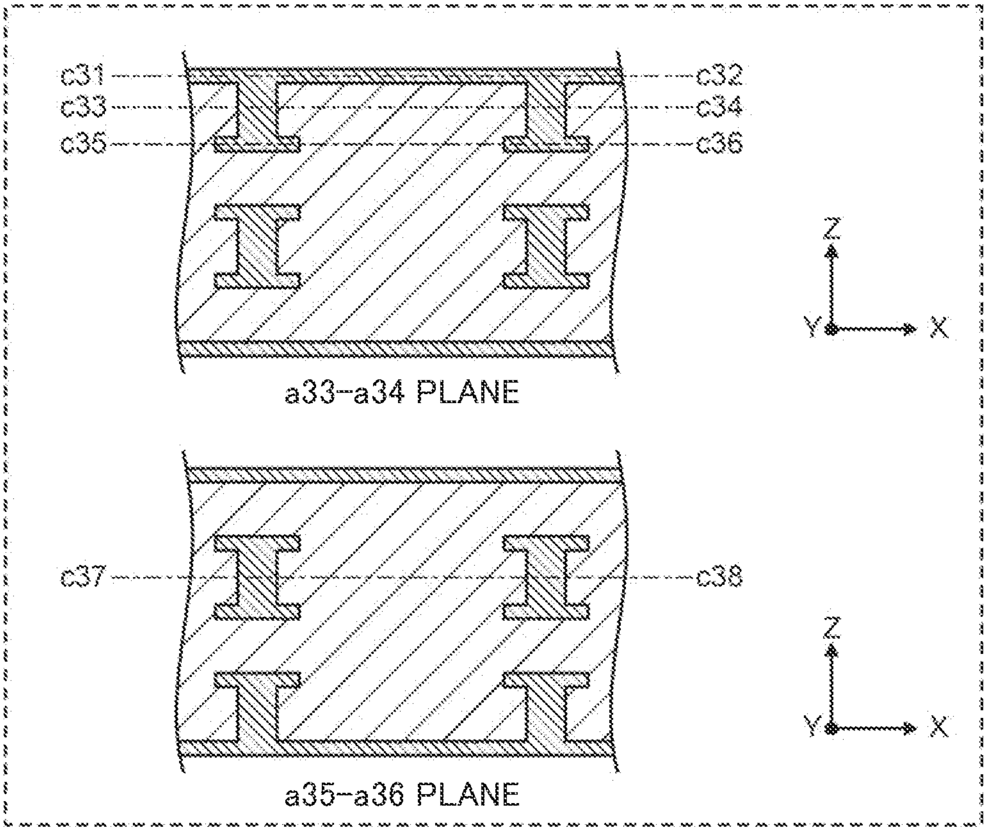
FIG. 3B provides sectional views illustrating the example of the post-wall waveguide according to Embodiment 1 of the present disclosure as viewed in the Y-axis direction.
Figure 3C:
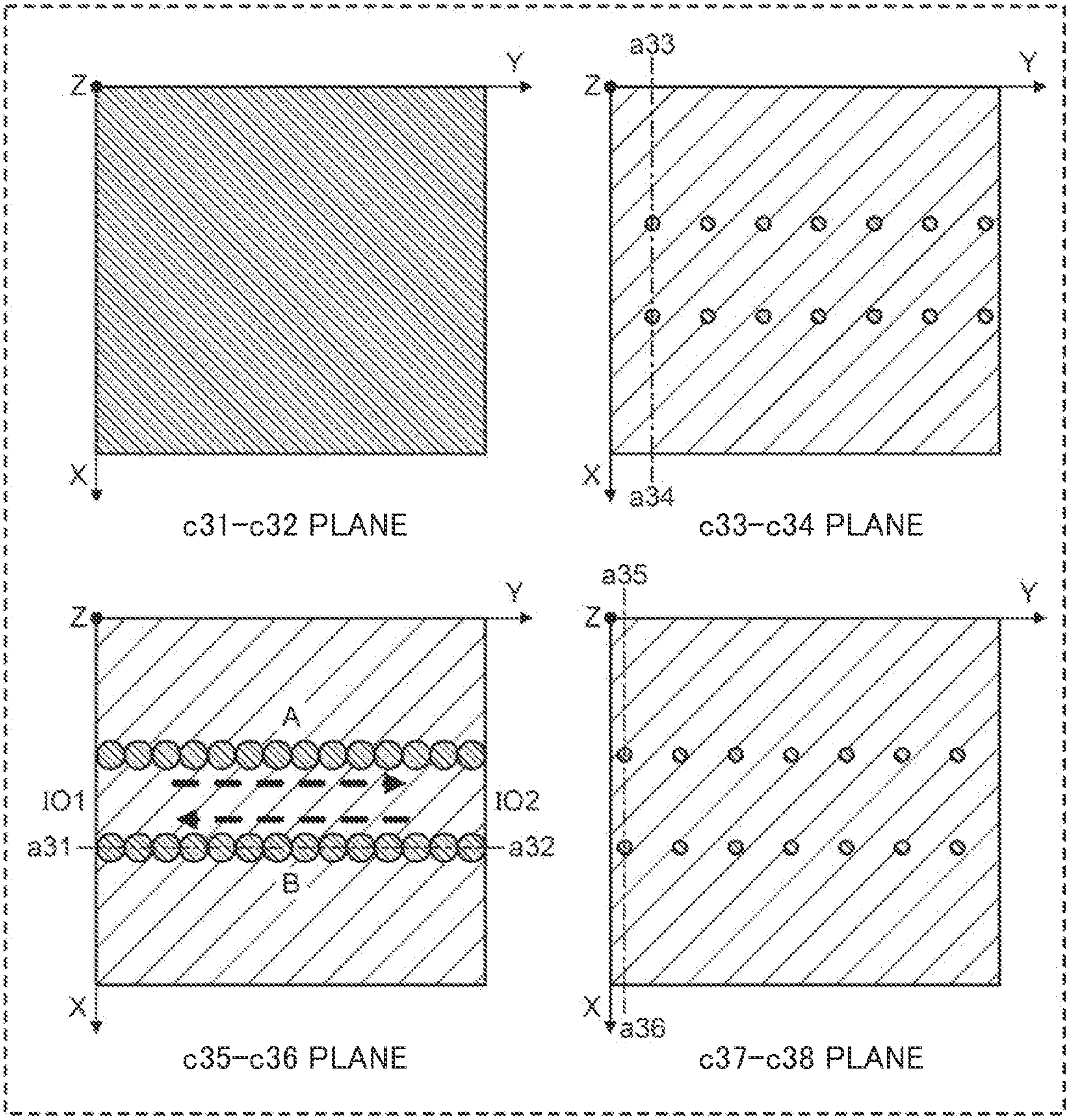
FIG. 3C provides sectional views illustrating the example of the post-wall waveguide according to Embodiment 1 of the present disclosure as viewed in the Z-axis direction.
Figure 3D:
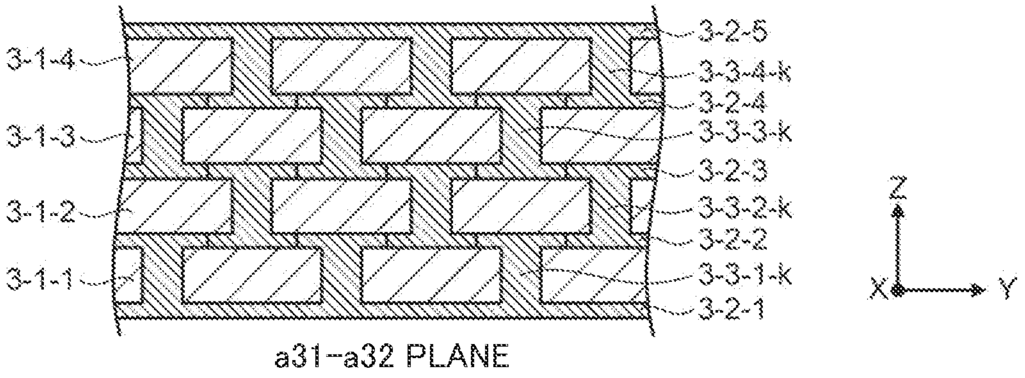
FIG. 3D is a partial sectional view illustrating the example of the post-wall waveguide according to Embodiment 1 of the present disclosure as viewed in the X-axis direction.

FIG. 3A is a perspective view illustrating an example of post-wall waveguide 30 according to Embodiment 1. FIG. 3B provides a sectional view of a33-a34 plane and a sectional view of a35-a36 plane illustrating the example of post-wall waveguide 30 as viewed in the Y-axis direction. FIG. 3C provides a sectional view of c31-c32 plane, a sectional view of c33-c34 plane, a sectional view of c35-c36 plane, and a sectional view of c37-c38 plane illustrating the example of post-wall waveguide 30 as viewed in the Z-axis direction. FIG. 3D is a partial sectional view of a31-a32 plane illustrating the example of post-wall waveguide 30 as viewed in the X-axis direction.

For example, as illustrated in FIG. 3D, post-wall waveguide 30 includes four layers of dielectric layers 3-1-1 to 3-1-4, five layers of conductor layers 3-2-1 to 3-2-5, and two sets of vias 3-3-1-*k* to 3-3-4-*k* (k is any integer satisfying 1≤k≤N (N is an integer of 2 or more); in the present embodiment, N=7). Post-wall waveguide 30 does not include a via other than the two sets of vias 3-3-1-*k* to 3-3-4-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 3-1-1 to 3-1-4). However, each dielectric layer is in contact with a dielectric layer adjacent thereto when there is no conductor in the conductor layer.

Vias 3-3-1-1 to 3-3-1-N are disposed at equal intervals in a plane perpendicular to the Z-axis, and the same applies to vias 3-3-2-1 to 3-3-2-N, vias 3-3-3-1 to 3-3-3-N, and vias 3-3-4-1 to 3-3-4-N.

Vias 3-3-1-1 to 3-3-1-N electrically connect two conductor layers 3-2-1 and 3-2-2 that are adjacent to each other and formed (stacked) on and under dielectric layer 3-1-1. Vias 3-3-2-1 to 3-3-2-N electrically connect two conductor layers 3-2-2 and 3-2-3 that are adjacent to each other and formed (stacked) on and under dielectric layer 3-1-2. Vias 3-3-3-1 to 3-3-3-N electrically connect two conductor layers 3-2-3 and 3-2-4 that are adjacent to each other and formed (stacked) on and under dielectric layer 3-1-3. Vias 3-3-4-1 to 3-3-4-N electrically connect two conductor layers 3-2-4 and 3-2-5 that are adjacent to each other and formed (stacked) on and under dielectric layer 3-1-4.

The two sets of vias 3-3-1-1 to 3-3-1-N are arrayed in parallel, the two sets of vias 3-3-2-1 to 3-3-2-N are arrayed in parallel, the two sets of vias 3-3-3-1 to 3-3-3-N are arrayed in parallel, and the two sets of vias 3-3-4-1 to 3-3-4-N are arrayed in parallel. Moreover, the two sets of vias 3-3-1-*k* to 3-3-4-*k* (k is any integer satisfying 1≤k≤N) are also arrayed in parallel.

In the present embodiment, as illustrated in FIG. 3C and FIG. 3D, lowermost conductor layer 3-2-1 and uppermost conductor layer 3-2-5 are solidly disposed over the entire surfaces; however, a lowermost conductor layer and an uppermost conductor layer may be disposed in a region sandwiched between via group A (one set of the two sets of vias 3-3-1-*k* to 3-3-4-*k* (k is any integer satisfying 1≤k≤N)) and via group B (the other set of the two sets of vias 3-3-1-*k* to 3-3-4-*k* (k is any integer satisfying 1≤k≤N).

When a via is provided, conductors called via lands each having a circular shape with a radius larger than that of the via based on a design rule may be disposed on and under the via. In the present embodiment, circular via lands are disposed in conductor layers 3-2-2 to 3-2-4 on and under the vias (for example, see the sectional view of c35-c36 plane of FIG. 3C). The via lands of conductor layers 3-2-2 to 3-2-4 may be or may not be connected to via lands adjacent thereto. In the present embodiment, in order to suppress leakage of electromagnetic waves, it is desirable to narrow the interval between the vias as much as possible in consideration of restriction of the via lands.

In the present embodiment, with use of the staggered vias, as illustrated in FIG. 3C and FIG. 3D, via 3-3-1-*k* and via 3-3-3-*k* are disposed to be shifted in the positive Y-axis direction with respect to via 3-3-2-*k* and via 3-3-4-*k* when viewed in the Z-axis direction (in an XY plane or a plane of the dielectric layer). In contrast, as illustrated in FIG. 3C and FIG. 3D, via 3-3-1-_k_ and via 3-3-3-_k_ are disposed at the same position when viewed in the Z-axis direction, and via 3-3-2-_k_ and via 3-3-4-_k_ are disposed at the same position when viewed in the Z-axis direction. Moreover, vias 3-3-1-1 to 3-3-1-N and vias 3-3-2-1 to 3-3-2-N are disposed at equal intervals each being half the interval between vias 3-3-1-1 to 3-3-1-N (vias 3-3-2-1 to 3-3-2-N) when viewed in the Z-axis direction. As illustrated in FIG. 3B and FIG. 3D, the two sets of vias 3-3-1-_k_ to 3-3-4-_k_ (k is any integer satisfying 1≤k≤N) are not stacked across all of the four layers of dielectric layers 3-1-1 to 3-1-4, and are not stacked across two or more dielectric layers among the four layers of dielectric layers 3-1-1 to 3-1-4. For example, all conductor layers 3-2-1 to 3-2-5 are not electrically connected to each other through vias at the same position when viewed in the Z-axis direction.

As illustrated in FIG. 3C and FIG. 3D, waveguide 30 is constituted of lowermost conductor layer 3-2-1 and uppermost conductor layer 3-2-5 in a central portion, and via group A and via group B. As illustrated in FIG. 3C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of vias 3-3-1-1 to 3-3-1-N, vias 3-3-2-1 to 3-3-2-N, vias 3-3-3-1 to 3-3-3-N, and vias 3-3-4-1 to 3-3-4-N are an example of a first via group according to the present disclosure. Vias of the other of the two sets of vias 3-3-1-1 to 3-3-1-N, vias 3-3-2-1 to 3-3-2-N, vias 3-3-3-1 to 3-3-3-N, and vias 3-3-4-1 to 3-3-4-N are an example of a second via group according to the present disclosure.

In the present embodiment, all of the two sets of vias 3-3-1-_k_ to 3-3-4-_k_ (k is any integer satisfying 1≤k≤N) overlap in not all of the four layers of dielectric layers 3-1-1 to 3-1-4 when viewed in the Z-axis direction.

Moreover, in the present embodiment, the two sets of vias 3-3-1-1 to 3-3-1-N and the two sets of vias 3-3-2-1 to 3-3-2-N are disposed at positions so that the two sets of vias 3-3-1-1 to 3-3-1-N do not overlap the two sets of vias 3-3-2-1 to 3-3-2-N when viewed in the Z-axis direction. Moreover, in the present embodiment, the two sets of vias 3-3-3-1 to 3-3-3-N, and the two sets of vias 3-3-2-1 to 3-3-2-N and the two sets of vias 3-3-4-1 to 3-3-4-N are disposed at positions so that the two sets of vias 3-3-3-1 to 3-3-3-N do not overlap the two sets of vias 3-3-2-1 to 3-3-2-N and the two sets of vias 3-3-4-1 to 3-3-4-N when viewed in the Z-axis direction.

Embodiment 2

In Embodiment 2 of the present disclosure, a post-wall waveguide is constituted using staggered vias similarly to Embodiment 1. In Embodiment 2, however, conductor layers 3-2-2 to 3-2-4 in which the circular via lands are disposed in Embodiment 1 are replaced with conductor layers 4-2-2 to 4-2-4 in which linear conductors are disposed. Note that conductor layers 4-2-2 to 4-2-4 are inner layers, and conductor layers 4-2-1 and 4-2-5 are outer layers.

Figure 4A:
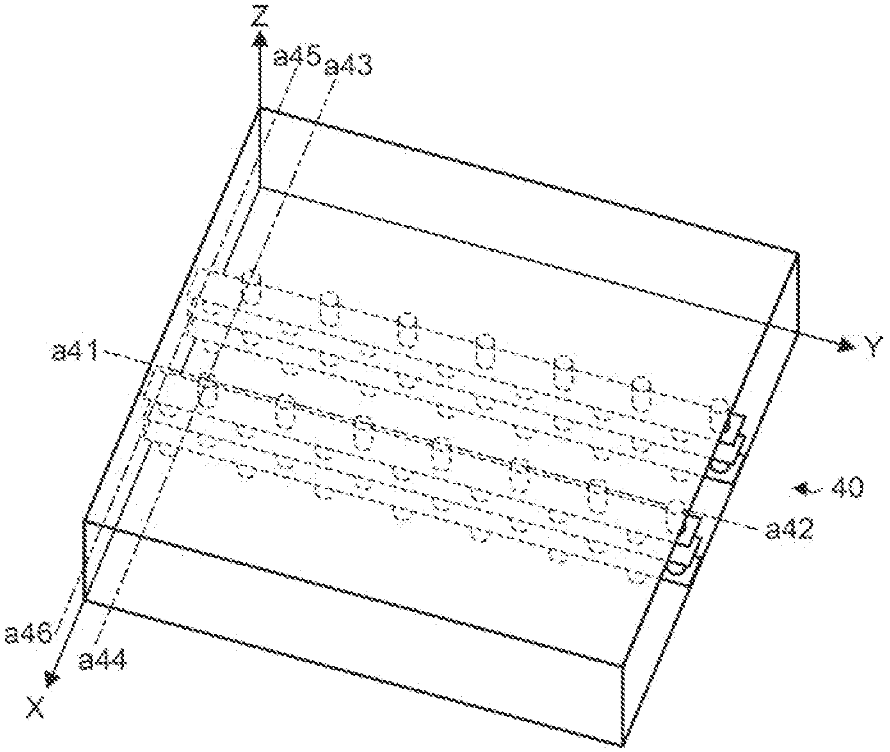
FIG. 4A is a perspective view illustrating an example of a post-wall waveguide according to Embodiment 2 of the present disclosure.
Figure 4B:
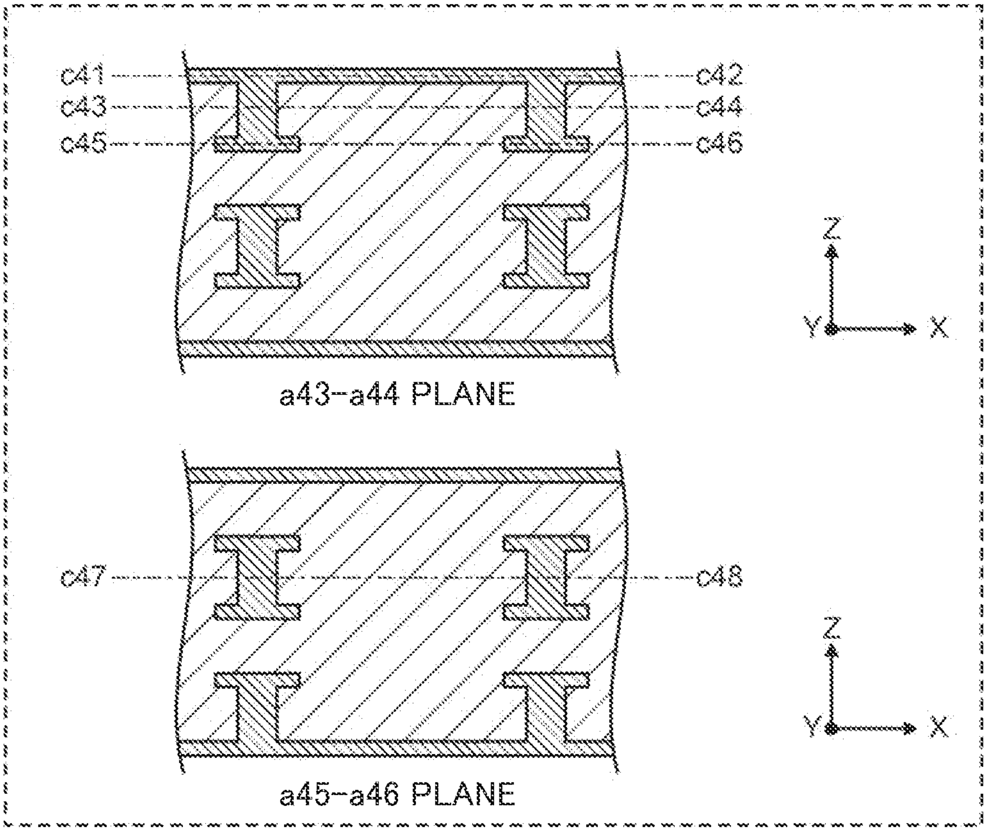
FIG. 4B provides sectional views illustrating the example of the post-wall waveguide according to Embodiment 2 of the present disclosure as viewed in the Y-axis direction.
Figure 4C:
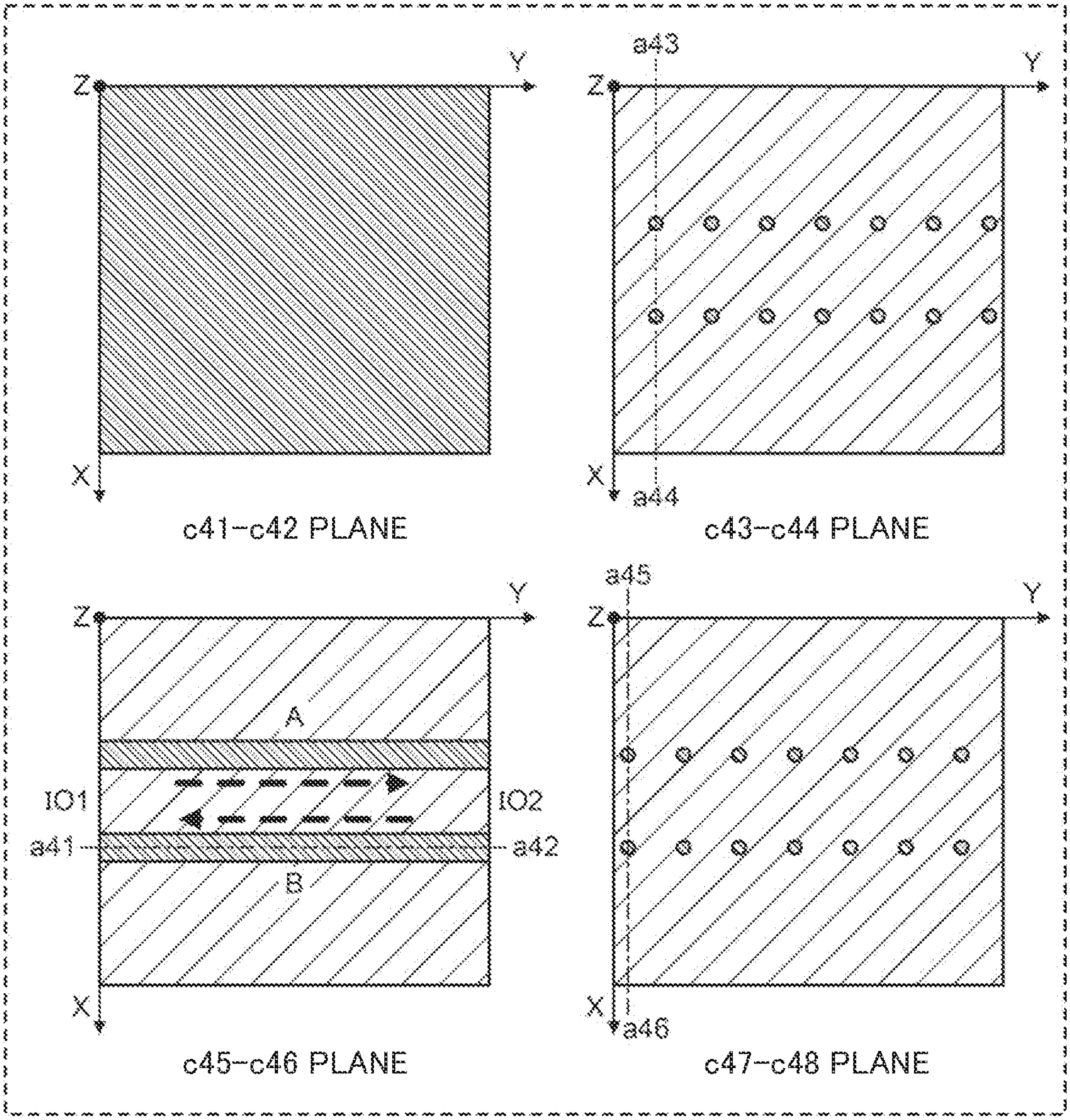
FIG. 4C provides sectional views illustrating the example of the post-wall waveguide according to Embodiment 2 of the present disclosure as viewed in the Z-axis direction.
Figure 4D:
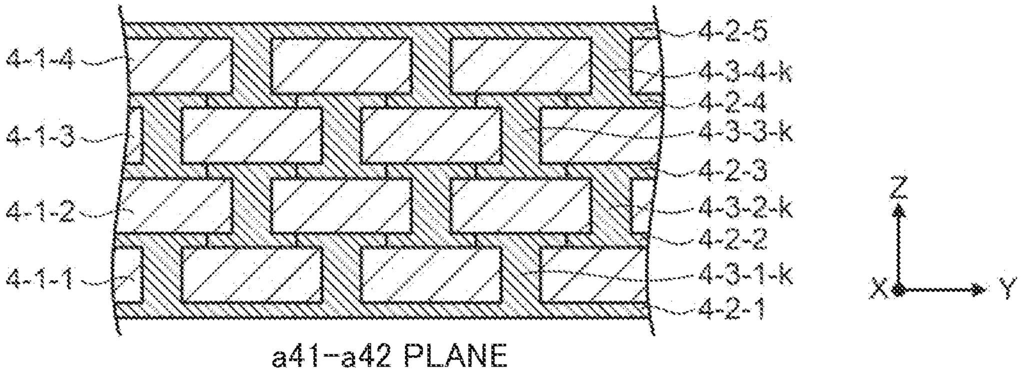
FIG. 4D is a partial sectional view illustrating the example of the post-wall waveguide according to Embodiment 2 of the present disclosure as viewed in the X-axis direction.

FIG. 4A is a perspective view illustrating an example of post-wall waveguide 40 according to Embodiment 2. FIG. 4B provides a sectional view of a43-a44 plane and a sectional view of a45-a46 plane illustrating the example of post-wall waveguide 40 as viewed in the Y-axis direction. FIG. 4C provides a sectional view of c41-c42 plane, a sectional view of c43-c44 plane, a sectional view of c45-c46 plane, and a sectional view of c47-c48 plane illustrating the example of post-wall waveguide 40 as viewed in the Z-axis direction. FIG. 4D is a partial sectional view of a41-a42 plane illustrating the example of post-wall waveguide 40 as viewed in the X-axis direction.

For example, as illustrated in FIG. 4D, post-wall waveguide 40 includes four layers of dielectric layers 4-1-1 to 4-1-4, five layers of conductor layers 4-2-1 to 4-2-5, and two sets of vias 4-3-1-_k_ to 4-3-4-_k_ (k is any integer satisfying 1≤k≤N (N is an integer of 2 or more); in the present embodiment, N=7). Post-wall waveguide 40 does not include a via other than the two sets of vias 4-3-1-_k_ to 4-3-4-_k_ (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 4-1-1 to 4-1-4). However, each dielectric layer is in contact with a dielectric layer adjacent thereto when there is no conductor in the conductor layer.

Vias 4-3-1-1 to 4-3-1-N are disposed at equal intervals in a plane perpendicular to the Z-axis, and the same applies to vias 4-3-2-1 to 4-3-2-N, vias 4-3-3-1 to 4-3-3-N, and vias 4-3-4-1 to 4-3-4-N.

Vias 4-3-1-1 to 4-3-1-N electrically connect two conductor layers 4-2-1 and 4-2-2 that are adjacent to each other and formed (stacked) on and under dielectric layer 4-1-1. Vias 4-3-2-1 to 4-3-2-N electrically connect two conductor layers 4-2-2 and 4-2-3 that are adjacent to each other and formed (stacked) on and under dielectric layer 4-1-2. Vias 4-3-3-1 to 4-3-3-N electrically connect two conductor layers 4-2-3 and 4-2-4 that are adjacent to each other and formed (stacked) on and under dielectric layer 4-1-3. Vias 4-3-4-1 to 4-3-4-N electrically connect two conductor layers 4-2-4 and 4-2-5 that are adjacent to each other and formed (stacked) on and under dielectric layer 4-1-4.

The two sets of vias 4-3-1-1 to 4-3-1-N are arrayed in parallel, the two sets of vias 4-3-2-1 to 4-3-2-N are arrayed in parallel, the two sets of vias 4-3-3-1 to 4-3-3-N are arrayed in parallel, and the two sets of vias 4-3-4-1 to 4-3-4-N are arrayed in parallel. Moreover, the two sets of vias 4-3-1-_k_ to 4-3-4-_k_ (k is any integer satisfying 1≤k≤N) are also arrayed in parallel.

In the present embodiment, as illustrated in FIG. 4C and FIG. 4D, lowermost conductor layer 4-2-1 and uppermost conductor layer 4-2-5 are solidly disposed over the entire surfaces; however, a lowermost conductor layer and an uppermost conductor layer may be disposed in a region sandwiched between via group A (one set of the two sets of vias 4-3-1-_k_ to 4-3-4-_k_ (k is any integer satisfying 1≤k≤N)) and via group B (the other set of the two sets of vias 4-3-1-_k_ to 4-3-4-_k_ (k is any integer satisfying 1≤k≤N)).

In the present embodiment, as described above, the linear conductors are disposed in conductor layers 4-2-2 to 4-2-4 (inner layers) on and under the vias, except for lowermost conductor layer 4-2-1 and uppermost conductor layer 4-2-5 (outer layers) (see, for example, the sectional view of c45-c46 plane of FIG. 4C). Also in the present embodiment, in order to suppress leakage of electromagnetic waves, it is desirable to narrow the interval between the vias as much as possible in consideration of the above-described restriction.

Also in the present embodiment, with use of the staggered vias, as illustrated in FIG. 4C and FIG. 4D, via 4-3-1-*k* and via 4-3-3-*k* are disposed to be shifted in the positive Y-axis direction with respect to via 4-3-2-*k* and via 4-3-4-*k* when viewed in the Z-axis direction. In contrast, as illustrated in FIG. 4C and FIG. 4D, via 4-3-1-*k* and via 4-3-3-*k* are disposed at the same position when viewed in the Z-axis direction, and via 4-3-2-*k* and via 4-3-4-*k* are disposed at the same position when viewed in the Z-axis direction. Moreover, vias 4-3-1-1 to 4-3-1-N and vias 4-3-2-1 to 4-3-2-N are disposed at equal intervals each being half the interval between vias 4-3-1-1 to 4-3-1-N (vias 4-3-2-1 to 4-3-2-N) when viewed in the Z-axis direction. As illustrated in FIG. 4B and FIG. 4D, the two sets of vias 4-3-1-*k* to 4-3-4-*k* (k is any integer satisfying 1≤k≤N) are not stacked across all of the four layers of dielectric layers 4-1-1 to 4-1-4, and are not stacked across two or more dielectric layers among the four layers of dielectric layers 4-1-1 to 4-1-4. For example, all conductor layers 4-2-1 to 4-2-5 are not electrically connected to each other through vias at the same position when viewed in the Z-axis direction.

As illustrated in FIG. 4C and FIG. 4D, waveguide 40 is constituted of lowermost conductor layer 4-2-1 and uppermost conductor layer 4-2-5 in a central portion, and via group A and via group B. As illustrated in FIG. 4C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of vias 4-3-1-1 to 4-3-1-N, vias 4-3-2-1 to 4-3-2-N, vias 4-3-3-1 to 4-3-3-N, and vias 4-3-4-1 to 4-3-4-N are an example of a first via group according to the present disclosure. Vias of the other of the two sets of vias 4-3-1-1 to 4-3-1-N, vias 4-3-2-1 to 4-3-2-N, vias 4-3-3-1 to 4-3-3-N, and vias 4-3-4-1 to 4-3-4-N are an example of a second via group according to the present disclosure.

In the present embodiment, all of the two sets of vias 4-3-1-*k* to 4-3-4-*k* (k is any integer satisfying 1≤k≤N) overlap in not all of the four layers of dielectric layers 4-1-1 to 4-1-4 when viewed in the Z-axis direction.

Moreover, in the present embodiment, the two sets of vias 4-3-1-1 to 4-3-1-N and the two sets of vias 4-3-2-1 to 4-3-2-N are disposed at positions so that the two sets of vias 4-3-1-1 to 4-3-1-N do not overlap the two sets of vias 4-3-2-1 to 4-3-2-N when viewed in the Z-axis direction. Moreover, in the present embodiment, the two sets of vias 4-3-3-1 to 4-3-3-N, and the two sets of vias 4-3-2-1 to 4-3-2-N and the two sets of vias 4-3-4-1 to 4-3-4-N are disposed at positions so that the two sets of vias 4-3-3-1 to 4-3-3-N do not overlap the two sets of vias 4-3-2-1 to 4-3-2-N and the two sets of vias 4-3-4-1 to 4-3-4-N when viewed in the Z-axis direction.

Embodiment 3

In Embodiment 3 of the present disclosure, a post-wall waveguide is constituted using staggered vias similarly to Embodiments 1 and 2. In Embodiment 3, however, conductor layers 4-2-2 to 4-2-4 in which the linear conductors are disposed in Embodiment 2 are replaced with conductor layers 5-2-2 to 5-2-4 in which stub-shaped conductors are added to the linear conductors.

Figure 5A:
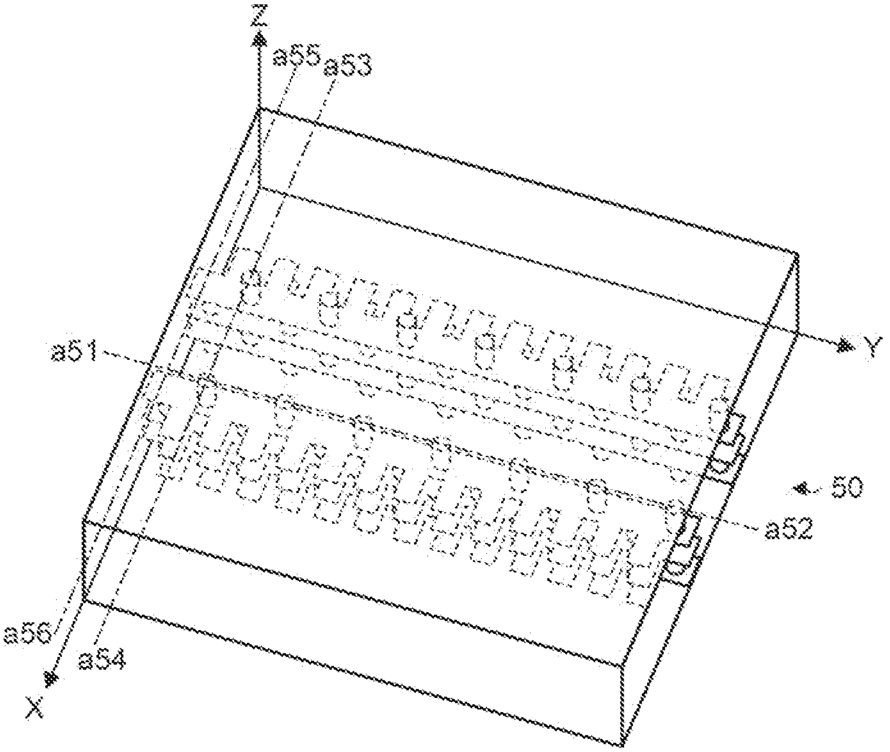
FIG. 5A is a perspective view illustrating an example of a post-wall waveguide according to Embodiment 3 of the present disclosure.
Figure 5B:
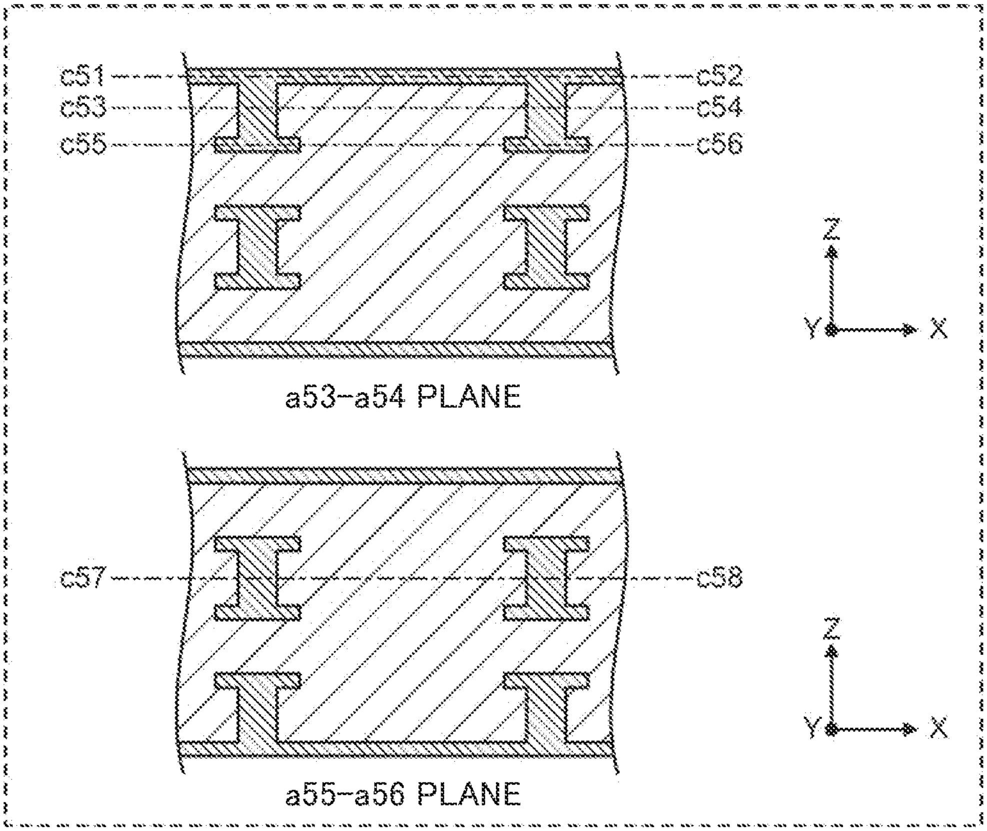
FIG. 5B provides sectional views illustrating the example of the post-wall waveguide according to Embodiment 3 of the present disclosure as viewed in the Y-axis direction.
Figure 5C:
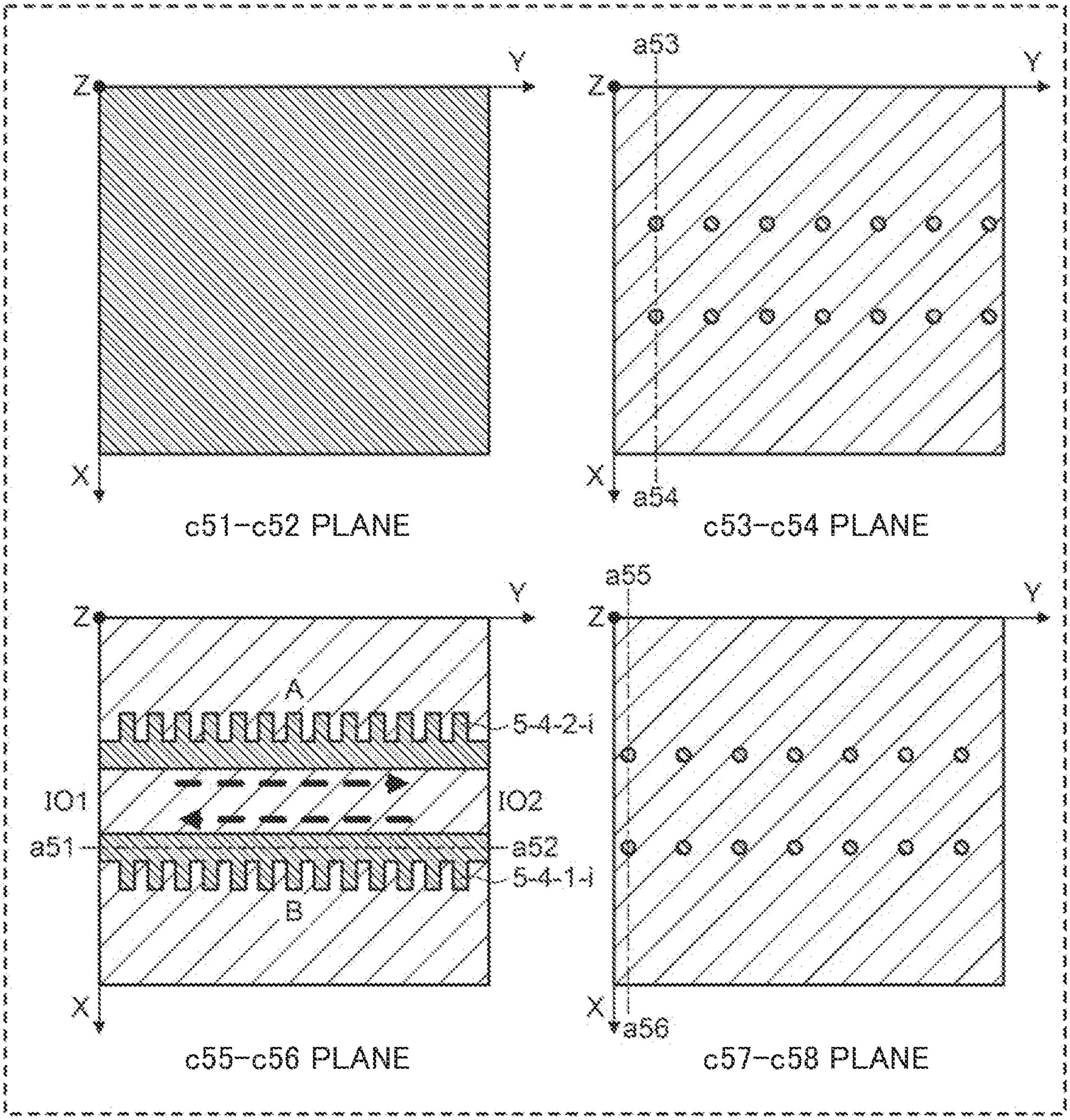
FIG. 5C provides sectional views illustrating the example of the post-wall waveguide according to Embodiment 3 of the present disclosure as viewed in the Z-axis direction.
Figure 5D:
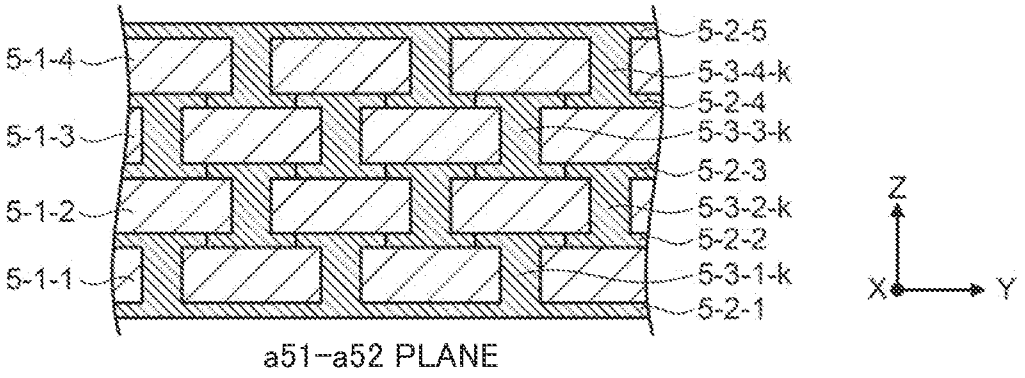
FIG. 5D is a partial sectional view illustrating the example of the post-wall waveguide according to Embodiment 3 of the present disclosure as viewed in the X-axis direction.

FIG. 5A is a perspective view illustrating an example of post-wall waveguide 50 according to Embodiment 3. FIG. 5B provides a sectional view of a53-a54 plane and a sectional view of a55-a56 plane illustrating the example of post-wall waveguide 50 as viewed in the Y-axis direction. FIG. 5C provides a sectional view of c51-c52 plane, a sectional view of c53-c54 plane, a sectional view of c55-c56 plane, and a sectional view of c57-c58 plane illustrating the example of post-wall waveguide 50 as viewed in the Z-axis direction. FIG. 5D is a partial sectional view of a51-a52 plane illustrating the example of post-wall waveguide 50 as viewed in the X-axis direction.

For example, as illustrated in FIG. 5D, post-wall waveguide 50 includes four layers of dielectric layers 5-1-1 to 5-1-4, five layers of conductor layers 5-2-1 to 5-2-5, two sets of vias 5-3-1-*k* to 5-3-4-*k* (k is any integer satisfying 1≤k≤N (N is an integer of 2 or more); in the present embodiment, N=7), and three sets of stubs 5-4-1-*i* to 5-4-2-*i* (i is any integer satisfying 1≤i≤M (M is an integer of 2 or more); in the present embodiment, M=13). Post-wall waveguide 50 does not include a via other than the two sets of vias 5-3-1-*k* to 5-3-4-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 5-1-1 to 5-1-4). However, each dielectric layer is in contact with a dielectric layer adjacent thereto when there is no conductor in the conductor layer.

Vias 5-3-1-1 to 5-3-1-N are disposed at equal intervals in a plane perpendicular to the Z-axis, and the same applies to vias 5-3-2-1 to 5-3-2-N, vias 5-3-3-1 to 5-3-3-N, and vias 5-3-4-1 to 5-3-4-N.

Vias 5-3-1-1 to 5-3-1-N electrically connect two conductor layers 5-2-1 and 5-2-2 that are adjacent to each other and formed (stacked) on and under dielectric layer 5-1-1. Vias 5-3-2-1 to 5-3-2-N electrically connect two conductor layers 5-2-2 and 5-2-3 that are adjacent to each other and formed (stacked) on and under dielectric layer 5-1-2. Vias 5-3-3-1 to 5-3-3-N electrically connect two conductor layers 5-2-3 and 5-2-4 that are adjacent to each other and formed (stacked) on and under dielectric layer 5-1-3. Vias 5-3-4-1 to 5-3-4-N electrically connect two conductor layers 5-2-4 and 5-2-5 that are adjacent to each other and formed (stacked) on and under dielectric layer 5-1-4.

The two sets of vias 5-3-1-1 to 5-3-1-N are arrayed in parallel, the two sets of vias 5-3-2-1 to 5-3-2-N are arrayed in parallel, the two sets of vias 5-3-3-1 to 5-3-3-N are arrayed in parallel, and the two sets of vias 5-3-4-1 to 5-3-4-N are arrayed in parallel. Moreover, the two sets of vias 5-3-1-*k* to 5-3-4-*k* (k is any integer satisfying 1≤k≤N) are also arrayed in parallel.

Stubs 5-4-1-1 to 5-4-1-M are disposed at equal intervals in a plane perpendicular to the Z-axis, and the same applies to stubs 5-4-2-1 to 5-4-2-M. For example, stubs 5-4-1-1 to 5-4-1-M are disposed at equal intervals at a linear conductor along the longitudinal direction of the linear conductor, and stubs 5-4-2-1 to 5-4-2-M are disposed at equal intervals at a linear conductor along the longitudinal direction of the linear conductor.

In the present embodiment, as illustrated in FIG. 5C and FIG. 5D, lowermost conductor layer 5-2-1 and uppermost conductor layer 5-2-5 are solidly disposed over the entire surfaces; however, a lowermost conductor layer and an uppermost conductor layer may be disposed in a region sandwiched between via group A (one set of the two sets of vias **5-3-1-*k* to 5-3-4-*k* (k is any integer satisfying 1≤k≤N)) and via group B (the other set of the two sets of vias 5-3-1-*k* to 5-3-4-*k*** (k is any integer satisfying 1≤k≤N)).

In the present embodiment, as described above, the linear conductors are disposed in conductor layers 5-2-2 to 5-2-4 on and under the vias (for example, see the sectional view of c55-c56 plane of FIG. 5C). Also in the present embodiment, in order to suppress leakage of electromagnetic waves, it is desirable to narrow the interval between the vias as much as possible in consideration of the above-described restriction. In the present embodiment, linear and stub-shaped conductors **5-4-1-*i* to 5-4-2-*i* are further disposed on the outer sides of the waveguide (in the vertical direction of the sectional view of c55-c56 plane of FIG. 5**C) from the linear conductors. In order to suppress leakage of electromagnetic waves, the length of the linear stubs is about ¼ of the wavelength of electromagnetic waves to be transmitted through the waveguide. In the present embodiment, in order to suppress leakage of electromagnetic waves, it is desirable to narrow the interval between the stubs as much as possible in consideration of restriction of lines and spaces.

Also in the present embodiment, with use of the staggered vias, as illustrated in FIG. 5C and FIG. 5D, via **5-3-1-*k* and via 5-3-3-*k* are disposed to be shifted in the positive Y-axis direction with respect to via 5-3-2-*k* and via 5-3-4-*k* when viewed in the Z-axis direction. In contrast, as illustrated in FIG. 5C and FIG. 5D, via 5-3-1-*k* and via 5-3-3-*k* are disposed at the same position when viewed in the Z-axis direction, and via 5-3-2-*k* and via 5-3-4-*k* are disposed at the same position when viewed in the Z-axis direction. Moreover, vias 5-3-1-1 to 5-3-1-N and vias 5-3-2-1 to 5-3-2-N are disposed at equal intervals each being half the interval between vias 5-3-1-1 to 5-3-1-N (vias 5-3-2-1 to 5-3-2-N) when viewed in the Z-axis direction. As illustrated in FIG. 5B and FIG. 5D, the two sets of vias 5-3-1-*k* to 5-3-4-*k* (k is any integer satisfying 1≤k≤N) are not stacked across all of the four layers of dielectric layers 5-1-1 to 5-1-4, and are not stacked across two or more dielectric layers among the four layers of dielectric layers 5-1-1 to 5-1-4. All conductor layers 5-2-1 to 5-2-5** are not electrically connected to each other through vias at the same position when viewed in the Z-axis direction.

As illustrated in FIG. 5C and FIG. 5D, waveguide 50 is constituted of lowermost conductor layer 5-2-1 and uppermost conductor layer 5-2-5 in a central portion, and via group A and via group B. As illustrated in FIG. 5C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. In this way, via group A and via group B function as conductor walls for electromagnetic waves (form conductor walls for electromagnetic waves).

Vias of one of the two sets of vias 5-3-1-1 to 5-3-1-N, vias 5-3-2-1 to 5-3-2-N, vias 5-3-3-1 to 5-3-3-N, and vias 5-3-4-1 to 5-3-4-N are an example of a first via group according to the present disclosure. Vias of the other of the two sets of vias 5-3-1-1 to 5-3-1-N, vias 5-3-2-1 to 5-3-2-N, vias 5-3-3-1 to 5-3-3-N, and vias 5-3-4-1 to 5-3-4-N are an example of a second via group according to the present disclosure.

In the present embodiment, all of the two sets of vias **5-3-1-*k* to 5-3-4-*k* (k is any integer satisfying 1≤k≤N) overlap in not all of the four layers of dielectric layers 5-1-1 to 5-1-4** when viewed in the Z-axis direction.

Moreover, in the present embodiment, the two sets of vias 5-3-1-1 to 5-3-1-N and the two sets of vias 5-3-2-1 to 5-3-2-N are disposed at positions so that the two sets of vias 5-3-1-1 to 5-3-1-N do not overlap the two sets of vias 5-3-2-1 to 5-3-2-N when viewed in the Z-axis direction. Moreover, in the present embodiment, the two sets of vias 5-3-3-1 to 5-3-3-N, and the two sets of vias 5-3-2-1 to 5-3-2-N and the two sets of vias 5-3-4-1 to 5-3-4-N are disposed at positions so that the two sets of vias 5-3-3-1 to 5-3-3-N do not overlap the two sets of vias 5-3-2-1 to 5-3-2-N and the two sets of vias 5-3-4-1 to 5-3-4-N when viewed in the Z-axis direction.

Advantageous Effects of Embodiments 1 to 3

Figure 6:
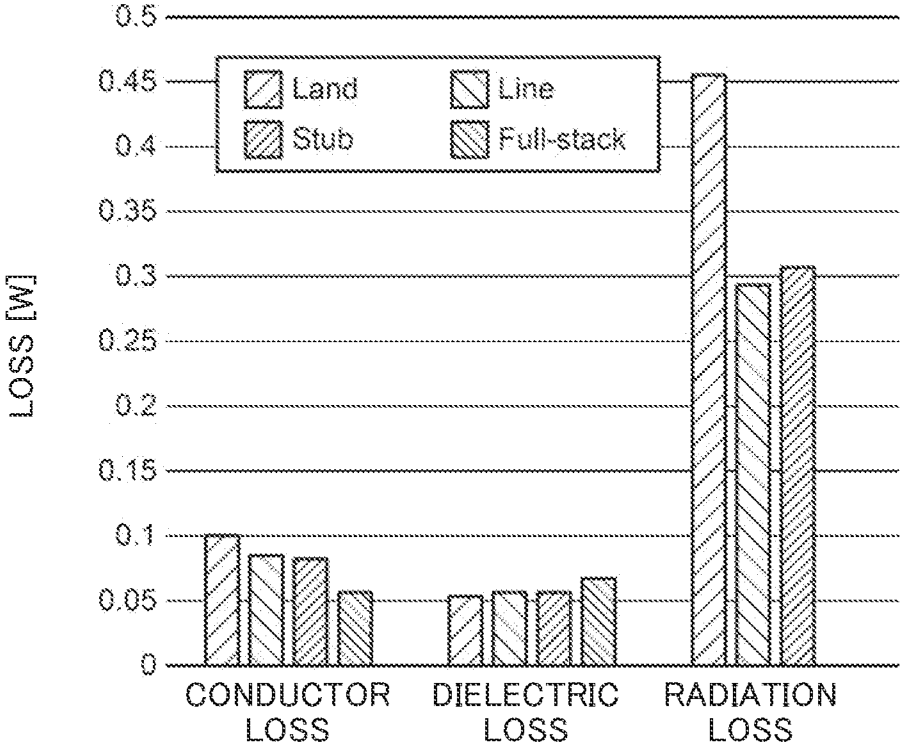
FIG. 6 is a graph presenting an example of simulation results of losses of the post-wall waveguide using the full-stack vias and the post-wall waveguides according to Embodiments 1 to 3.

In FIG. 6, the center-to-center intervals of vias existing in layers adjacent to each other are matched between the configuration of post-wall waveguide 20 having the full-stack configuration and the configurations of post-wall waveguides 30 to 50 according to Embodiments 1 to 3. For example, the center-to-center interval between vias in the same layer of post-wall waveguides 30 to 50 according to Embodiments 1 to 3 is twice the center-to-center interval between vias in the same layer of post-wall waveguide 20 having the full-stack configuration. Thus, in post-wall waveguides 30 to 50 according to Embodiments 1 to 3, electromagnetic waves are likely to be radiated from between the vias.

Referring to simulation results of losses presented in FIG. 6, the radiation loss in post-wall waveguide 20 having the full-stack configuration is small to the extent that it is difficult to visually observe the radiation loss, whereas the radiation losses in post-wall waveguides 30 to 50 according to Embodiments 1 to 3 are large.

As described above, from the viewpoint of the radiation loss, the performance of post-wall waveguide 20 having the full-stack configuration is considered to be the best; however, a large cost is required to manufacture post-wall waveguide 20 having the full-stack configuration, and the yield is deteriorated because breakage occurs or the copper foil comes off during the manufacturing. Thus, it is not practical to manufacture post-wall waveguide 20 having the full-stack configuration.

Note that, in the simulation presented in FIG. 6 and the like, the via interval is set to be large in order to describe the advantageous effects of the present embodiment and the subsequent embodiments. Since the via interval of the staggered vias is set to be equal to or less than ¼ of the wavelength of electromagnetic waves to be transmitted through the waveguide, the radiation loss is as small as that in the full-stack configuration even with the via interval of the staggered vias. How small the via interval of the staggered vias can be made depends on the design rule at the time of manufacturing the substrate.

As described in Embodiments 1 to 3, by disposition of the vias in a staggered manner without stacking the vias, it is possible to reduce the risk of breakage due to thermal expansion and to suppress a decrease in reliability and a deterioration in yield. Note that, from the viewpoint of suppressing an increase in radiation loss, the interval between the vias is desirably equal to or less than ¼ of the wavelength of electromagnetic waves to be transmitted through the waveguide.

When the simulation results of the losses of post-wall waveguides 30 to 50 according to Embodiments 1 to 3 presented in FIG. 6 are compared, it can be confirmed that the radiation losses of post-wall waveguides 40 and 50 according to Embodiments 2 and 3 are smaller than the radiation loss of post-wall waveguide 30 according to Embodiment 1. For example, by disposition of linear or stub-shaped conductors in conductor layers on and under vias like post-wall waveguides 40 and 50 according to Embodiments 2 and 3, the radiation loss can be reduced more than in post-wall waveguide 30 according to Embodiment 1. Moreover, it is also found that the conductor losses of post-wall waveguides 40 and 50 according to Embodiments 2 and 3 are smaller than the conductor loss of post-wall waveguide 30 according to Embodiment 1, and it can also be confirmed that the conductor loss is reduced by disposition of the linear or stub-shaped conductors.

Embodiment 4

In Embodiment 4 of the present disclosure, a post-wall waveguide is constituted using two rows of staggered vias for the purpose of reducing the radiation loss.

Figure 7A:
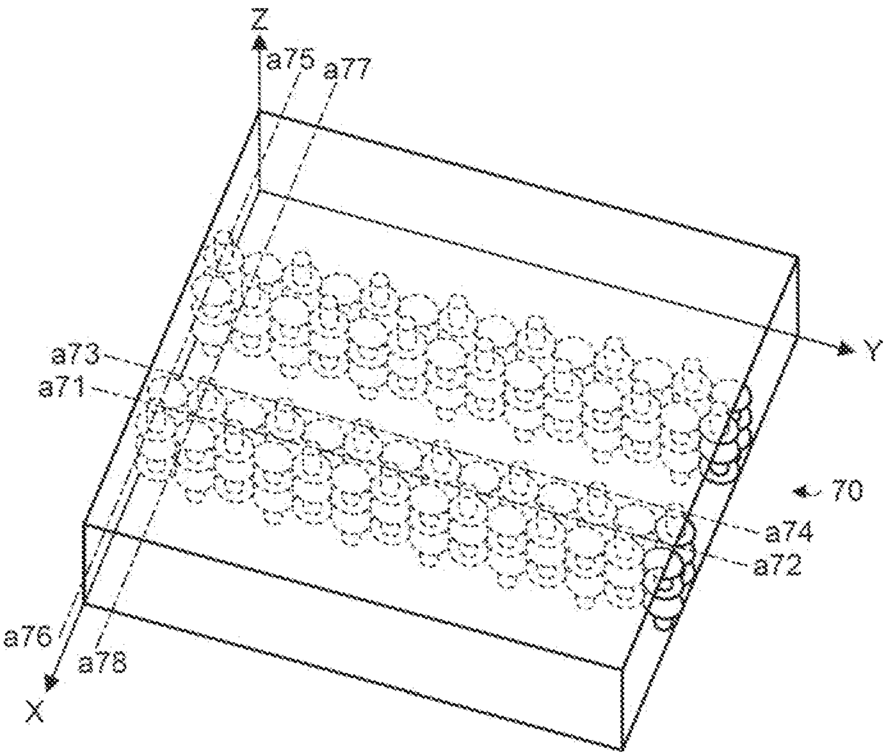
FIG. 7A is a perspective view illustrating an example of a post-wall waveguide according to Embodiment 4 of the present disclosure.
Figure 7B:
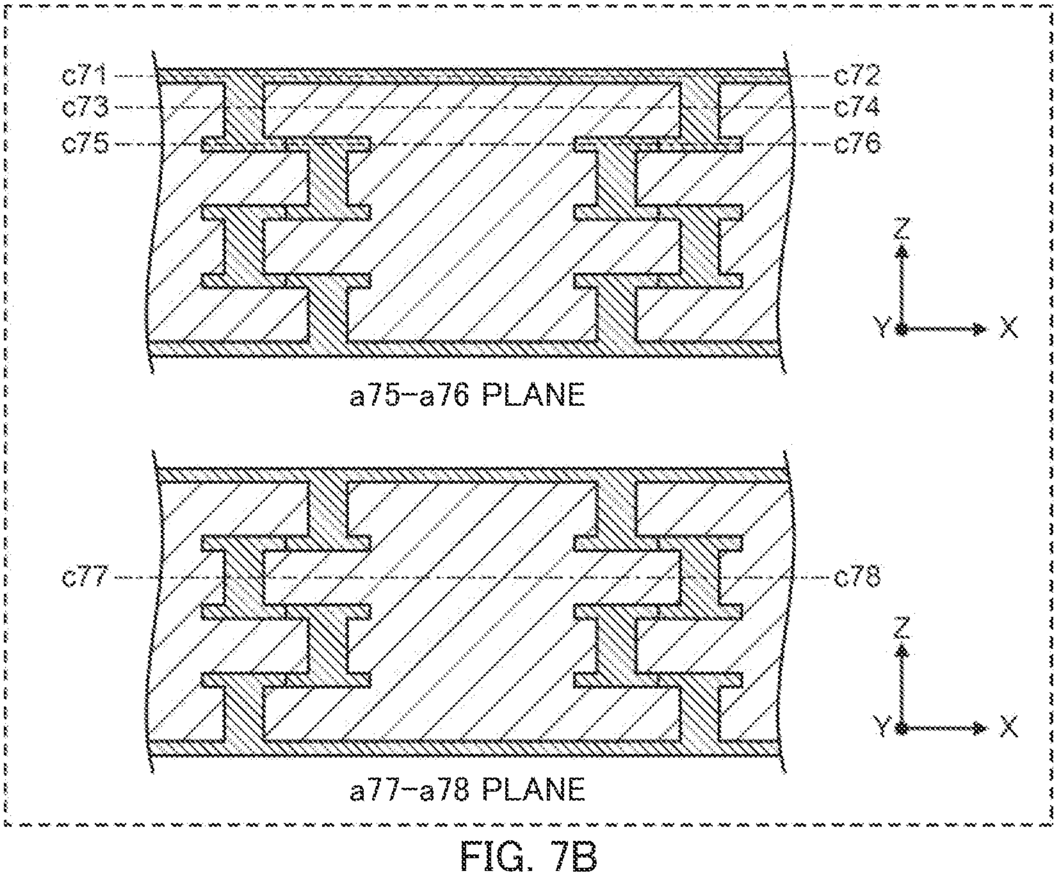
FIG. 7B provides sectional views illustrating the example of the post-wall waveguide according to Embodiment 4 of the present disclosure as viewed in the Y-axis direction.
Figure 7C:
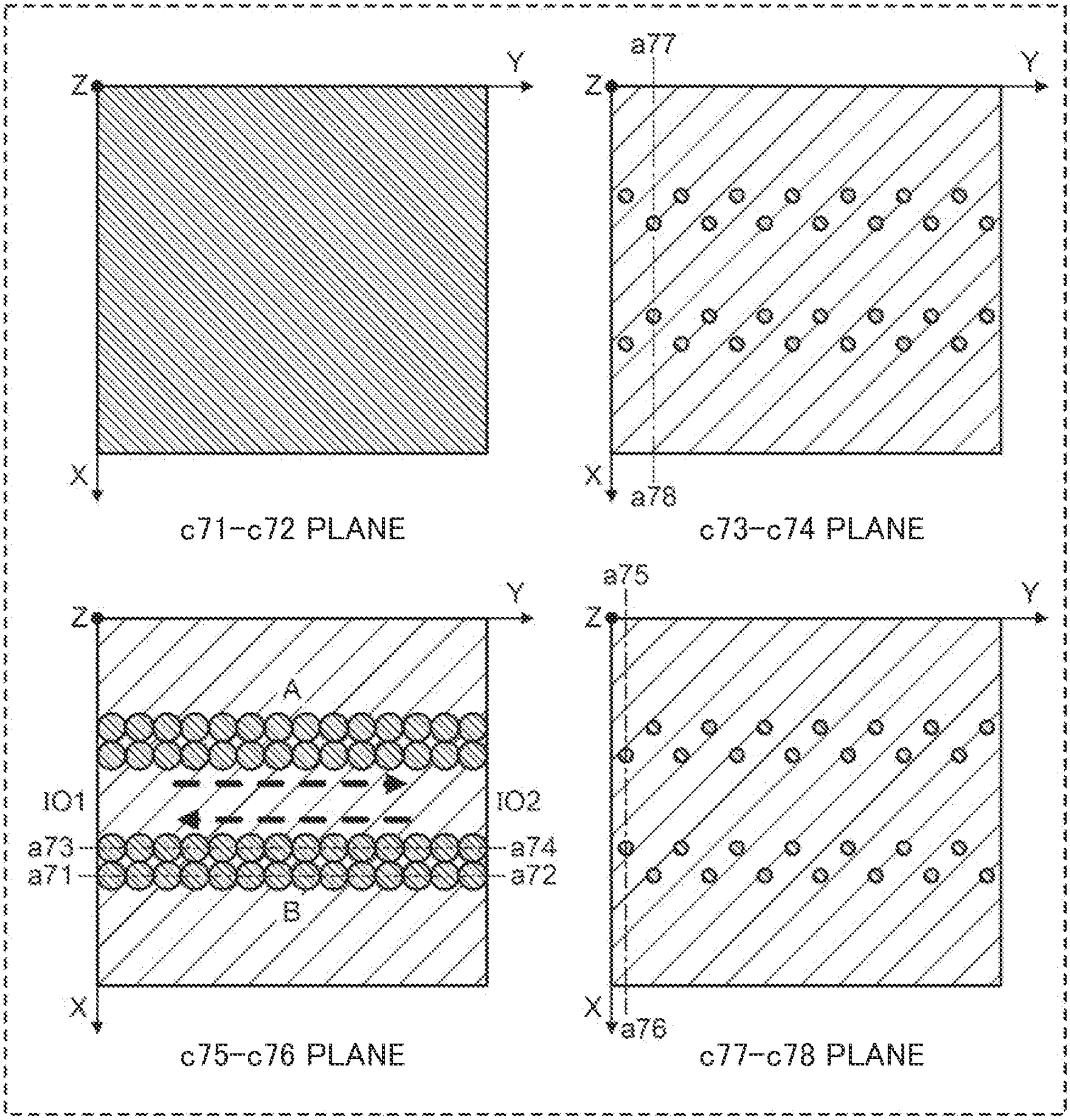
FIG. 7C provides sectional views illustrating the example of the post-wall waveguide according to Embodiment 4 of the present disclosure as viewed in the Z-axis direction.
Figure 7D:
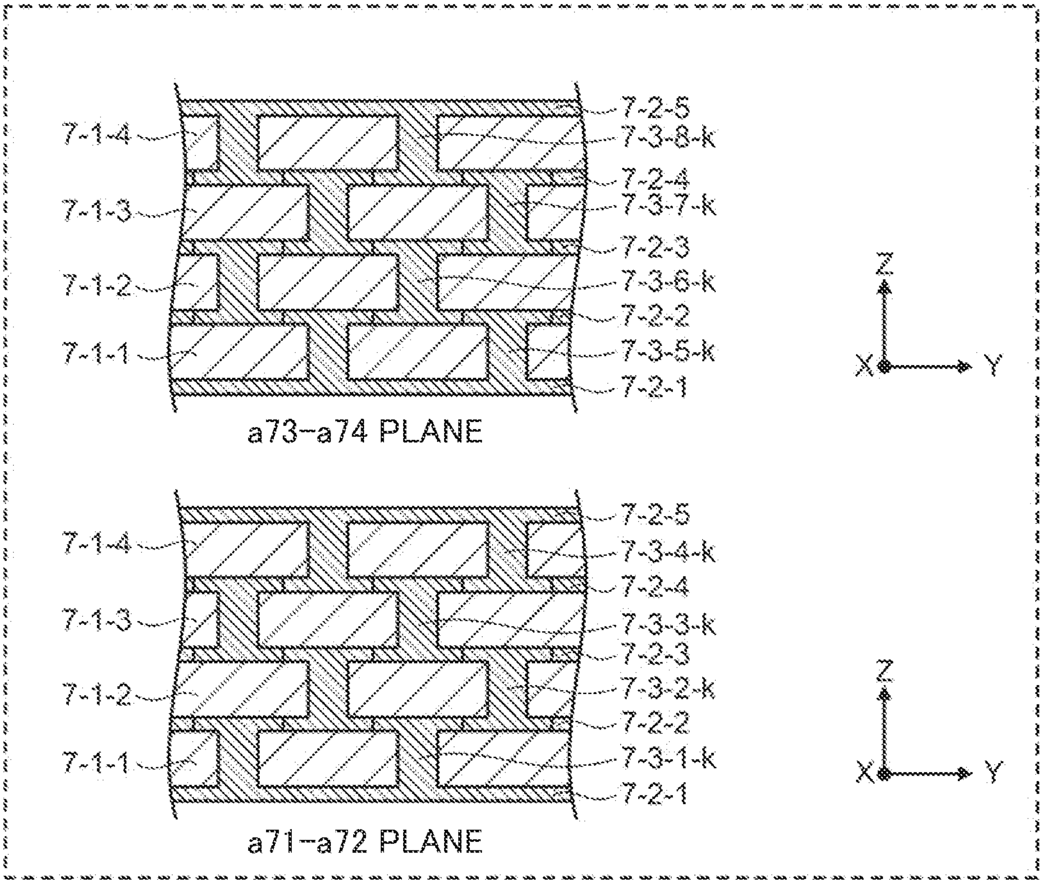
FIG. 7D provides partial sectional views illustrating the example of the post-wall waveguide according to Embodiment 4 of the present disclosure as viewed in the X-axis direction.

FIG. 7A is a perspective view illustrating an example of post-wall waveguide 70 according to Embodiment 4. FIG. 7B provides a sectional view of a75-a76 plane and a sectional view of a77-a78 plane illustrating the example of post-wall waveguide 70 as viewed in the Y-axis direction. FIG. 7C provides a sectional view of c71-c72 plane, a sectional view of c73-c74 plane, a sectional view of c75-c76 plane, and a sectional view of c77-c78 plane illustrating the example of post-wall waveguide 70 as viewed in the Z-axis direction. FIG. 7D provides a partial sectional view of a71-a72 plane and a partial sectional view of a73-a74 plane illustrating the example of post-wall waveguide 70 as viewed in the X-axis direction.

For example, as illustrated in FIG. 7D, post-wall waveguide 70 includes four layers of dielectric layers 7-1-1 to 7-1-4, five layers of conductor layers 7-2-1 to 7-2-5, two sets of vias 7-3-1-*k* to 7-3-4-*k* (k is any integer satisfying 1≤k≤N (N is an integer of 2 or more); in the present embodiment, N=7), and two sets of vias 7-3-5-*k* to 7-3-8-*k* (k is any integer satisfying 1≤k≤N (N is an integer of 2 or more); in the present embodiment, N=7). Post-wall waveguide 70 does not include a via other than the two sets of vias 7-3-1-*k* to 7-3-4-*k* (k is any integer satisfying 1≤k≤N) and the two sets of vias 7-3-5-*k* to 7-3-8-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 7-1-1 to 7-1-4). However, each dielectric layer is in contact with a dielectric layer adjacent thereto when there is no conductor in the conductor layer.

Vias 7-3-1-1 to 7-3-1-N are disposed at equal intervals in a plane perpendicular to the Z-axis, and the same applies to vias 7-3-2-1 to 7-3-2-N, vias 7-3-3-1 to 7-3-3-N, and vias 7-3-4-1 to 7-3-4-N.

Moreover, vias 7-3-5-1 to 7-3-5-N are disposed at equal intervals in a plane perpendicular to the Z-axis, and the same applies to vias 7-3-6-1 to 7-3-6-N, vias 7-3-7-1 to 7-3-7-N, and vias 7-3-8-1 to 7-3-8-N.

Vias 7-3-1-1 to 7-3-1-N and vias 7-3-5-1 to 7-3-5-N electrically connect two conductor layers 7-2-1 and 7-2-2 that are adjacent to each other and formed (stacked) on and under dielectric layer 7-1-1. Vias 7-3-2-1 to 7-3-2-N and vias 7-3-6-1 to 7-3-6-N electrically connect two conductor layers 7-2-2 and 7-2-3 that are adjacent to each other and formed (stacked) on and under dielectric layer 7-1-2. Vias 7-3-3-1 to 7-3-3-N and vias 7-3-7-1 to 7-3-7-N electrically connect two conductor layers 7-2-3 and 7-2-4 that are adjacent to each other and formed (stacked) on and under dielectric layer 7-1-3. Vias 7-3-4-1 to 7-3-4-N and vias 7-3-8-1 to 7-3-8-N electrically connect two conductor layers 7-2-4 and 7-2-5 that are adjacent to each other and formed (stacked) on and under dielectric layer 7-1-4.

The two sets of (vias 7-3-1-1 to 7-3-1-N and vias 7-3-5-1 to 7-3-5-N) are arrayed in parallel, the two sets of (vias 7-3-2-1 to 7-3-2-N and vias 7-3-6-1 to 7-3-6-N) are arrayed in parallel, the two sets of (vias 7-3-3-1 to 7-3-3-N and vias 7-3-7-1 to 7-3-7-N) are arrayed in parallel, and the two sets of (vias 7-3-4-1 to 7-3-4-N and vias 7-3-8-1 to 7-3-8-N) are arrayed in parallel. Moreover, two sets of (vias 7-3-1-*k* to 7-3-4-*k* (k is any integer satisfying 1≤k≤N) and vias 7-3-5-*k* to 7-3-8-*k* (k is any integer satisfying 1≤k≤N)) are also arrayed in parallel.

In the present embodiment, as illustrated in FIG. 7C and FIG. 7D, lowermost conductor layer 7-2-1 and uppermost conductor layer 7-2-5 are solidly disposed over the entire surfaces; however, a lowermost conductor layer and an uppermost conductor layer may be disposed in a region sandwiched between via group A (one set of the two sets of (vias 7-3-1-*k* to 7-3-4-*k* (k is any integer satisfying 1≤k≤N) and (vias 7-3-5-*k* to 7-3-8-*k* (k is any integer satisfying 1≤k≤N)) and via group B (the other set of the two sets of (vias 7-3-1-*k* to 7-3-4-*k* (k is any integer satisfying 1≤k≤N) and vias 7-3-5-*k* to 7-3-8-*k* (k is any integer satisfying 1≤k≤N)).

When a via is provided, conductors called via lands each having a circular shape with a radius larger than that of the via based on a design rule may be disposed on and under the via. In the present embodiment, circular via lands are disposed in conductor layers 7-2-2 to 7-2-4 on and under the vias (for example, see the sectional view of c75-c76 plane of FIG. 7C). The via lands of conductor layers 7-2-2 to 7-2-4 may be or may not be connected to via lands adjacent thereto. Also in the present embodiment, in order to suppress leakage of electromagnetic waves, it is desirable to narrow the interval between the vias as much as possible in consideration of the above-described restriction.

In the present embodiment, as illustrated in FIG. 7D and the lower half of the sectional view of c73-c74 plane of FIG. 7C, in a plane perpendicular to the Z-axis direction, vias 7-3-1-*k* to 7-3-4-*k* (k is any integer satisfying 1≤k≤N) are disposed on the outer side in the X-axis direction, whereas vias 7-3-5-*k* to 7-3-8-*k* (k is any integer satisfying 1≤k≤N) are disposed on the inner side in the X-axis direction. For example, vias 7-3-1-*k* to 7-3-4-*k* (k is any integer satisfying 1≤k≤N) and vias 7-3-5-*k* to 7-3-8-*k* (k is any integer satisfying 1≤k≤N) are disposed in two rows. Furthermore, as illustrated in the sectional view of c73-c74 plane and the sectional view of c77-c78 plane of FIG. 7C, the two rows of vias 7-3-1-*k* to 7-3-4-*k* (k is any integer satisfying 1≤k≤N) and vias 7-3-5-*k* to 7-3-8-*k* (k is any integer satisfying 1≤k≤N) are alternately disposed in the first row on the outer side and the second row on the inner side in dielectric layers 7-1-1 to 7-1-4 so that vias 7-3-1-*k* to 7-3-4-*k* do not overlap vias 7-3-5-*k* to 7-3-8-*k* (so as not to form straight lines parallel to the X-axis). More specifically, the two rows of vias 7-3-1-*k* to 7-3-4-*k* (k is any integer satisfying 1≤k≤N) and vias 7-3-5-*k* to 7-3-8-*k* (k is any integer satisfying 1≤k≤N) illustrated in the lower half of the sectional view of c73-c74 plane of FIG. 7C are disposed so that points obtained by projection of the two rows of vias 7-3-1-*k* to 7-3-4-*k* (k is any integer satisfying 1≤k≤N) and vias 7-3-5-*k* to 7-3-8-*k* (k is any integer satisfying 1≤k≤N) on the Y-axis have equal intervals. The same applies to the two rows of vias 7-3-1-*k* to 7-3-4-*k* (k is any integer satisfying 1≤k≤N) and vias 7-3-5-*k* to 7-3-8-*k* (k is any integer satisfying 1≤k≤N) illustrated in the upper half of the sectional view of c73-c74 plane of FIG. 7C. This can suppress leakage of electromagnetic waves.

Also in the present embodiment, with use of the staggered vias in each of via group A and via group B, as illustrated in FIG. 7C and FIG. 7D, via 7-3-1-*k* and via 7-3-3-*k* are disposed to be shifted in the positive Y-axis direction with respect to via 7-3-2-*k* and via 7-3-4-*k* when viewed in the Z-axis direction. In contrast, as illustrated in FIG. 7C and FIG. 7D, via 7-3-1-*k* and via 7-3-3-*k* are disposed at the same position when viewed in the Z-axis direction, and via 7-3-2-*k* and via 7-3-4-*k* are disposed at the same position when viewed in the Z-axis direction. The same applies to vias 7-3-5-*k* to 7-3-8-*k*. As illustrated in FIG. 7B and FIG. 7D, the two sets of (vias 7-3-1-*k* to 7-3-4-*k* (k is any integer satisfying 1≤k≤N) and vias 7-3-5-*k* to 7-3-8-*k* (k is any integer satisfying 1≤k≤N) are not stacked across all of the four layers of dielectric layers 7-1-1 to 7-1-4, and are not stacked across two or more layers of dielectric layers among the four layers of dielectric layers 7-1-1 to 7-1-4. For example, all conductor layers 7-2-1 to 7-2-5 are not electrically connected to each other through vias at the same position when viewed in the Z-axis direction.

As illustrated in FIG. 7C and FIG. 7D, waveguide 70 is constituted of lowermost conductor layer 7-2-1 and uppermost conductor layer 7-2-5 in a central portion, and via group A and via group B. As illustrated in FIG. 7C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of (vias 7-3-1-1 to 7-3-1-N and vias 7-3-5-1 to 7-3-5-N), (vias 7-3-2-1 to 7-3-2-N and vias 7-3-6-1 to 7-3-6-N), (vias 7-3-3-1 to 7-3-3-N and vias 7-3-7-1 to 7-3-7-N), and (vias 7-3-4-1 to 7-3-4-N and vias 7-3-8-1 to 7-3-8-N) are an example of a first via group according to the present disclosure. Vias of the other of the two sets of (vias 7-3-1-1 to 7-3-1-N and vias 7-3-5-1 to 7-3-5-N), (vias 7-3-2-1 to 7-3-2-N and vias 7-3-6-1 to 7-3-6-N), (vias 7-3-3-1 to 7-3-3-N and vias 7-3-7-1 to 7-3-7-N), and (vias 7-3-4-1 to 7-3-4-N and vias 7-3-8-1 to 7-3-8-N) are an example of a second via group according to the present disclosure.

In the present embodiment, all of the two sets of (vias 7-3-1-*k* to 7-3-4-*k* (k is any integer satisfying 1≤k≤N) and vias 7-3-5-*k* to 7-3-8-*k* (k is any integer satisfying 1≤k≤N)) overlap in not all of the four layers of dielectric layers 7-1-1 to 7-1-4 when viewed in the Z-axis direction.

Embodiment 5

In Embodiment 5 of the present disclosure, similarly to Embodiment 4, a post-wall waveguide is constituted using two rows of staggered vias in each of via group A and via group B for the purpose of reducing the radiation loss. In Embodiment 5, however, conductor layers 7-2-2 to 7-2-4 in which the circular via lands are disposed in Embodiment 4 are replaced with conductor layers 8-2-2 to 8-2-4 in which linear conductors are disposed. Note that conductor layers 8-2-2 to 8-2-4 are inner layers, and conductor layers 8-2-1 and 8-2-5 are outer layers.

Figure 8A:
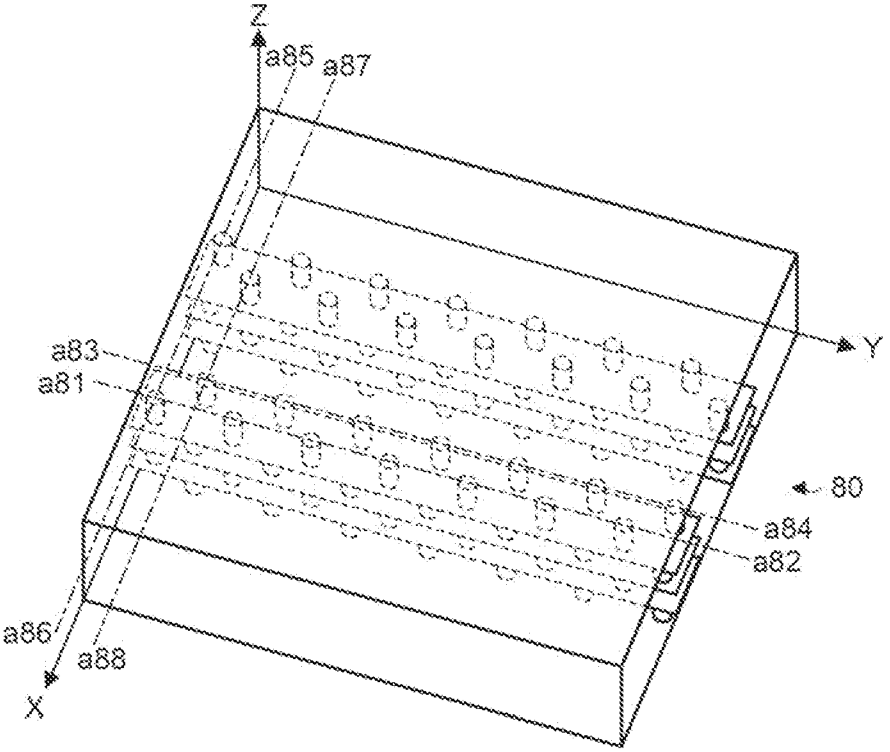
FIG. 8A is a perspective view illustrating an example of a post-wall waveguide according to Embodiment 5 of the present disclosure.
Figure 8B:
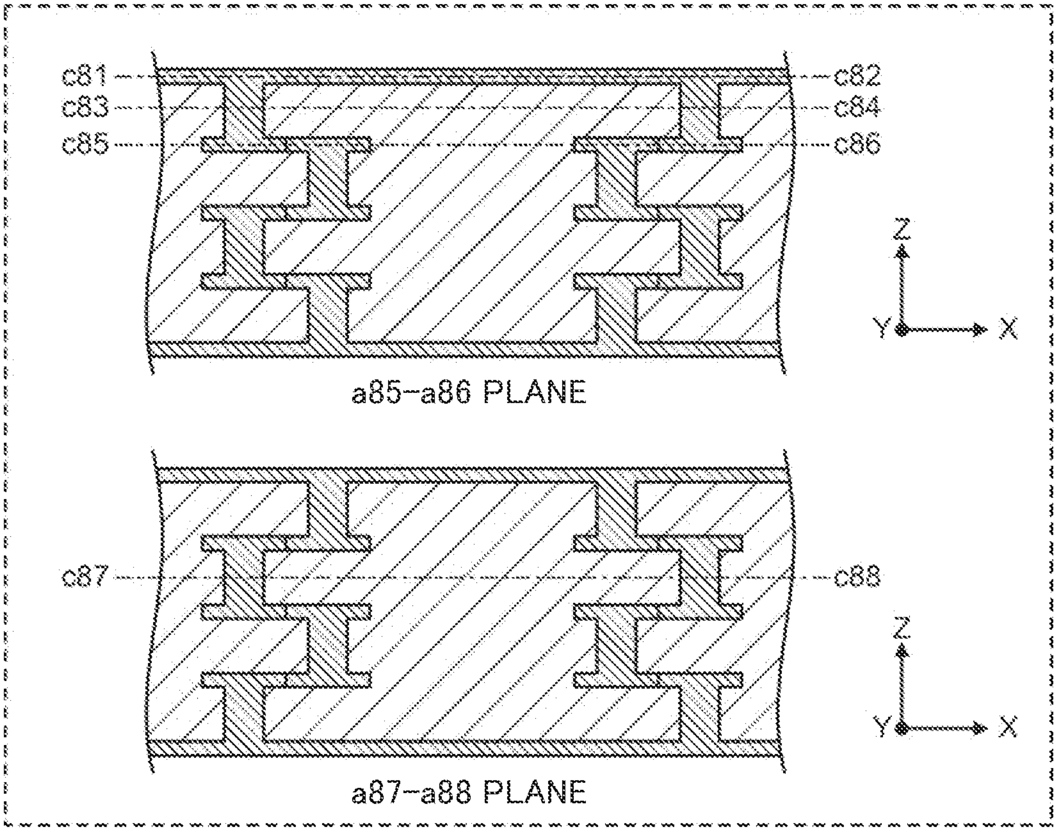
FIG. 8B provides sectional views illustrating the example of the post-wall waveguide according to Embodiment 5 of the present disclosure as viewed in the Y-axis direction.
Figure 8C:
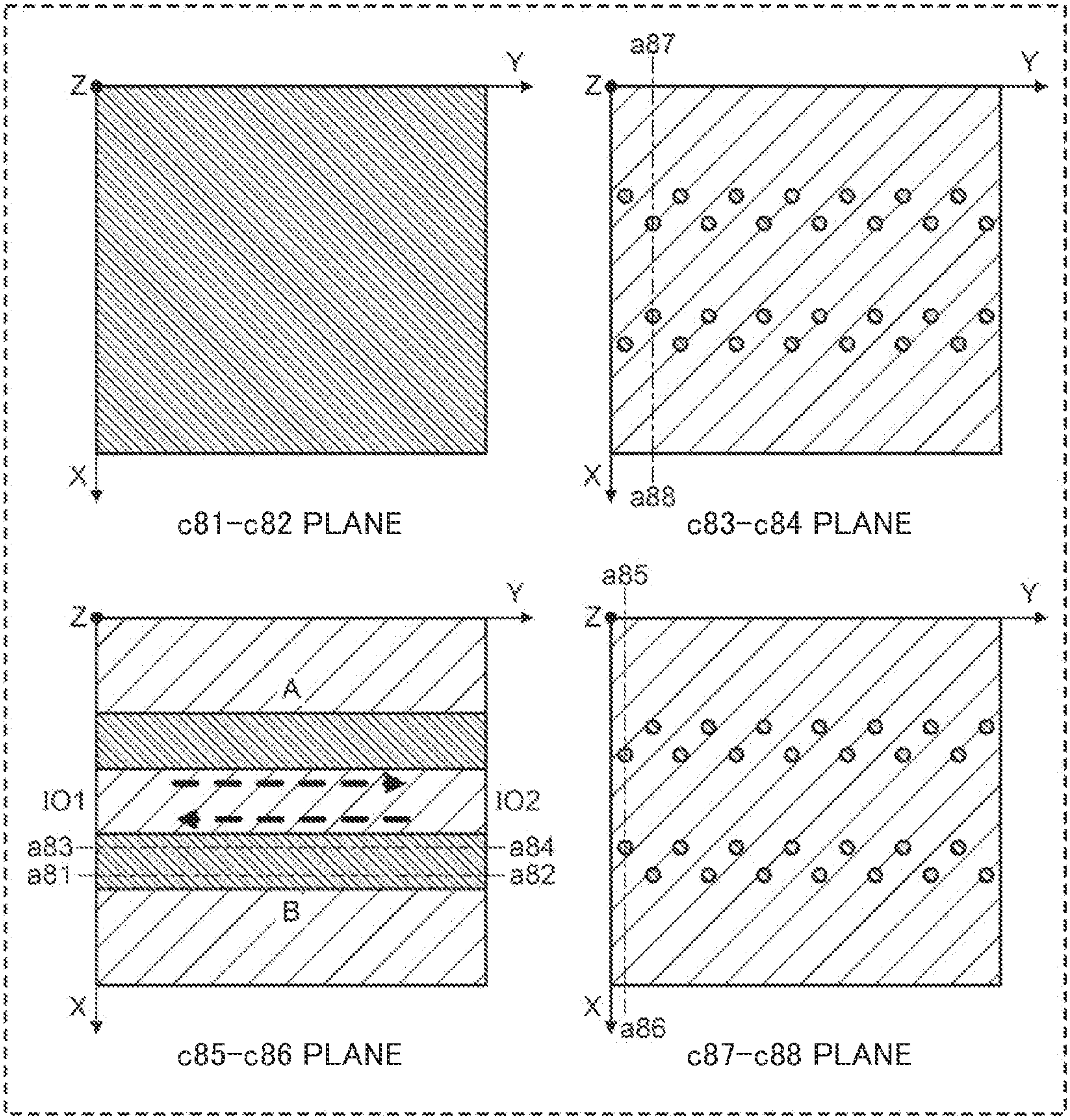
FIG. 8C provides sectional views illustrating the example of the post-wall waveguide according to Embodiment 5 of the present disclosure as viewed in the Z-axis direction.
Figure 8D:
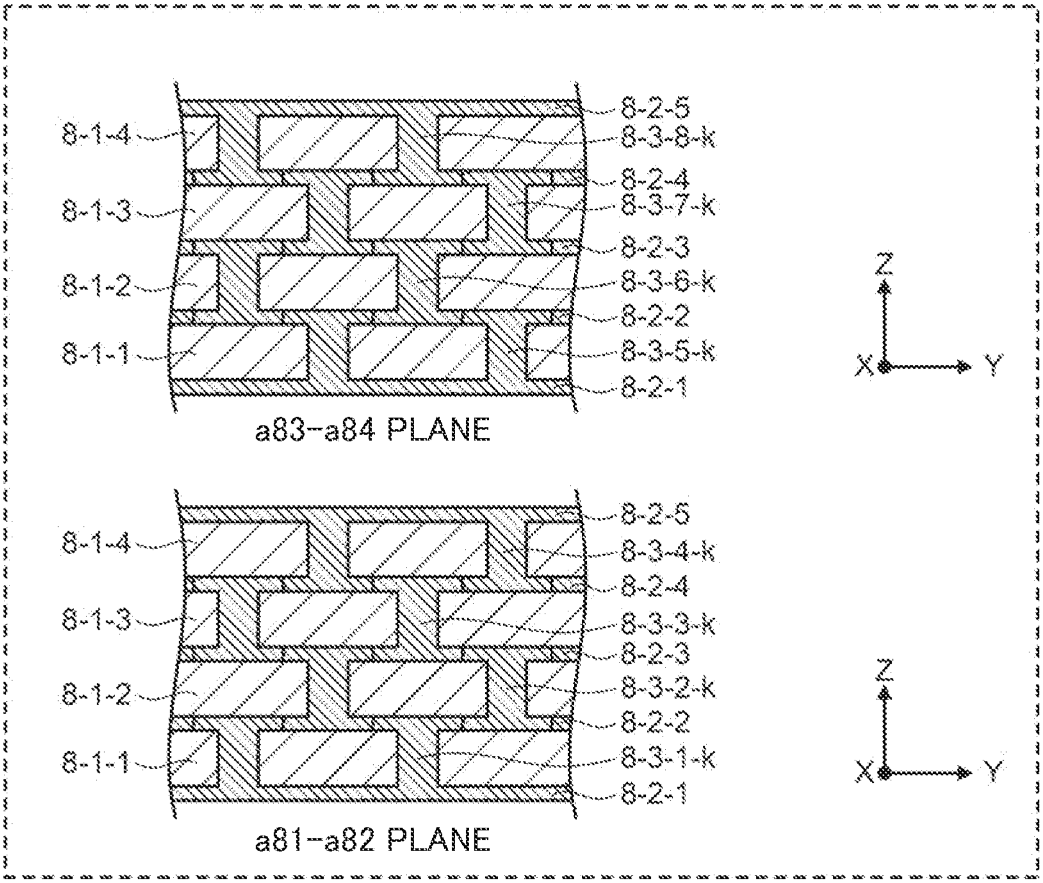
FIG. 8D provides partial sectional views illustrating the example of the post-wall waveguide according to Embodiment 5 of the present disclosure as viewed in the X-axis direction.

FIG. 8A is a perspective view illustrating an example of post-wall waveguide 80 according to Embodiment 5. FIG. 8B provides a sectional view of a85-a86 plane and a sectional view of a87-a88 plane illustrating the example of post-wall waveguide 80 as viewed in the Y-axis direction. FIG. 8C provides a sectional view of c81-c82 plane, a sectional view of c83-c84 plane, a sectional view of c85-c86 plane, and a sectional view of c87-c88 plane illustrating the example of post-wall waveguide 80 as viewed in the Z-axis direction. FIG. 8D provides a partial sectional view of a81-a82 plane and a partial sectional view of a83-a84 plane illustrating the example of post-wall waveguide 80 as viewed in the X-axis direction.

For example, as illustrated in FIG. 8D, post-wall waveguide 80 includes four layers of dielectric layers 8-1-1 to 8-1-4, five layers of conductor layers 8-2-1 to 8-2-5, two sets of vias 8-3-1-*k* to 8-3-4-*k* (k is any integer satisfying 1≤k≤N (N is an integer of 2 or more); in the present embodiment, N=7), and two sets of vias 8-3-5-*k* to 8-3-8-*k* (k is any integer satisfying 1≤k≤N (N is an integer of 2 or more); in the present embodiment, N=7). Post-wall waveguide 80 does not include a via other than the two sets of vias 8-3-1-*k* to 8-3-4-*k* (k is any integer satisfying 1≤k≤N) and the two sets of vias 8-3-5-*k* to 8-3-8-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 8-1-1 to 8-1-4). However, each dielectric layer is in contact with a dielectric layer adjacent thereto when there is no conductor in the conductor layer.

Vias 8-3-1-1 to 8-3-1-N are disposed at equal intervals in a plane perpendicular to the Z-axis, and the same applies to vias 8-3-2-1 to 8-3-2-N, vias 8-3-3-1 to 8-3-3-N, and vias 8-3-4-1 to 8-3-4-N.

Moreover, vias 8-3-5-1 to 8-3-5-N are disposed at equal intervals in a plane perpendicular to the Z-axis, and the same applies to vias 8-3-6-1 to 8-3-6-N, vias 8-3-7-1 to 8-3-7-N, and vias 8-3-8-1 to 8-3-8-N.

Vias 8-3-1-1 to 8-3-1-N and vias 8-3-5-1 to 8-3-5-N electrically connect two conductor layers 8-2-1 and 8-2-2 that are adjacent to each other and formed (stacked) on and under dielectric layer 8-1-1. Vias 8-3-2-1 to 8-3-2-N and vias 8-3-6-1 to 8-3-6-N electrically connect two conductor layers 8-2-2 and 8-2-3 that are adjacent to each other and formed (stacked) on and under dielectric layer 8-1-2. Vias 8-3-3-1 to 8-3-3-N and vias 8-3-7-1 to 8-3-7-N electrically connect two conductor layers 8-2-3 and 8-2-4 that are adjacent to each other and formed (stacked) on and under dielectric layer 8-1-3. Vias 8-3-4-1 to 8-3-4-N and vias 8-3-8-1 to 8-3-8-N electrically connect two conductor layers 8-2-4 and 8-2-5 that are adjacent to each other and formed (stacked) on and under dielectric layer 8-1-4.

The two sets of (vias 8-3-1-1 to 8-3-1-N and vias 8-3-5-1 to 8-3-5-N) are arrayed in parallel, the two sets of (vias 8-3-2-1 to 8-3-2-N and vias 8-3-6-1 to 8-3-6-N) are arrayed in parallel, the two sets of (vias 8-3-3-1 to 8-3-3-N and vias 8-3-7-1 to 8-3-7-N) are arrayed in parallel, and the two sets of (vias 8-3-4-1 to 8-3-4-N and vias 8-3-8-1 to 8-3-8-N) are arrayed in parallel. Moreover, two sets of (vias 8-3-1-*k* to 8-3-4-*k* (k is any integer satisfying 1≤k≤N) and vias 8-3-5-*k* to 8-3-8-*k* (k is any integer satisfying 1≤k≤N)) are also arrayed in parallel.

In the present embodiment, as illustrated in FIG. 8C and FIG. 8D, lowermost conductor layer 8-2-1 and uppermost conductor layer 8-2-5 are solidly disposed over the entire surfaces; however, a lowermost conductor layer and an uppermost conductor layer may be disposed in a region sandwiched between via group A (one set of the two sets of (vias 8-3-1-*k* to 8-3-4-*k* (k is any integer satisfying 1≤k≤N) and (vias 8-3-5-*k* to 8-3-8-*k* (k is any integer satisfying 1≤k≤N)) and via group B (the other set of the two sets of (vias 8-3-1-*k* to 8-3-4-*k* (k is any integer satisfying 1≤k≤N) and vias 8-3-5-*k* to 8-3-8-*k* (k is any integer satisfying 1≤k≤N)).

In the present embodiment, as described above, the linear conductors are disposed in conductor layers 8-2-2 to 8-2-4 (inner layers) on and under the vias, except for lowermost conductor layer 8-2-1 and uppermost conductor layer 8-2-5 (outer layers) (see, for example, the sectional view of c85-c86 plane of FIG. 8C). Also in the present embodiment, in order to suppress leakage of electromagnetic waves, it is desirable to narrow the interval between the vias as much as possible in consideration of the above-described restriction.

In the present embodiment, as illustrated in FIG. 8D and the lower half of the sectional view of c83-c84 plane of FIG. 8C, in a plane perpendicular to the Z-axis direction, vias 8-3-1-*k* to 8-3-4-*k* (k is any integer satisfying 1≤k≤N) are disposed on the outer side in the X-axis direction, whereas vias 8-3-5-*k* to 8-3-8-*k* (k is any integer satisfying 1≤k≤N) are disposed on the inner side in the X-axis direction. For example, vias 8-3-1-*k* to 8-3-4-*k* (k is any integer satisfying 1≤k≤N) and vias 8-3-5-*k* to 8-3-8-*k* (k is any integer satisfying 1≤k≤N) are disposed in two rows. Furthermore, as illustrated in the sectional view of c83-c84 plane and the sectional view of c87-c88 plane of FIG. 8C, the two rows of vias 8-3-1-*k* to 8-3-4-*k* (k is any integer satisfying 1≤k≤N) and vias 8-3-5-*k* to 8-3-8-*k* (k is any integer satisfying 1≤k≤N) are alternately disposed in the first row on the outer side and the second row on the inner side in dielectric layers 8-1-1 to 8-1-4 so that vias 8-3-1-*k* to 8-3-4-*k* do not overlap vias 8-3-5-*k* to 8-3-8-*k* (so as not to form straight lines parallel to the X-axis). More specifically, the two rows of vias 8-3-1-*k* to 8-3-4-*k* (k is any integer satisfying 1≤k≤N) and vias 8-3-5-*k* to 8-3-8-*k* (k is any integer satisfying 1≤k≤N) illustrated in the lower half of the sectional view of c83-c84 plane of FIG. 8C are disposed so that points obtained by projection of the two rows of vias 8-3-1-*k* to 8-3-4-*k* (k is any integer satisfying 1≤k≤N) and vias 8-3-5-*k* to 8-3-8-*k* (k is any integer satisfying 1≤k≤N) on the Y-axis have equal intervals. The same applies to the two rows of vias 8-3-1-*k* to 8-3-4-*k* (k is any integer satisfying 1≤k≤N) and vias 8-3-5-*k* to 8-3-8-*k* (k is any integer satisfying 1≤k≤N) illustrated in the upper half of the sectional view of c3-c4 plane of FIG. 8C. This can suppress leakage of electromagnetic waves.

Also in the present embodiment, with use of the staggered vias, as illustrated in FIG. 8C and FIG. 8D, via 8-3-1-*k* and via 8-3-3-*k* are disposed to be shifted in the positive Y-axis direction with respect to via 8-3-2-*k* and via 8-3-4-*k* when viewed in the Z-axis direction. In contrast, as illustrated in FIG. 8C and FIG. 8D, via 8-3-1-*k* and via 8-3-3-*k* are disposed at the same position when viewed in the Z-axis direction, and via 8-3-2-*k* and via 8-3-4-*k* are disposed at the same position when viewed in the Z-axis direction. The same applies to vias 8-3-5-*k* to 8-3-8-*k*. As illustrated in FIG. 8B and FIG. 8D, the two sets of (vias 8-3-1-*k* to 8-3-4-*k* (k is any integer satisfying 1≤k≤N) and vias 8-3-5-*k* to 8-3-8-*k* (k is any integer satisfying 1≤k≤N)) are not stacked across all of the four layers of dielectric layers 8-1-1 to 8-1-4, and are not stacked across two or more layers of dielectric layers among the four layers of dielectric layers 8-1-1 to 8-1-4. For example, all conductor layers 8-2-1 to 8-2-5 are not electrically connected to each other through vias at the same position when viewed in the Z-axis direction.

As illustrated in FIG. 8C and FIG. 8D, waveguide 80 is constituted of lowermost conductor layer 8-2-1 and uppermost conductor layer 8-2-5 in a central portion, and via group A and via group B. As illustrated in FIG. 8C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of (vias 8-3-1-1 to 8-3-1-N and vias 8-3-5-1 to 8-3-5-N), (vias 8-3-2-1 to 8-3-2-N and vias 8-3-6-1 to 8-3-6-N), (vias 8-3-3-1 to 8-3-3-N and vias 8-3-7-1 to 8-3-7-N), and (vias 8-3-4-1 to 8-3-4-N and vias 8-3-8-1 to 8-3-8-N) are an example of a first via group according to the present disclosure. Vias of the other of the two sets of (vias 8-3-1-1 to 8-3-1-N and vias 8-3-5-1 to 8-3-5-N), (vias 8-3-2-1 to 8-3-2-N and vias 8-3-6-1 to 8-3-6-N), (vias 8-3-3-1 to 8-3-3-N and vias 8-3-7-1 to 8-3-7-N), and (vias 8-3-4-1 to 8-3-4-N and vias 8-3-8-1 to 8-3-8-N) are an example of a second via group according to the present disclosure.

In the present embodiment, all of the two sets of (vias 8-3-1-*k* to 8-3-4-*k* (k is any integer satisfying 1≤k≤N) and vias 8-3-5-*k* to 8-3-8-*k* (k is any integer satisfying 1≤k≤N)) overlap in not all of the four layers of dielectric layers 8-1-1 to 8-1-4 when viewed in the Z-axis direction.

Embodiment 6

In Embodiment 6 of the present disclosure, similarly to Embodiments 4 and 5, a post-wall waveguide is constituted using two rows of staggered vias for the purpose of reducing the radiation loss. In Embodiment 6, however, conductor layers 8-2-2 to 8-2-4 in which the linear conductors are disposed in Embodiment 5 are replaced with conductor layers 9-2-2 to 9-2-4 in which stub-shaped conductors are added to the linear conductors.

Figure 9A:
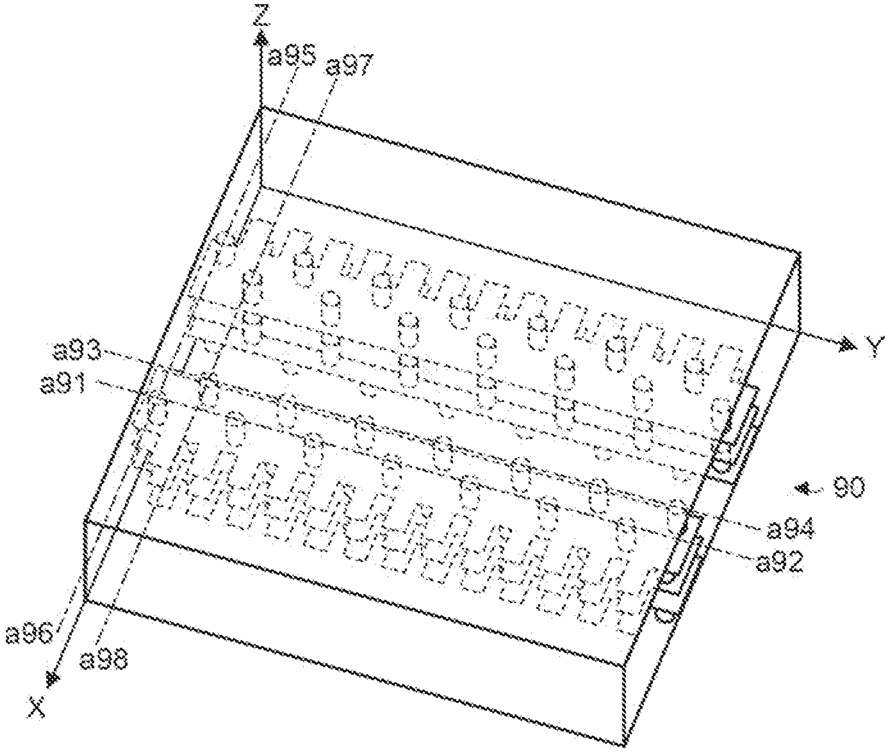
FIG. 9A is a perspective view illustrating an example of a post-wall waveguide according to Embodiment 6 of the present disclosure.
Figure 9B:
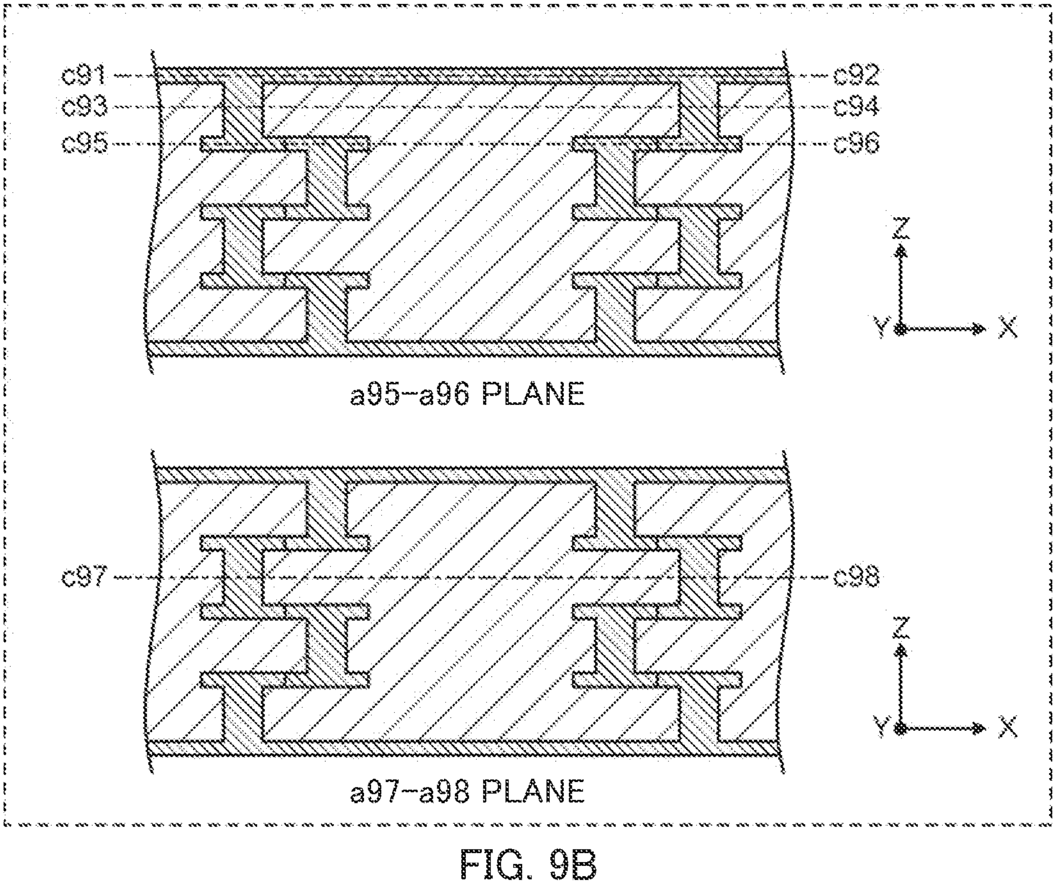
FIG. 9B provides sectional views illustrating the example of the post-wall waveguide according to Embodiment 6 of the present disclosure as viewed in the Y-axis direction.
Figure 9C:
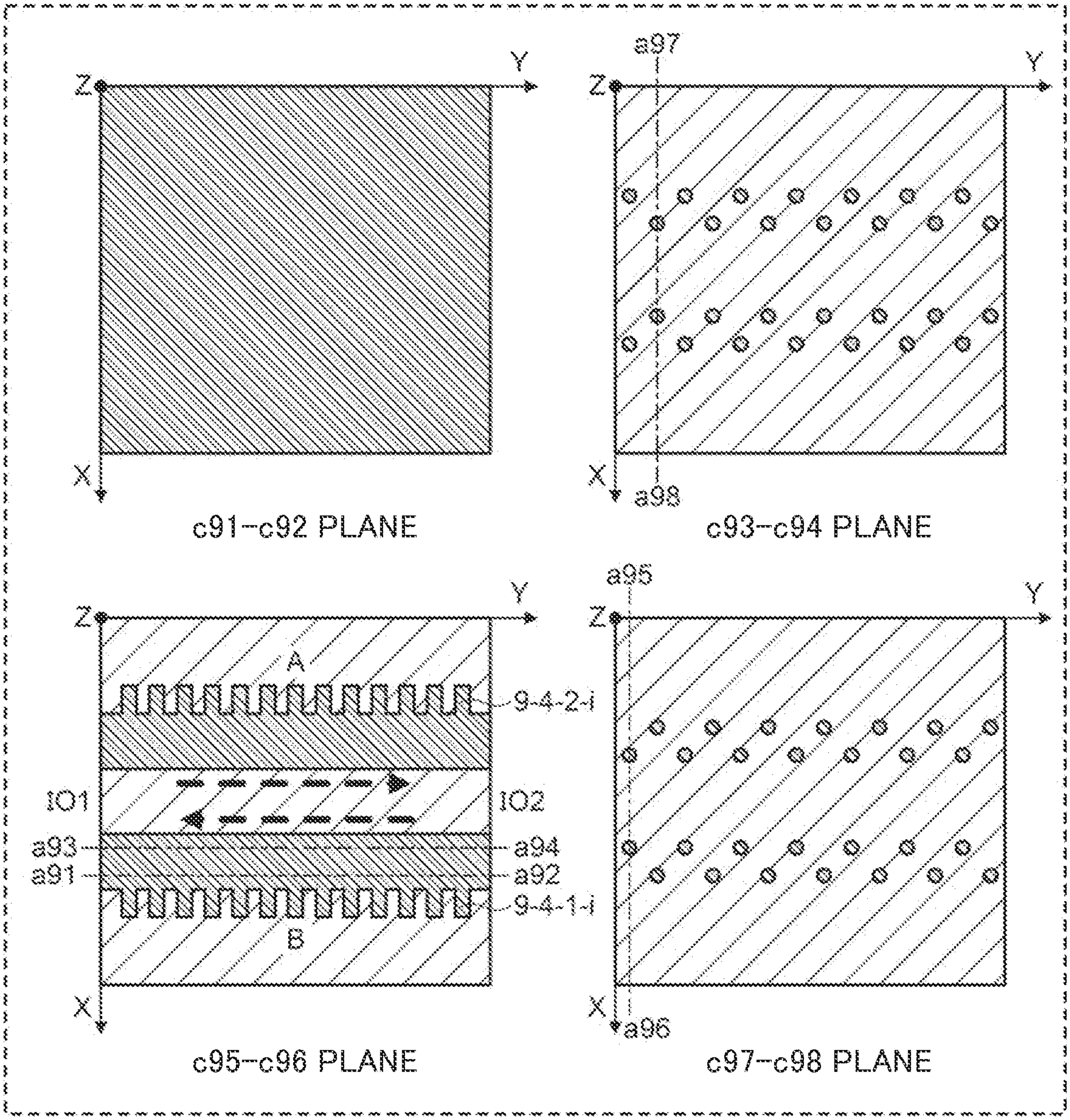
FIG. 9C provides sectional views illustrating the example of the post-wall waveguide according to Embodiment 6 of the present disclosure as viewed in the Z-axis direction.
Figure 9D:
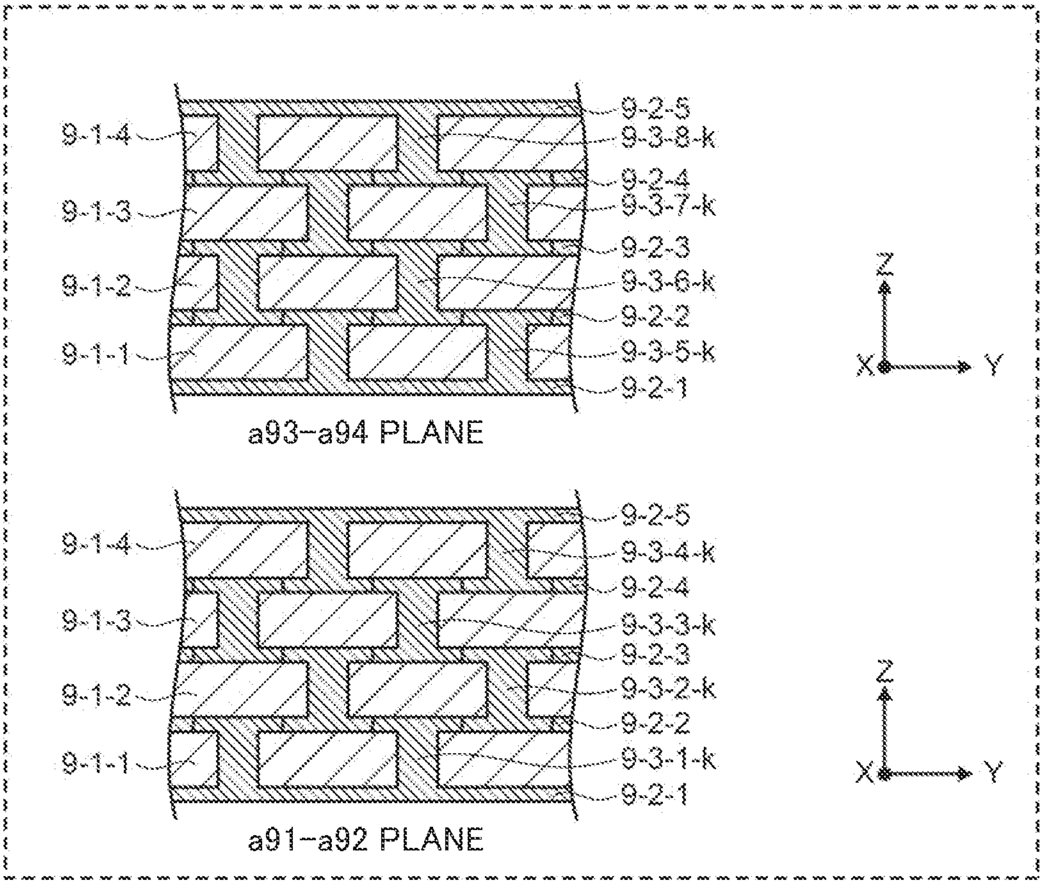
FIG. 9D provides partial sectional views illustrating the example of the post-wall waveguide according to Embodiment 6 of the present disclosure as viewed in the X-axis direction.

FIG. 9A is a perspective view illustrating an example of post-wall waveguide 90 according to Embodiment 6. FIG. 9B provides a sectional view of a95-a96 plane and a sectional view of a97-a98 plane illustrating the example of post-wall waveguide 90 as viewed in the Y-axis direction. FIG. 9C provides a sectional view of c91-c92 plane, a sectional view of c93-c94 plane, a sectional view of c95-c96 plane, and a sectional view of c97-c98 plane illustrating the example of post-wall waveguide 90 as viewed in the Z-axis direction. FIG. 9D provides a partial sectional view of a91-a92 plane and a partial sectional view of a93-a94 plane illustrating the example of post-wall waveguide 90 as viewed in the X-axis direction.

For example, as illustrated in FIG. 9D, post-wall waveguide 90 includes four layers of dielectric layers 9-1-1 to 9-1-4, five layers of conductor layers 9-2-1 to 9-2-5, two sets of vias 9-3-1-*k* to 9-3-4-*k* (k is any integer satisfying 1≤k≤N (N is an integer of 2 or more); in the present embodiment, N=7), two sets of vias 9-3-5-*k* to 9-3-8-*k* (k is any integer satisfying 1≤k≤N (N is an integer of 2 or more); in the present embodiment, N=7), and three sets of stubs 9-4-1-*i* to 9-4-2-*i* (i is any integer satisfying 1≤i≤M (M is an integer of 2 or more); in the present embodiment, M=13). Post-wall waveguide 90 does not include a via other than the two sets of vias 9-3-1-*k* to 9-3-4-*k* (k is any integer satisfying 1≤k≤N) and the two sets of vias 9-3-5-*k* to 9-3-8-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 9-1-1 to 9-1-4). However, each dielectric layer is in contact with a dielectric layer adjacent thereto when there is no conductor in the conductor layer.

Vias 9-3-1-1 to 9-3-1-N are disposed at equal intervals in a plane perpendicular to the Z-axis, and the same applies to vias 9-3-2-1 to 9-3-2-N, vias 9-3-3-1 to 9-3-3-N, and vias 9-3-4-1 to 9-3-4-N.

Moreover, vias 9-3-5-1 to 9-3-5-N are disposed at equal intervals in a plane perpendicular to the Z-axis, and the same applies to vias 9-3-6-1 to 9-3-6-N, vias 9-3-7-1 to 9-3-7-N, and vias 9-3-8-1 to 9-3-8-N.

Vias 9-3-1-1 to 9-3-1-N and vias 9-3-5-1 to 9-3-5-N electrically connect two conductor layers 9-2-1 and 9-2-2 that are adjacent to each other and formed (stacked) on and under dielectric layer 9-1-1. Vias 9-3-2-1 to 9-3-2-N and vias 9-3-6-1 to 9-3-6-N electrically connect two conductor layers 9-2-2 and 9-2-3 that are adjacent to each other and formed (stacked) on and under dielectric layer 9-1-2. Vias 9-3-3-1 to 9-3-3-N and vias 9-3-7-1 to 9-3-7-N electrically connect two conductor layers 9-2-3 and 9-2-4 that are adjacent to each other and formed (stacked) on and under dielectric layer 9-1-3. Vias 9-3-4-1 to 9-3-4-N and vias 9-3-8-1 to 9-3-8-N electrically connect two conductor layers 9-2-4 and 9-2-5 that are adjacent to each other and formed (stacked) on and under dielectric layer 8-1-4.

The two sets of (vias 9-3-1-1 to 9-3-1-N and vias 9-3-5-1 to 9-3-5-N) are arrayed in parallel, the two sets of (vias 9-3-2-1 to 9-3-2-N and vias 9-3-6-1 to 9-3-6-N) are arrayed in parallel, the two sets of (vias 9-3-3-1 to 9-3-3-N and vias 9-3-7-1 to 9-3-7-N) are arrayed in parallel, and the two sets of (vias 9-3-4-1 to 9-3-4-N and vias 9-3-8-1 to 9-3-8-N) are arrayed in parallel. Moreover, two sets of (vias 9-3-1-*k* to 9-3-4-*k* (k is any integer satisfying 1≤k≤N) and vias 9-3-5-*k* to 9-3-8-*k* (k is any integer satisfying 1≤k≤N)) are also arrayed in parallel.

Stubs 9-4-1-1 to 5-4-1-M are disposed at equal intervals in a plane perpendicular to the Z-axis, and the same applies to stubs 9-4-2-1 to 9-4-2-M. For example, stubs 9-4-1-1 to 9-4-1-M are disposed at equal intervals at a linear conductor along the longitudinal direction of the linear conductor, and stubs 9-4-2-1 to 9-4-2-M are disposed at equal intervals at a linear conductor along the longitudinal direction of the linear conductor.

In the present embodiment, as illustrated in FIG. 9C and FIG. 9D, lowermost conductor layer 9-2-1 and uppermost conductor layer 9-2-5 are solidly disposed over the entire surfaces; however, a lowermost conductor layer and an uppermost conductor layer may be disposed in a region sandwiched between via group A (one set of the two sets of (vias 9-3-1-*k* to 9-3-4-*k* (k is any integer satisfying 1≤k≤N) and (vias 9-3-5-*k* to 9-3-8-*k* (k is any integer satisfying 1≤k≤N)) and via group B (the other set of the two sets of (vias 9-3-1-*k* to 9-3-4-*k* (k is any integer satisfying 1≤k≤N) and vias 9-3-5-*k* to 9-3-8-*k* (k is any integer satisfying 1≤k≤N)).

In the present embodiment, as described above, the linear conductors are disposed in conductor layers 9-2-2 to 9-2-4 on and under the vias (for example, see the sectional view of c95-c96 plane of FIG. 9C). Also in the present embodiment, in order to suppress leakage of electromagnetic waves, it is desirable to narrow the interval between the vias as much as possible in consideration of the above-described restriction. In the present embodiment, linear and stub-shaped conductors 9-4-1-*i* to 9-4-2-*i* are further disposed on the outer sides of the waveguide (in the vertical direction of the sectional view of c95-c96 plane of FIG. 9C) from the linear conductors. In order to suppress leakage of electromagnetic waves, the length of the linear stubs is about ¼ of the wavelength of electromagnetic waves to be transmitted through the waveguide. Also in the present embodiment, in order to suppress leakage of electromagnetic waves, it is desirable to narrow the interval between the stubs as much as possible in consideration of the above-described restriction.

In the present embodiment, as illustrated in FIG. 9D and the lower half of the sectional view of c93-c94 plane of FIG. 9C, in a plane perpendicular to the Z-axis direction, vias 9-3-1-*k* to 9-3-4-*k* (k is any integer satisfying 1≤k≤N) are disposed on the outer side in the X-axis direction, whereas vias 9-3-5-*k* to 9-3-8-*k* (k is any integer satisfying 1≤k≤N) are disposed on the inner side in the X-axis direction. For example, vias 9-3-1-*k* to 9-3-4-*k* (k is any integer satisfying 1≤k≤N) and vias 9-3-5-*k* to 9-3-8-*k* (k is any integer satisfying 1≤k≤N) are disposed in two rows. Furthermore, as illustrated in the sectional view of c93-c94 plane and the sectional view of c97-c98 plane of FIG. 9C, the two rows of vias 9-3-1-*k* to 9-3-4-*k* (k is any integer satisfying 1≤k≤N) and vias 9-3-5-*k* to 9-3-8-*k* (k is any integer satisfying 1≤k≤N) are alternately disposed in the first row on the outer side and the second row on the inner side in dielectric layers 9-1-1 to 9-1-4 so that vias 9-3-1-*k* to 9-3-4-*k* do not overlap vias 9-3-5-*k* to 9-3-8-*k* (so as not to form straight lines parallel to the X-axis). More specifically, the two rows of vias 9-3-1-*k* to 9-3-4-*k* (k is any integer satisfying 1≤k≤N) and vias 9-3-5-*k* to 9-3-8-*k* (k is any integer satisfying 1≤k≤N) illustrated in the lower half of the sectional view of c93-c94 plane of FIG. 9C are disposed so that points obtained by projection of the two rows of vias 9-3-1-*k* to 9-3-4-*k* (k is any integer satisfying 1≤k≤N) and vias 9-3-5-*k* to 9-3-8-*k* (k is any integer satisfying 1≤k≤N) on the Y-axis have equal intervals. The same applies to the two rows of vias 9-3-1-*k* to 9-3-4-*k* (k is any integer satisfying 1≤k≤N) and vias 9-3-5-*k* to 9-3-8-*k* (k is any integer satisfying 1≤k≤N) illustrated in the upper half of the sectional view of c93-c94 plane of FIG. 9C. This can suppress leakage of electromagnetic waves.

Also in the present embodiment, with use of the staggered vias, as illustrated in FIG. 9C and FIG. 9D, via 9-3-1-*k* and via 9-3-3-*k* are disposed to be shifted in the positive Y-axis direction with respect to via 9-3-2-*k* and via 9-3-4-*k* when viewed in the Z-axis direction. In contrast, as illustrated in FIG. 9C and FIG. 9D, via 9-3-1-*k* and via 9-3-3-*k* are disposed at the same position when viewed in the Z-axis direction, and via 9-3-2-*k* and via 9-3-4-*k* are disposed at the same position when viewed in the Z-axis direction. The same applies to vias 9-3-5-*k* to 9-3-8-*k*. As illustrated in FIG. 9B and FIG. 9D, the two sets of (vias 9-3-1-*k* to 9-3-4-*k* (k is any integer satisfying 1≤k≤N) and vias 9-3-5-*k* to 9-3-8-*k* (k is any integer satisfying 1≤k≤N)) are not stacked across all of the four layers of dielectric layers 9-1-1 to 9-1-4, and are not stacked across two or more layers of dielectric layers among the four layers of dielectric layers 9-1-1 to 9-1-4. For example, all conductor layers 9-2-1 to 9-2-5 are not electrically connected to each other through vias at the same position when viewed in the Z-axis direction.

As illustrated in FIG. 9C and FIG. 9D, waveguide 90 is constituted of lowermost conductor layer 9-2-1 and uppermost conductor layer 9-2-5 in a central portion, and via group A and via group B. As illustrated in FIG. 9C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of (vias 9-3-1-1 to 9-3-1-N and vias 9-3-5-1 to 9-3-5-N), (vias 9-3-2-1 to 9-3-2-N and vias 9-3-6-1 to 9-3-6-N), (vias 9-3-3-1 to 9-3-3-N and vias 9-3-7-1 to 9-3-7-N), and (vias 9-3-4-1 to 9-3-4-N and vias 9-3-8-1 to 9-3-8-N) are an example of a first via group according to the present disclosure. Vias of the other of the two sets of (vias 9-3-1-1 to 9-3-1-N and vias 9-3-5-1 to 9-3-5-N), (vias 9-3-2-1 to 9-3-2-N and vias 9-3-6-1 to 9-3-6-N), (vias 9-3-3-1 to 9-3-3-N and vias 9-3-7-1 to 9-3-7-N), and (vias 9-3-4-1 to 9-3-4-N and vias 9-3-8-1 to 9-3-8-N) are an example of a second via group according to the present disclosure.

In the present embodiment, all of the two sets of (vias 9-3-1-*k* to 9-3-4-*k* (k is any integer satisfying 1≤k≤N) and vias 9-3-5-*k* to 9-3-8-*k* (k is any integer satisfying 1≤k≤N)) overlap in not all of the four layers of dielectric layers 9-1-1 to 9-1-4 when viewed in the Z-axis direction.

Advantageous Effects of Embodiments 4 to 6

Figure 10:
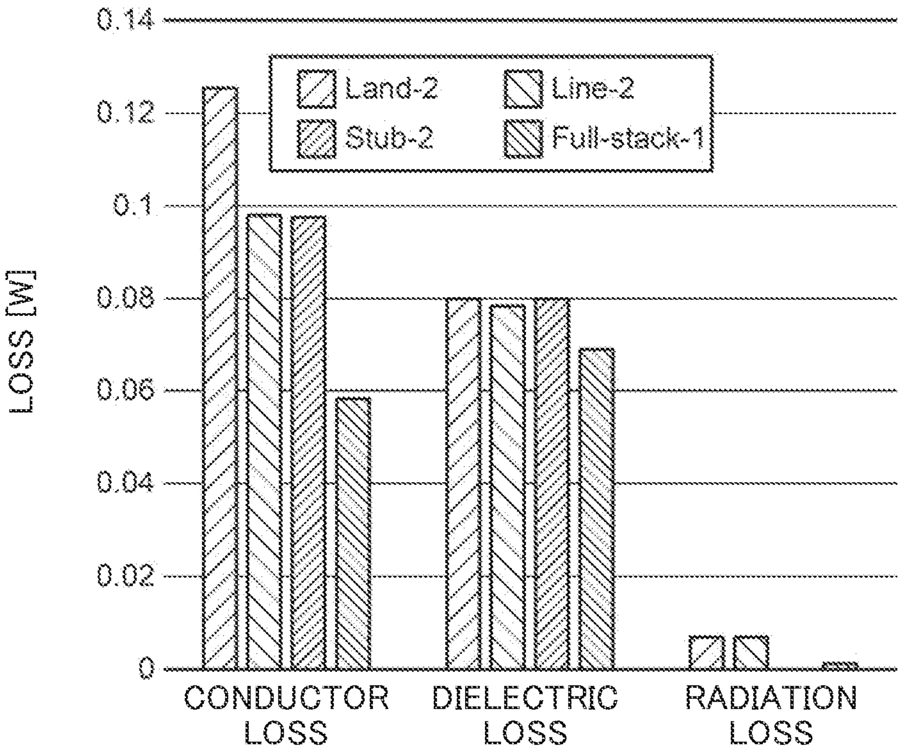
FIG. 10 is a graph presenting an example of simulation results of losses of the post-wall waveguide using the full-stack vias and the post-wall waveguides according to Embodiments 4 to 6.

In FIG. 10, the center-to-center intervals of vias existing in layers adjacent to each other are matched between the configuration of post-wall waveguide 20 having the full-stack configuration and the configurations of post-wall waveguides 70 to 90 according to Embodiments 4 to 6. For example, the center-to-center interval between vias in the same layer of post-wall waveguides 70 to 90 according to Embodiments 4 to 6 is twice the center-to-center interval between vias in the same layer of post-wall waveguide 20 having the full-stack configuration. Thus, in post-wall waveguides 70 to 90 according to Embodiments 4 to 6, electromagnetic waves are likely to be radiated from between the vias; however, by disposition of the vias in two rows, it is possible to suppress the radiation of electromagnetic waves from between the vias.

As described in Embodiments 4 to 6, by disposition of the vias in a staggered manner without stacking the vias, it is possible to reduce the risk of breakage due to thermal expansion and to suppress a decrease in reliability and a deterioration in yield. Moreover, the radiation loss can be reduced by disposition of the vias in two rows.

Referring to the simulation results of losses presented in FIG. 10, it is found that the radiation losses of post-wall waveguides 70 to 90 according to Embodiments 4 to 6 are smaller than those of post-wall waveguides 30 to 50 according to Embodiments 1 to 3 presented in FIG. 6.

When the simulation results of the losses of post-wall waveguides 70 to 90 according to Embodiments 4 to 6 presented in FIG. 10 are compared, it can be confirmed that the radiation loss of post-wall waveguide 90 according to Embodiment 6 is smaller than the radiation loss of post-wall waveguide 70 according to Embodiment 4. For example, by disposition of conductors on and under vias in a stub shape like post-wall waveguide 90 according to Embodiment 6, the radiation loss can be reduced more than in post-wall waveguide 70 according to Embodiment 4. Moreover, it is also found that the conductor losses of post-wall waveguides 80 and 90 according to Embodiments 5 and 6 are smaller than the conductor loss of post-wall waveguide 70 according to Embodiment 4, and it can also be confirmed that the conductor loss is reduced by disposition of the linear or stub-shaped conductors.

Embodiment 7

In Embodiment 7 of the present disclosure, while stack vias are used, full-stacking is avoided by non-connection of vias in some layers, and a post-wall waveguide is constituted by stacking in two or less stages (two or less layers).

Figure 11A:
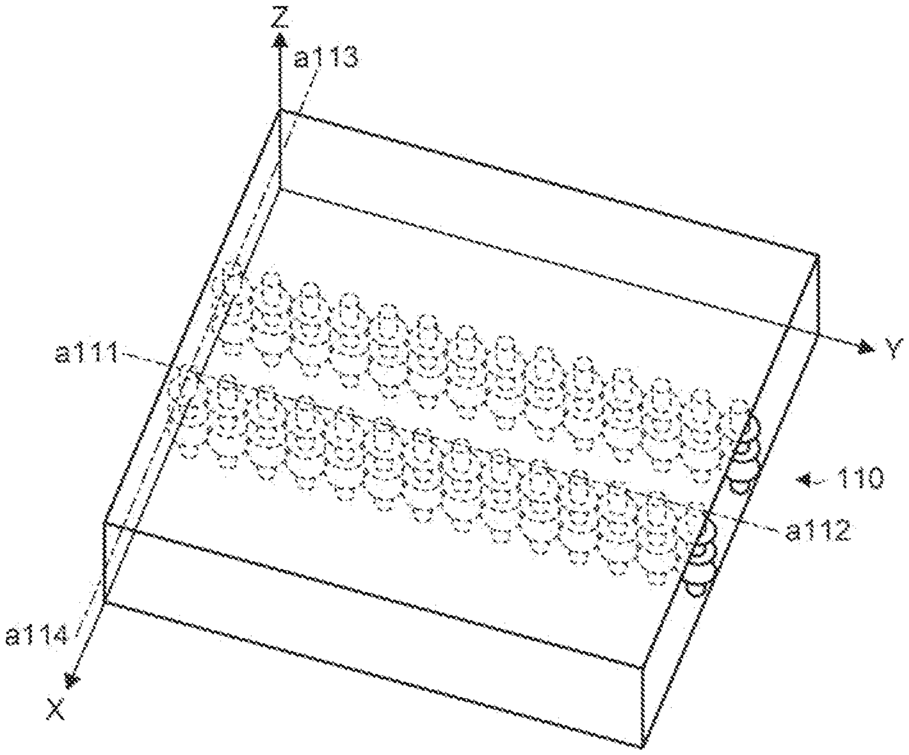
FIG. 11A is a perspective view illustrating an example of a post-wall waveguide according to Embodiment 7 of the present disclosure.
Figure 11B:
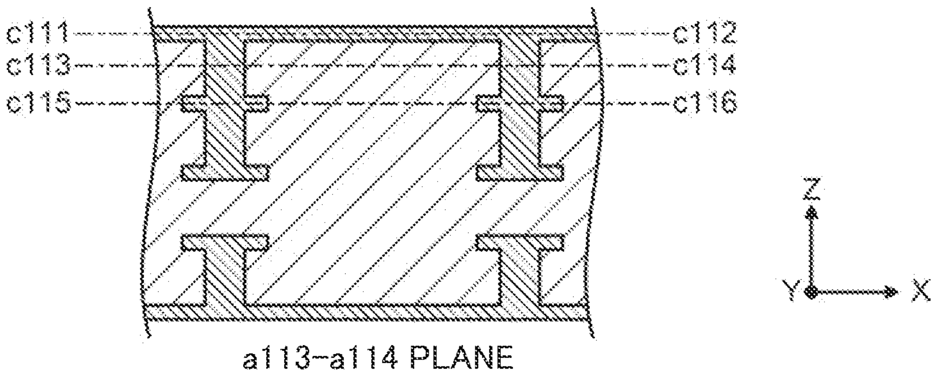
FIG. 11B is a sectional view illustrating the example of the post-wall waveguide according to Embodiment 7 of the present disclosure as viewed in the Y-axis direction.
Figure 11C:
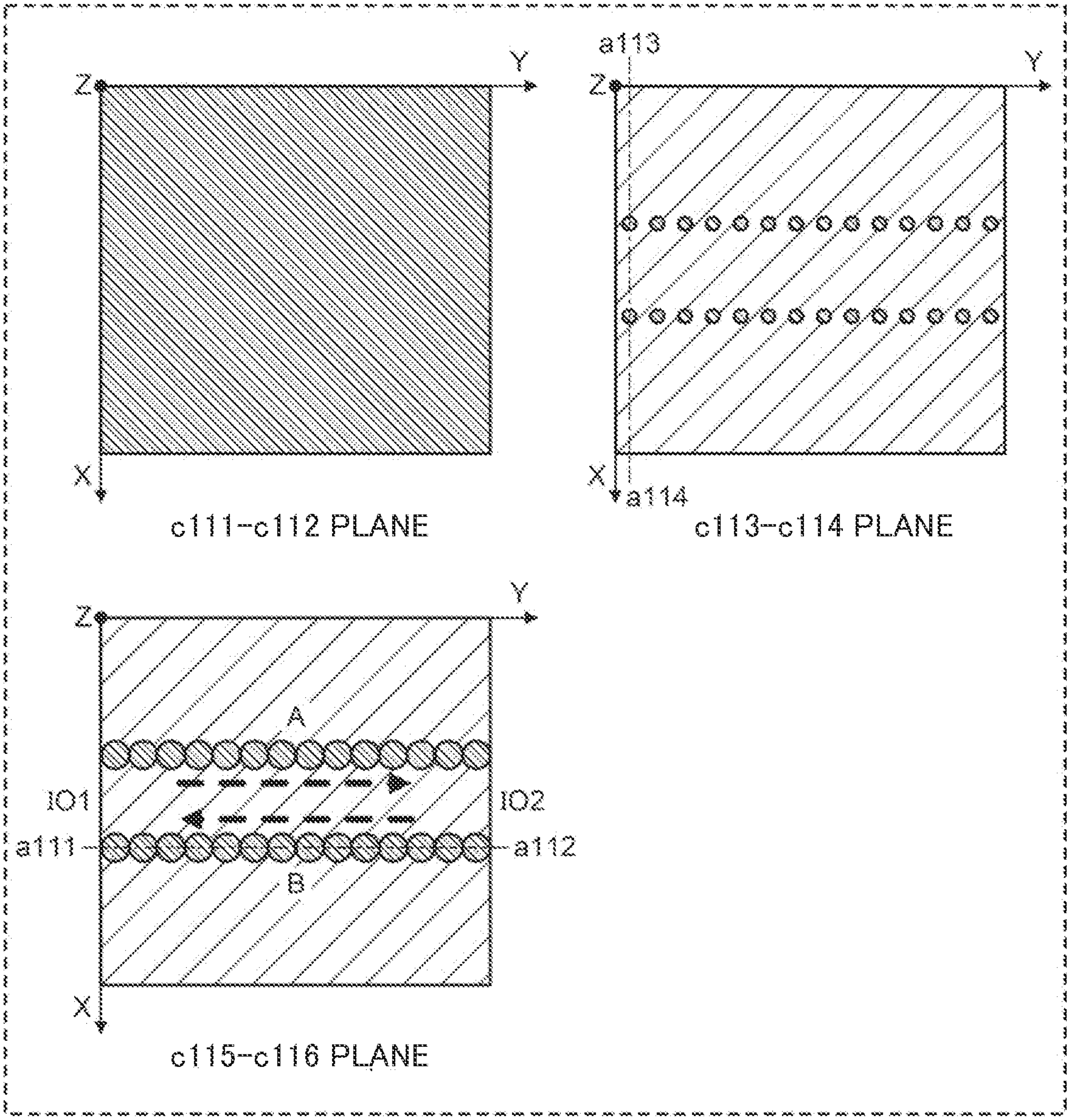
FIG. 11C provides sectional views illustrating the example of the post-wall waveguide according to Embodiment 7 of the present disclosure as viewed in the Z-axis direction.
Figure 11D:
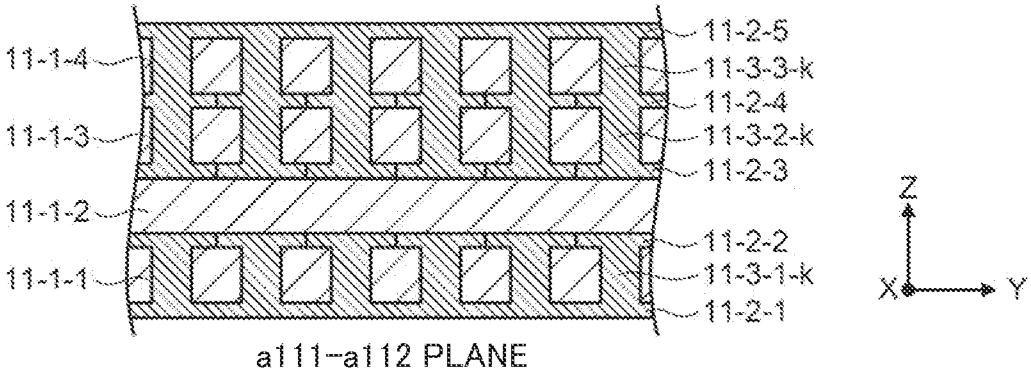
FIG. 11D is a partial sectional view illustrating the example of the post-wall waveguide according to Embodiment 7 of the present disclosure as viewed in the X-axis direction.

FIG. 11A is a perspective view illustrating an example of post-wall waveguide 110 according to Embodiment 7. FIG. 11B is a sectional view of a113-a114 plane illustrating the example of post-wall waveguide 110 as viewed in the Y-axis direction. FIG. 11C provides a sectional view of c111-c112 plane, a sectional view of c113-c114 plane, and a sectional view of c115-c116 plane illustrating the example of post-wall waveguide 110 as viewed in the Z-axis direction. FIG. 11D is a partial sectional view of a111-a112 plane illustrating the example of post-wall waveguide 110 as viewed in the X-axis direction.

For example, as illustrated in FIG. 11D, post-wall waveguide 110 includes four layers of dielectric layers 11-1-1 to 11-1-4, five layers of conductor layers 11-2-1 to 11-2-5, and two sets of vias 11-3-1-*k* to 11-3-3-*k* (k is any integer satisfying 1≤k≤N (N is an integer of 2 or more); in the present embodiment, N=14). Post-wall waveguide 110 does not include a via other than the two sets of vias 11-3-1-*k* to 11-3-3-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 11-1-1 to 11-1-4). However, each dielectric layer is in contact with a dielectric layer adjacent thereto when there is no conductor in the conductor layer.

Vias 11-3-1-1 to 11-3-1-N are disposed at equal intervals in a plane perpendicular to the Z-axis, and the same applies to vias 11-3-2-1 to 11-3-2-N, and vias 11-3-3-1 to 11-3-3-N.

Vias 11-3-1-1 to 11-3-1-N electrically connect two conductor layers 11-2-1 and 11-2-2 that are adjacent to each other and formed (stacked) on and under dielectric layer 11-1-1. Vias 11-3-2-1 to 11-3-2-N electrically connect two conductor layers 11-2-3 and 11-2-4 that are adjacent to each other and formed (stacked) on and under dielectric layer 11-1-3. Vias 11-3-3-1 to 11-3-3-N electrically connect two conductor layers 11-2-4 and 11-2-5 that are adjacent to each other and formed (stacked) on and under dielectric layer 11-1-4.

In the present embodiment, no via is disposed in dielectric layer 11-1-2 in order to avoid full-stacking as described above. This can avoid breakage of vias due to full-stacking.

The two sets of vias 11-3-1-1 to 11-3-1-N are arrayed in parallel, the two sets of vias 11-3-2-1 to 11-3-2-N are arrayed in parallel, and the two sets of vias 11-3-3-1 to 11-3-3-N are arrayed in parallel. Moreover, the two sets of vias 11-3-1-*k* to 11-3-3-*k* (k is any integer satisfying 1≤k≤N) are also arrayed in parallel.

In the present embodiment, as illustrated in FIG. 11C and FIG. 11D, lowermost conductor layer 11-2-1 and uppermost conductor layer 11-2-5 are solidly disposed over the entire surfaces; however, a lowermost conductor layer and an uppermost conductor layer may be disposed in a region sandwiched between via group A (one set of the two sets of vias 11-3-1-*k* to 11-3-3-*k* (k is any integer satisfying 1≤k≤N) and via group B (the other set of the two sets of vias 11-3-1-*k* to 11-3-3-*k* (k is any integer satisfying 1≤k≤N)).

When a via is provided, conductors called via lands each having a circular shape with a radius larger than that of the via based on a design rule may be disposed on and under the via. In the present embodiment, circular via lands are disposed in conductor layers 11-2-2 to 11-2-4 on and under the vias (for example, see the sectional view of c115-c116 plane of FIG. 11C). The via lands of conductor layers 11-2-2 to 11-2-4 may be or may not be connected to via lands adjacent thereto. Also in the present embodiment, in order to suppress leakage of electromagnetic waves, it is desirable to narrow the interval between the vias as much as possible in consideration of the above-described restriction.

In the present embodiment, with use of the stack vias in a portion, as illustrated in FIG. 11C and FIG. 11D, via 11-3-2-*k* and via 11-3-3-*k* are stacked, and via 11-3-1-*k*, via 11-3-2-*k*, and via 11-3-3-*k* are disposed at the same position when viewed in the Z-axis direction. As illustrated in FIG. 11B and FIG. 11D, the two sets of vias 11-3-1-*k* to 11-3-3-*k* (k is any integer satisfying 1≤k≤N) are not stacked across all of the four layers of dielectric layers 11-1-1 to 11-1-4, and are not stacked across three or more dielectric layers among the four layers of dielectric layers 11-1-1 to 11-1-4. For example, all conductor layers 11-2-1 to 11-2-5 are not electrically connected to each other through vias at the same position when viewed in the Z-axis direction.

As illustrated in FIG. 11C and FIG. 11D, waveguide 110 is constituted of lowermost conductor layer 11-2-1 and uppermost conductor layer 11-2-5 in a central portion, and via group A and via group B. As illustrated in FIG. 11C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of vias 11-3-1-1 to 11-3-1-N, vias 11-3-2-1 to 11-3-2-N, and vias 11-3-3-1 to 11-3-3-N are an example of a first via group according to the present disclosure. Vias of the other of the two sets of vias 11-3-1-1 to 11-3-1-N, vias 11-3-2-1 to 11-3-2-N, and vias 11-3-3-1 to 11-3-3-N are an example of a second via group according to the present disclosure.

In the present embodiment, all of the two sets of vias 11-3-1-*k* to 11-3-3-*k* (k is any integer satisfying 1≤k≤N) overlap in not all of the four layers of dielectric layers 11-1-1 to 11-1-4 when viewed in the Z-axis direction.

Note that vias may be omitted in two or more layers. For example, the number of first via groups and the number of second via groups may be smaller than the number of dielectric layers. For example, in the above-described example, the number of the first via groups and the number of the second via groups are three, the number of the dielectric layers is four, and the number of the first via groups and the number of the second via groups are smaller than the number of the dielectric layers.

Embodiment 8

In Embodiment 8 of the present disclosure, while stack vias are used, full-stacking is avoided by non-connection of vias in some layers, and a post-wall waveguide is constituted by stacking in two or less stages (two or less layers). In Embodiment 8, however, conductor layers 11-2-2 to 11-2-4 in which the circular via lands are disposed in Embodiment 7 are replaced with conductor layers 12-2-2 to 12-2-4 in which linear conductors are disposed. Note that conductor layers 12-2-2 to 12-2-4 are inner layers, and conductor layers 12-2-1 and 12-2-5 are outer layers.

Figure 12A:
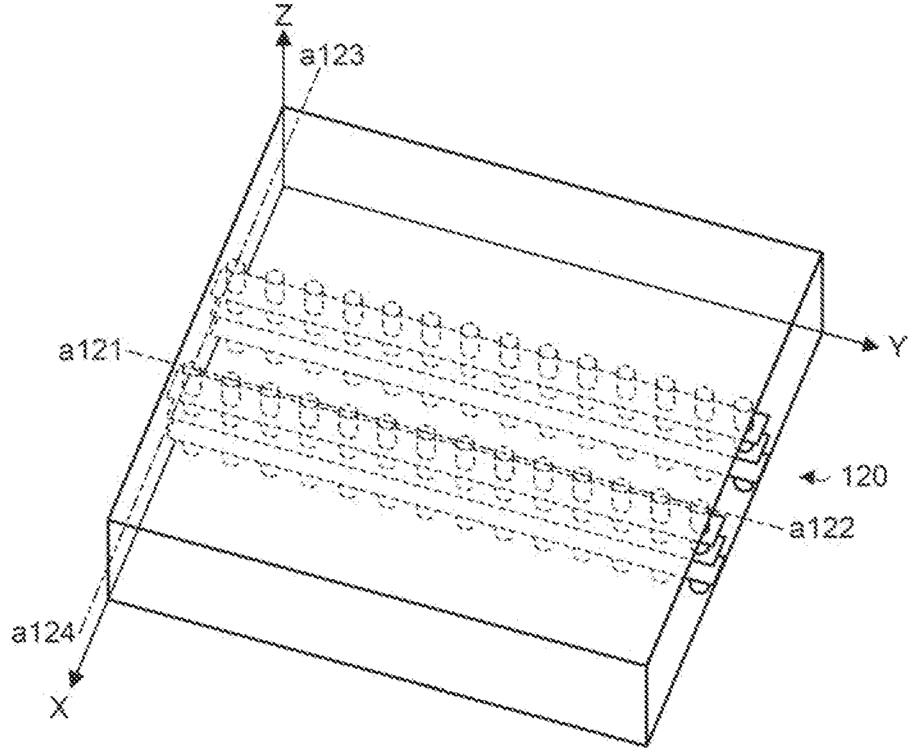
FIG. 12A is a perspective view illustrating an example of a post-wall waveguide according to Embodiment 8 of the present disclosure.
Figure 12B:
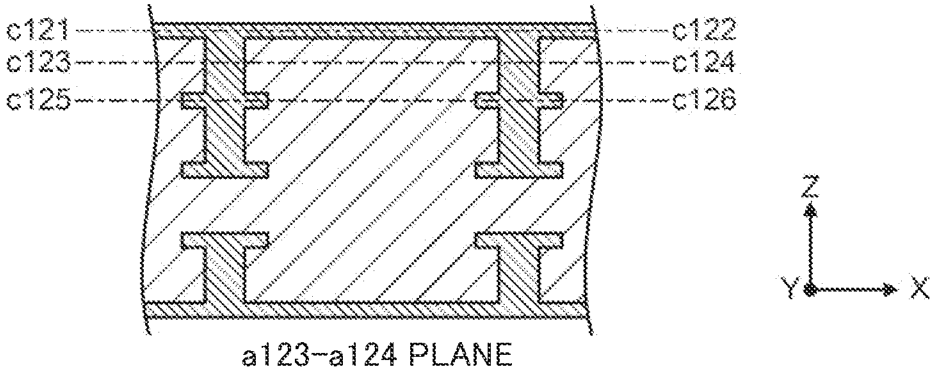
FIG. 12B is a sectional view illustrating the example of the post-wall waveguide according to Embodiment 8 of the present disclosure as viewed in the Y-axis direction.
Figure 12C:
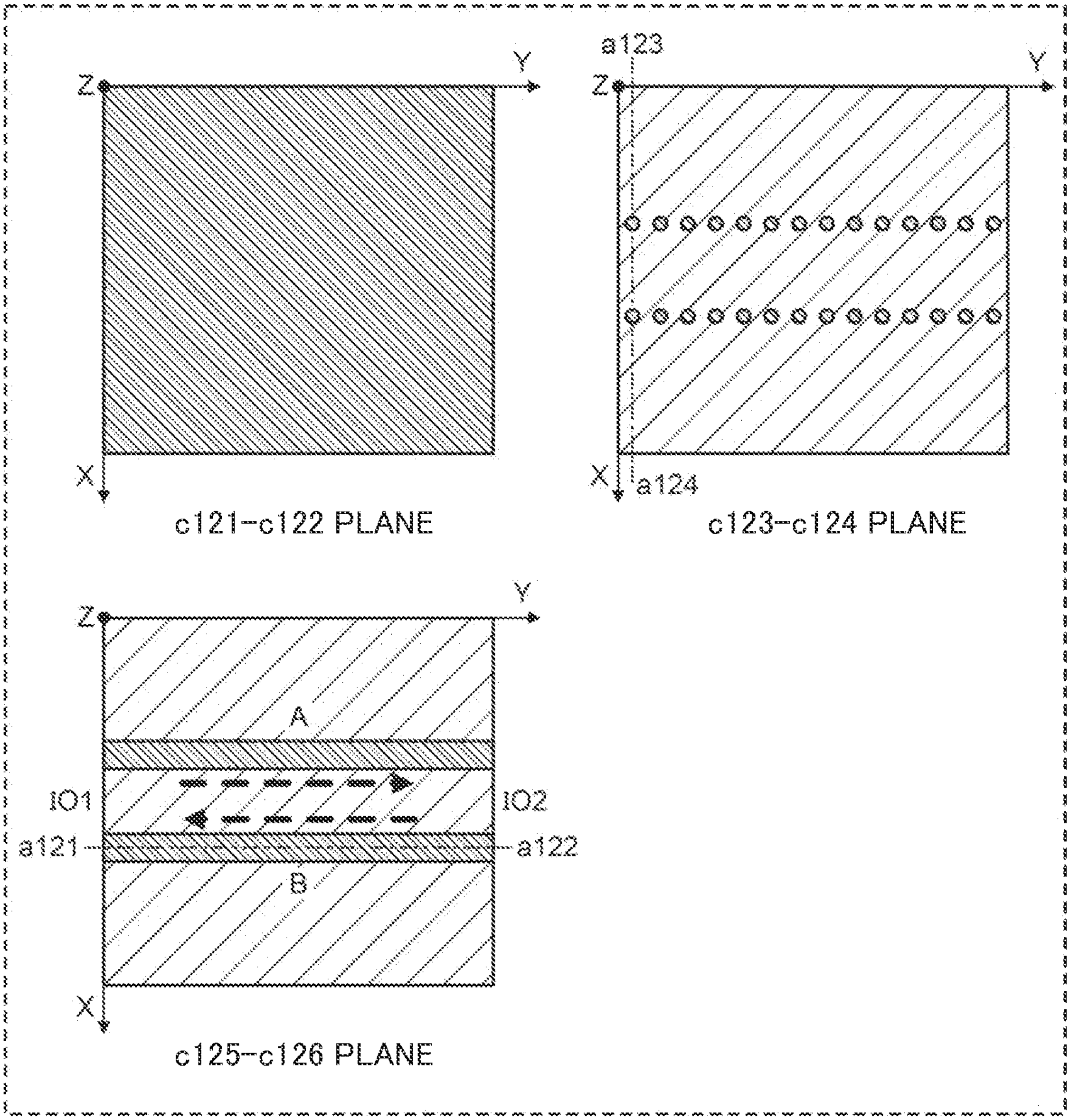
FIG. 12C provides sectional views illustrating the example of the post-wall waveguide according to Embodiment 8 of the present disclosure as viewed in the Z-axis direction.
Figure 12D:
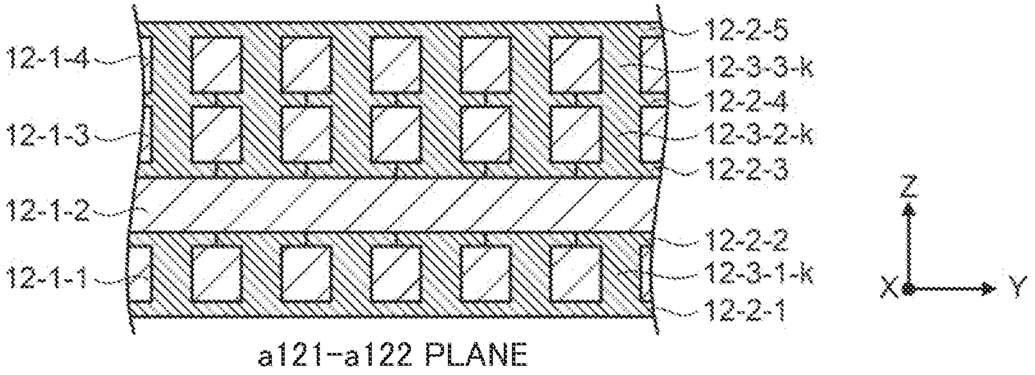
FIG. 12D is a partial sectional view illustrating the example of the post-wall waveguide according to Embodiment 8 of the present disclosure as viewed in the X-axis direction.

FIG. 12A is a perspective view illustrating an example of post-wall waveguide 120 according to Embodiment 8. FIG. 12B is a sectional view of a123-a124 plane illustrating the example of post-wall waveguide 120 as viewed in the Y-axis direction. FIG. 12C provides a sectional view of c121-c122 plane, a sectional view of c123-c124 plane, and a sectional view of c125-c126 plane illustrating the example of post-wall waveguide 120 as viewed in the Z-axis direction. FIG. 12D is a partial sectional view of a121-a122 plane illustrating the example of post-wall waveguide 120 as viewed in the X-axis direction.

For example, as illustrated in FIG. 12D, post-wall waveguide 120 includes four layers of dielectric layers 12-1-1 to 12-1-4, five layers of conductor layers 12-2-1 to 12-2-5, and two sets of vias 12-3-1-*k* to 12-3-3-*k* (k is any integer satisfying 1≤k≤N (N is an integer of 2 or more); in the present embodiment, N=14). Post-wall waveguide 120 does not include a via other than the two sets of vias 12-3-1-*k* to 12-3-3-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 12-1-1 to 12-1-4). However, each dielectric layer is in contact with a dielectric layer adjacent thereto when there is no conductor in the conductor layer.

Vias 12-3-1-1 to 12-3-1-N are disposed at equal intervals in a plane perpendicular to the Z-axis, and the same applies to vias 12-3-2-1 to 12-3-2-N, and vias 12-3-3-1 to 12-3-3-N.

Vias 12-3-1-1 to 12-3-1-N electrically connect two conductor layers 12-2-1 and 12-2-2 that are adjacent to each other and formed (stacked) on and under dielectric layer 12-1-1. Vias 12-3-2-1 to 12-3-2-N electrically connect two conductor layers 12-2-3 and 12-2-4 that are adjacent to each other and formed (stacked) on and under dielectric layer 12-1-3. Vias 12-3-3-1 to 12-3-3-N electrically connect two conductor layers 12-2-4 and 12-2-5 that are adjacent to each other and formed (stacked) on and under dielectric layer 12-1-4.

In the present embodiment, no via is disposed in dielectric layer 12-1-2 in order to avoid full-stacking as described above. This can avoid breakage of vias due to full-stacking.

The two sets of vias 12-3-1-1 to 12-3-1-N are arrayed in parallel, the two sets of vias 12-3-2-1 to 12-3-2-N are arrayed in parallel, and the two sets of vias 12-3-3-1 to 12-3-3-N are arrayed in parallel. Moreover, the two sets of vias 12-3-1-*k* to 12-3-3-*k* (k is any integer satisfying 1≤k≤N) are also arrayed in parallel.

In the present embodiment, as illustrated in FIG. 12C and FIG. 12D, lowermost conductor layer 12-2-1 and uppermost conductor layer 12-2-5 are solidly disposed over the entire surfaces; however, a lowermost conductor layer and an uppermost conductor layer may be disposed in a region sandwiched between via group A (one set of the two sets of vias 12-3-1-*k* to 12-3-3-*k* (k is any integer satisfying 1≤k≤N)) and via group B (the other set of the two sets of vias 12-3-1-*k* to 12-3-3-*k* (k is any integer satisfying 1≤k≤N)).

In the present embodiment, as described above, the linear conductors are disposed in conductor layers 12-2-2 to 12-2-4 (inner layers) on and under the vias, except for lowermost conductor layer 12-2-1 and uppermost conductor layer 12-2-5 (outer layers) (see, for example, the sectional view of c125-c126 plane of FIG. 12C). Also in the present embodiment, in order to suppress leakage of electromagnetic waves, it is desirable to narrow the interval between the vias as much as possible in consideration of the above-described restriction.

In the present embodiment, with use of the stack vias in a portion, as illustrated in FIG. 12C and FIG. 12D, via 12-3-2-*k* and via 12-3-3-*k* are stacked, and via 12-3-1-*k*, via 12-3-2-*k*, and via 12-3-3-*k* are disposed at the same position when viewed in the Z-axis direction. As illustrated in FIG. 12B and FIG. 12D, the two sets of vias 12-3-1-*k* to 12-3-3-*k* (k is any integer satisfying 1≤k≤N) are not stacked across all of the four layers of dielectric layers 12-1-1 to 12-1-4, and are not stacked across three or more dielectric layers among the four layers of dielectric layers 12-1-1 to 12-1-4. For example, all conductor layers 12-2-1 to 12-2-5 are not electrically connected to each other through vias at the same position when viewed in the Z-axis direction.

As illustrated in FIG. 12C and FIG. 12D, waveguide 120 is constituted of lowermost conductor layer 12-2-1 and uppermost conductor layer 12-2-5 in a central portion, and via group A and via group B. As illustrated in FIG. 12C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of vias 12-3-1-1 to 12-3-1-N, vias 12-3-2-1 to 12-3-2-N, and vias 12-3-3-1 to 12-3-3-N are an example of a first via group according to the present disclosure. Vias of the other of the two sets of vias 12-3-1-1 to 12-3-1-N, vias 12-3-2-1 to 12-3-2-N, and vias 12-3-3-1 to 12-3-3-N are an example of a second via group according to the present disclosure.

In the present embodiment, all of the two sets of vias 12-3-1-*k* to 12-3-3-*k* (k is any integer satisfying 1≤k≤N) overlap in not all of the four layers of dielectric layers 12-1-1 to 12-1-4 when viewed in the Z-axis direction.

Note that vias may be omitted in two or more layers. For example, the number of first via groups and the number of second via groups may be smaller than the number of dielectric layers. For example, in the above-described example, the number of the first via groups and the number of the second via groups are three, the number of the dielectric layers is four, and the number of the first via groups and the number of the second via groups are smaller than the number of the dielectric layers.

Embodiment 9

In Embodiment 9 of the present disclosure, while stack vias are used, full-stacking is avoided by non-connection of vias in some layers, and a post-wall waveguide is constituted by stacking in two or less stages (two or less layers). In Embodiment 9, however, conductor layers 12-2-2 to 12-2-3 among conductor layers 12-2-2 to 12-2-4 in which the linear conductors are disposed in Embodiment 8 are replaced with conductor layers 13-2-2 to 13-2-3 in which stub-shaped conductors are added to the linear conductors.

Figure 13A:
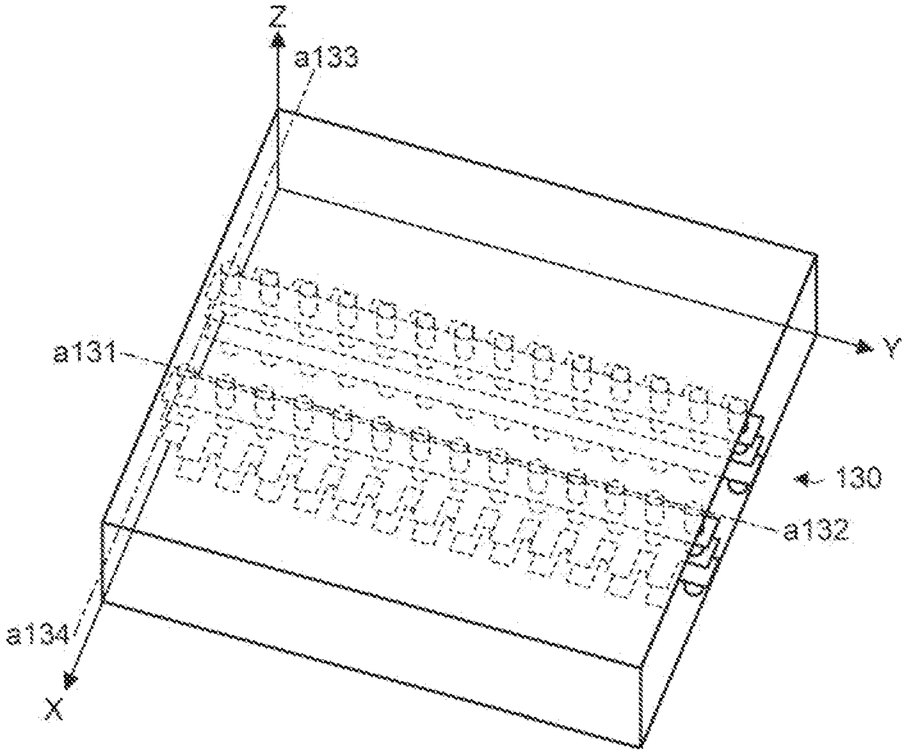
FIG. 13A is a perspective view illustrating an example of a post-wall waveguide according to Embodiment 9 of the present disclosure.
Figure 13B:
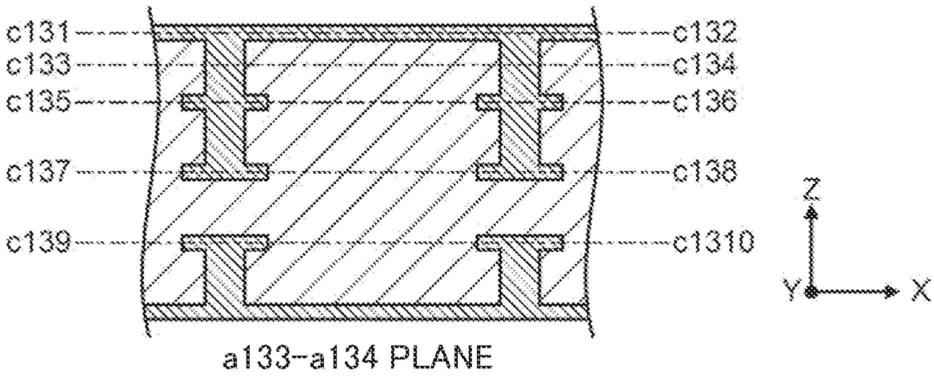
FIG. 13B is a sectional view illustrating the example of the post-wall waveguide according to Embodiment 9 of the present disclosure as viewed in the Y-axis direction.
Figure 13C:
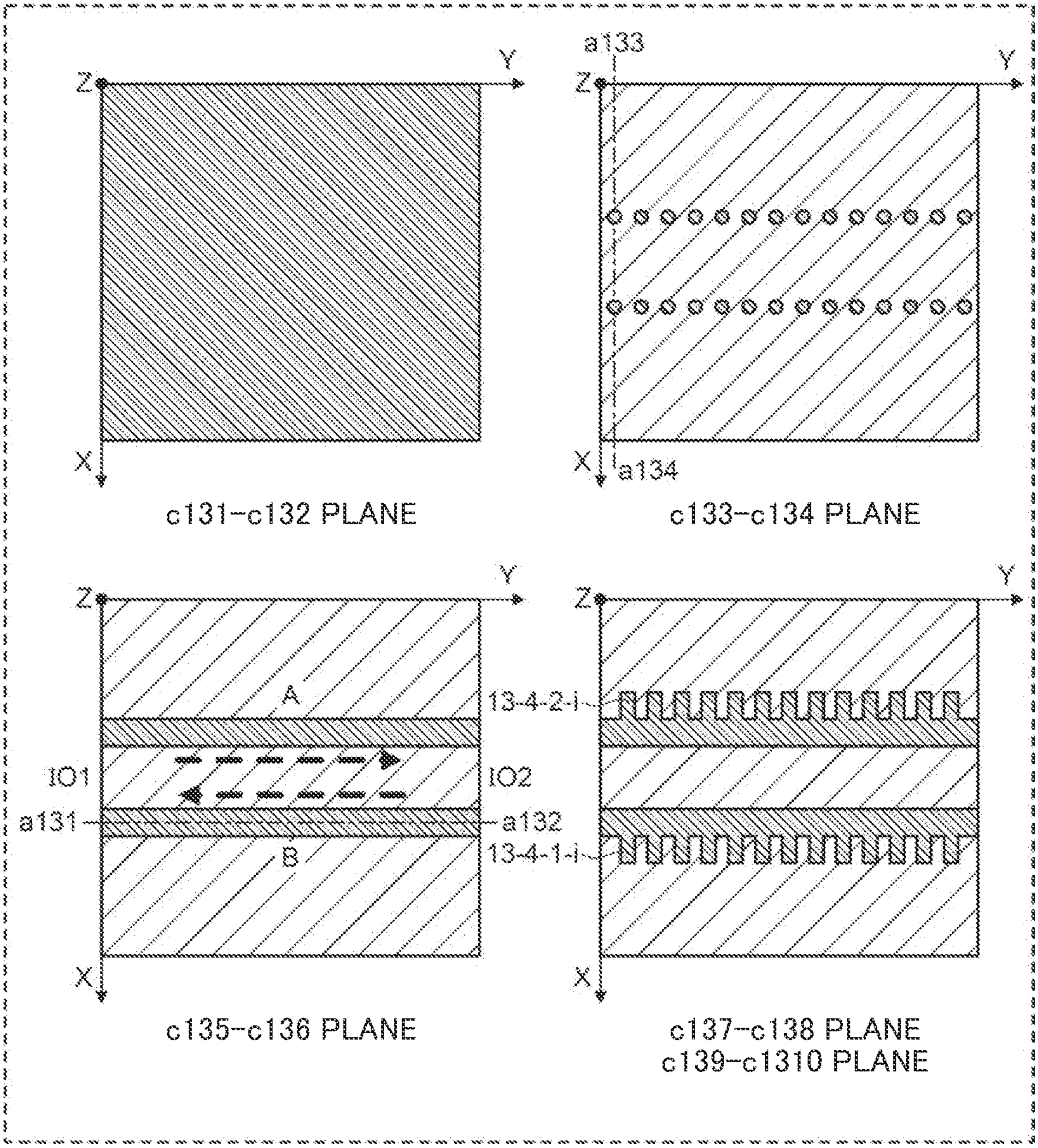
FIG. 13C provides sectional views illustrating the example of the post-wall waveguide according to Embodiment 9 of the present disclosure as viewed in the Z-axis direction.
Figure 13D:
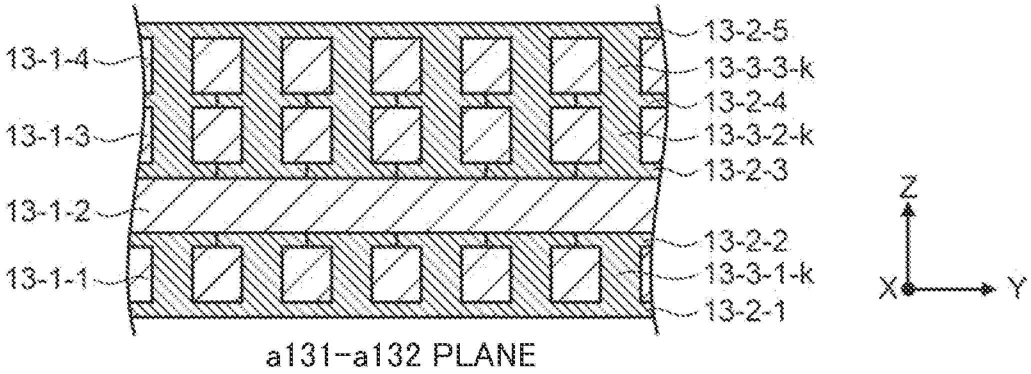
FIG. 13D is a partial sectional view illustrating the example of the post-wall waveguide according to Embodiment 9 of the present disclosure as viewed in the X-axis direction.

FIG. 13A is a perspective view illustrating an example of post-wall waveguide 130 according to Embodiment 9. FIG. 13B is a sectional view of a133-a134 plane illustrating the example of post-wall waveguide 130 as viewed in the Y-axis direction. FIG. 13C provides a sectional view of c131-c132 plane, a sectional view of c133-c134 plane, a sectional view of c135-c136 plane, and a sectional view of c137-c138 plane (c139-c1310 plane) illustrating the example of post-wall waveguide 130 as viewed in the Z-axis direction. FIG. 13D is a partial sectional view of a131-a132 plane illustrating the example of post-wall waveguide 130 as viewed in the X-axis direction.

For example, as illustrated in FIG. 13D, post-wall waveguide 130 includes four layers of dielectric layers 13-1-1 to 13-1-4, five layers of conductor layers 13-2-1 to 13-2-5, two sets of vias 13-3-1-*k* to 13-3-3-*k* (k is any integer satisfying 1≤k≤N (N is an integer of 2 or more); in the present embodiment, N=14), and two sets of stubs 13-4-1-*i* to 13-4-2-*i* (i is any integer satisfying 1≤i≤M (M is an integer of 2 or more); in the present embodiment, M=13). Post-wall waveguide 130 does not include a via other than the two sets of vias 13-3-1-*k* to 13-3-3-*k* (k is any integer satisfying 1≤k≤N).

Each dielectric layer is formed between two conductor layers adjacent to each other in the Z-axis direction (for example, each conductor layer is formed on or under any one dielectric layer among the four layers of dielectric layers 13-1-1 to 13-1-4). However, each dielectric layer is in contact with a dielectric layer adjacent thereto when there is no conductor in the conductor layer.

Vias 13-3-1-1 to 13-3-1-N are disposed at equal intervals in a plane perpendicular to the Z-axis, and the same applies to vias 13-3-2-1 to 13-3-2-N, and vias 13-3-3-1 to 13-3-3-N.

Vias 13-3-1-1 to 13-3-1-N electrically connect two conductor layers 13-2-1 and 13-2-2 that are adjacent to each other and formed (stacked) on and under dielectric layer 13-1-1. Vias 13-3-2-1 to 13-3-2-N electrically connect two conductor layers 13-2-3 and 13-2-4 that are adjacent to each other and formed (stacked) on and under dielectric layer 13-1-3. Vias 13-3-3-1 to 13-3-3-N electrically connect two conductor layers 13-2-4 and 13-2-5 that are adjacent to each other and formed (stacked) on and under dielectric layer 13-1-4.

In the present embodiment, no via is disposed in dielectric layer 13-1-2 in order to avoid full-stacking as described above. This can avoid breakage of vias due to full-stacking.

The two sets of vias 13-3-1-1 to 13-3-1-N are arrayed in parallel, the two sets of vias 13-3-2-1 to 13-3-2-N are arrayed in parallel, and the two sets of vias 13-3-3-1 to 13-3-3-N are arrayed in parallel. Moreover, the two sets of vias 13-3-1-*k* to 13-3-3-*k* (k is any integer satisfying 1≤k≤N) are also arrayed in parallel.

Moreover, stubs 13-4-1-1 to 13-4-1-M are disposed at equal intervals in a plane perpendicular to the Z-axis, and the same applies to stubs 13-4-2-1 to 13-4-2-M. For example, stubs 13-4-1-1 to 13-4-1-M are disposed at equal intervals at a linear conductor along the longitudinal direction of the linear conductor, and stubs 13-4-2-1 to 13-4-2-M are disposed at equal intervals at a linear conductor along the longitudinal direction of the linear conductor.

In the present embodiment, as illustrated in FIG. 13C and FIG. 13D, lowermost conductor layer 13-2-1 and uppermost conductor layer 13-2-5 are solidly disposed over the entire surfaces; however, a lowermost conductor layer and an uppermost conductor layer may be disposed in a region sandwiched between via group A (one set of the two sets of vias 13-3-1-*k* to 13-3-3-*k* (k is any integer satisfying 1≤k≤N)) and via group B (the other set of the two sets of vias 13-3-1-*k* to 13-3-3-*k* (k is any integer satisfying 1≤k≤N)).

In the present embodiment, as described above, the linear conductors are disposed in conductor layers 13-2-2 to 13-2-4 on and under the vias (see, for example, the sectional view of c135-c136 plane and the sectional view of c137-c138 plane (c139-c1310 plane) of FIG. 13C). Also in the present embodiment, in order to suppress leakage of electromagnetic waves, it is desirable to narrow the interval between the vias as much as possible in consideration of the above-described restriction. In the present embodiment, linear and stub-shaped conductors 13-4-1-*i* to 13-4-2-*i* are further disposed on the outer sides of the waveguide (in the vertical direction of the sectional view of c137-c138 plane (c139-c1310 plane) of FIG. 13C) from the linear conductors of conductor layers 13-2-2 to 13-2-3. In order to suppress leakage of electromagnetic waves, the length of the linear stubs is about ¼ of the wavelength of electromagnetic waves to be transmitted through the waveguide. Also in the present embodiment, in order to suppress leakage of electromagnetic waves, it is desirable to narrow the interval between the stubs as much as possible in consideration of the above-described restriction. Note that linear and stub-shaped conductors 13-4-1-*i* to 13-4-2-*i* may be disposed on the outer sides of the waveguide from the linear conductors of conductor layer 13-2-4.

In the present embodiment, stub-shaped conductors 13-4-1-*i* to 13-4-2-*i* can suppress leakage of electromagnetic waves from dielectric layer 13-1-2 in which vias are omitted.

In the present embodiment, with use of the stack vias in a portion, as illustrated in FIG. 13C and FIG. 13D, via 13-3-2-*k* and via 13-3-3-*k* are stacked, and via 13-3-1-*k*, via 13-3-2-*k*, and via 13-3-3-*k* are disposed at the same position when viewed in the Z-axis direction. As illustrated in FIG. 13B and FIG. 13D, the two sets of vias 13-3-1-*k* to 13-3-3-*k* (k is any integer satisfying 1≤k≤N) are not stacked across all of the four layers of dielectric layers 13-1-1 to 13-1-4, and are not stacked across three or more dielectric layers among the four layers of dielectric layers 13-1-1 to 13-1-4. For example, all conductor layers 13-2-1 to 13-2-5 are not electrically connected to each other through vias at the same position when viewed in the Z-axis direction.

As illustrated in FIG. 13C and FIG. 13D, waveguide 130 is constituted of lowermost conductor layer 13-2-1 and uppermost conductor layer 13-2-5 in a central portion, and via group A and via group B. As illustrated in FIG. 13C, when high-frequency electromagnetic waves are input from IO1, the electromagnetic waves propagate in the region sandwiched between via group A and via group B as indicated by an arrow and are output to IO2, and when electromagnetic waves are input from IO2, the electromagnetic waves propagate in the region sandwiched between via group A and via group B as indicated by an arrow and are output to IO1. Via group A and via group B function as conductor walls for electromagnetic waves (form conductor walls for electromagnetic waves).

Vias of one of the two sets of vias 13-3-1-1 to 13-3-1-N, vias 13-3-2-1 to 13-3-2-N, and vias 13-3-3-1 to 13-3-3-N are an example of a first via group according to the present disclosure. Vias of the other of the two sets of vias 13-3-1-1 to 13-3-1-N, vias 13-3-2-1 to 13-3-2-N, and vias 13-3-3-1 to 13-3-3-N are an example of a second via group according to the present disclosure.

In the present embodiment, all of the two sets of vias 13-3-1-*k* to 13-3-3-*k* (k is any integer satisfying 1≤k≤N) overlap in not all of the four layers of dielectric layers 13-1-1 to 13-1-4 when viewed in the Z-axis direction.

Note that vias may be omitted in two or more layers. For example, the number of first via groups and the number of second via groups may be smaller than the number of dielectric layers. For example, in the above-described example, the number of the first via groups and the number of the second via groups are three, the number of the dielectric layers is four, and the number of the first via groups and the number of the second via groups are smaller than the number of the dielectric layers.

Advantageous Effects of Embodiments 7 to 9

Figure 14:
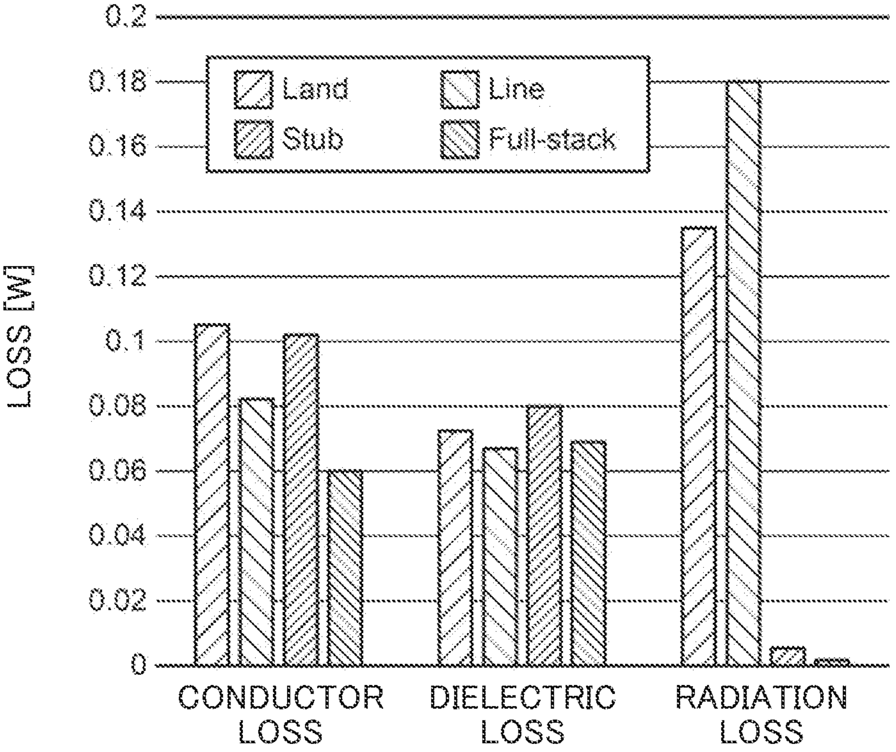
FIG. 14 is a graph presenting an example of simulation results of losses of the post-wall waveguide using the full-stack vias and the post-wall waveguides according to Embodiments 7 to 9.

In FIG. 14, the center-to-center intervals of vias are matched between the configuration of post-wall waveguide 20 having the full-stack configuration illustrated in FIG. 2A to FIG. 2D and the configurations of post-wall waveguides 110 to 130 according to Embodiments 7 to 9.

As described in Embodiments 7 to 9, by omitting vias of one layer to avoid full-stacking, it is possible to reduce the risk of breakage due to thermal expansion and to suppress a decrease in reliability and a deterioration in yield. Moreover, by omission of vias of one layer, coming off of the substrate can be suppressed. Furthermore, the radiation loss can be reduced by disposition of stubs at upper and lower conductors of the layer in which the vias are omitted.

Referring to the simulation results of losses of Land (post-wall waveguide 110), Line (post-wall waveguide 120), and Full-Stack (post-wall waveguide 20 having the full-stack configuration) presented in FIG. 14, it is found that the radiation losses of Land and Line are large. This is because the vias of one layer are omitted. In contrast, according to the simulation results of losses of Stub (post-wall waveguide 130) and Full-stack presented in FIG. 14, the radiation losses of both are at the same level. This is because the stubs are disposed in the upper and lower conductors of the layer in which the vias are omitted like post-wall waveguide 130 according to Embodiment 9. As described above, it is found that the loss of post-wall waveguide 130 according to Embodiment 9 can be suppressed to the same level as that of post-wall waveguide 20 having the full-stack configuration. For example, in post-wall waveguide 130 according to Embodiment 9, it can be said that the risk of breakage of the vias due to full-stacking can be reduced and the loss characteristic equivalent to that of the post-wall waveguide having the full-stack configuration can be obtained by omission of the vias and disposition of the stubs.

Modification of Embodiment 9

Modification 1

Figure 15:
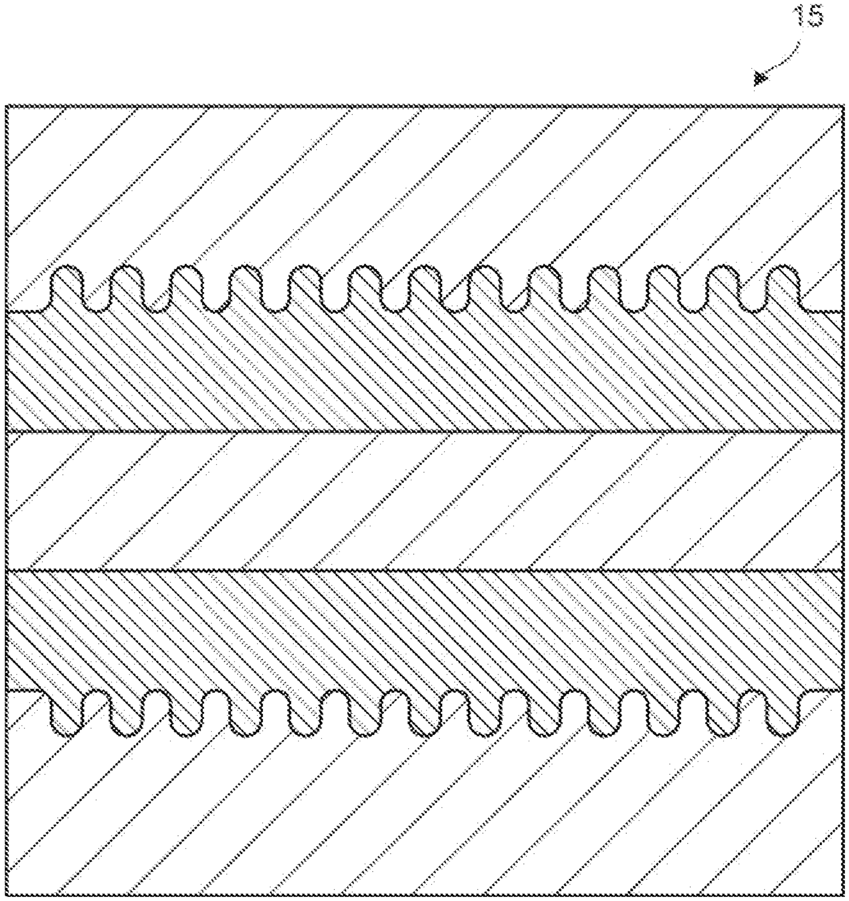
FIG. 15 is a view illustrating a configuration example in which the shape of stubs of Embodiment 9 is changed.

As illustrated in FIG. 15, Configuration Example 15 has a configuration in which corner portions of distal ends of stub-shaped conductors 13-4-1-*i* to 13-4-2-*i* according to Embodiment 9 are rounded. Since the shape of the stubs is changed in this way, the conductor loss and the radiation loss can be further reduced. Moreover, since a portion connected to the linear conductor is made smooth (for example, rounded), the conductor loss can be reduced. Alternatively, the stub may be formed in a trapezoidal shape, and a portion connected to the linear conductor may be oblique.

Modification 2

FIG. 16A to FIG. 16D illustrate an example of post-wall waveguide 160 in which the stubs of Embodiment 9 are changed to electromagnetic band gaps (EBGs). The EBGs have a mushroom shape.

Figure 16A:
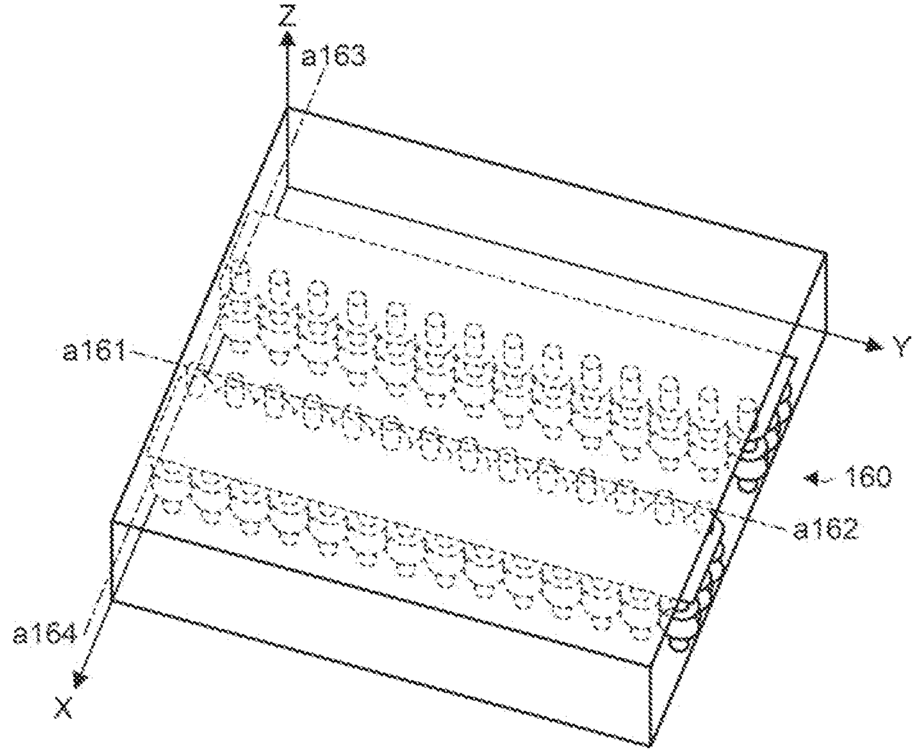
FIG. 16A is a perspective view illustrating an example of a post-wall waveguide with the stubs of Embodiment 9 changed to EBGs.
Figure 16B:
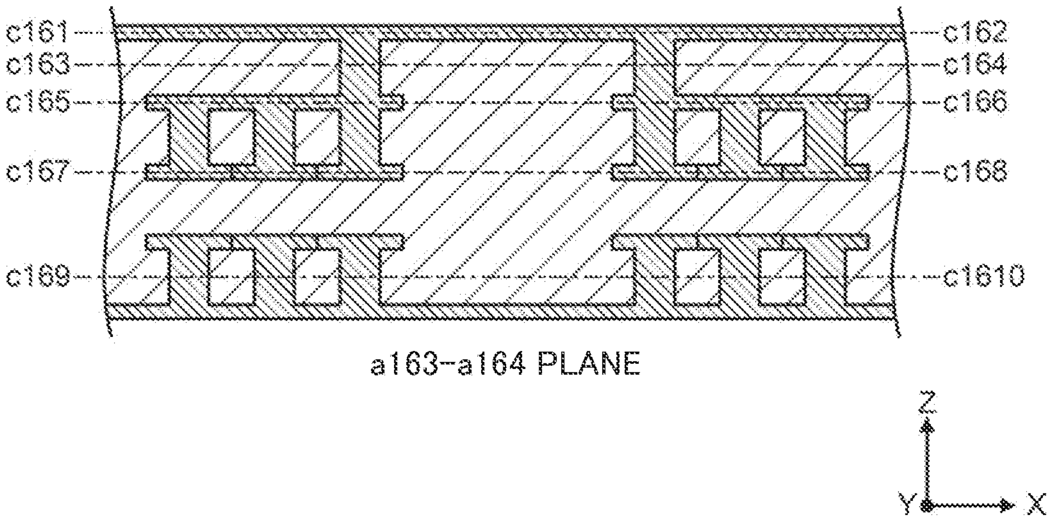
FIG. 16B is a sectional view illustrating the example of the post-wall waveguide with the stubs of Embodiment 9 changed to the EBGs as viewed in the Y-axis direction.
Figure 16C:
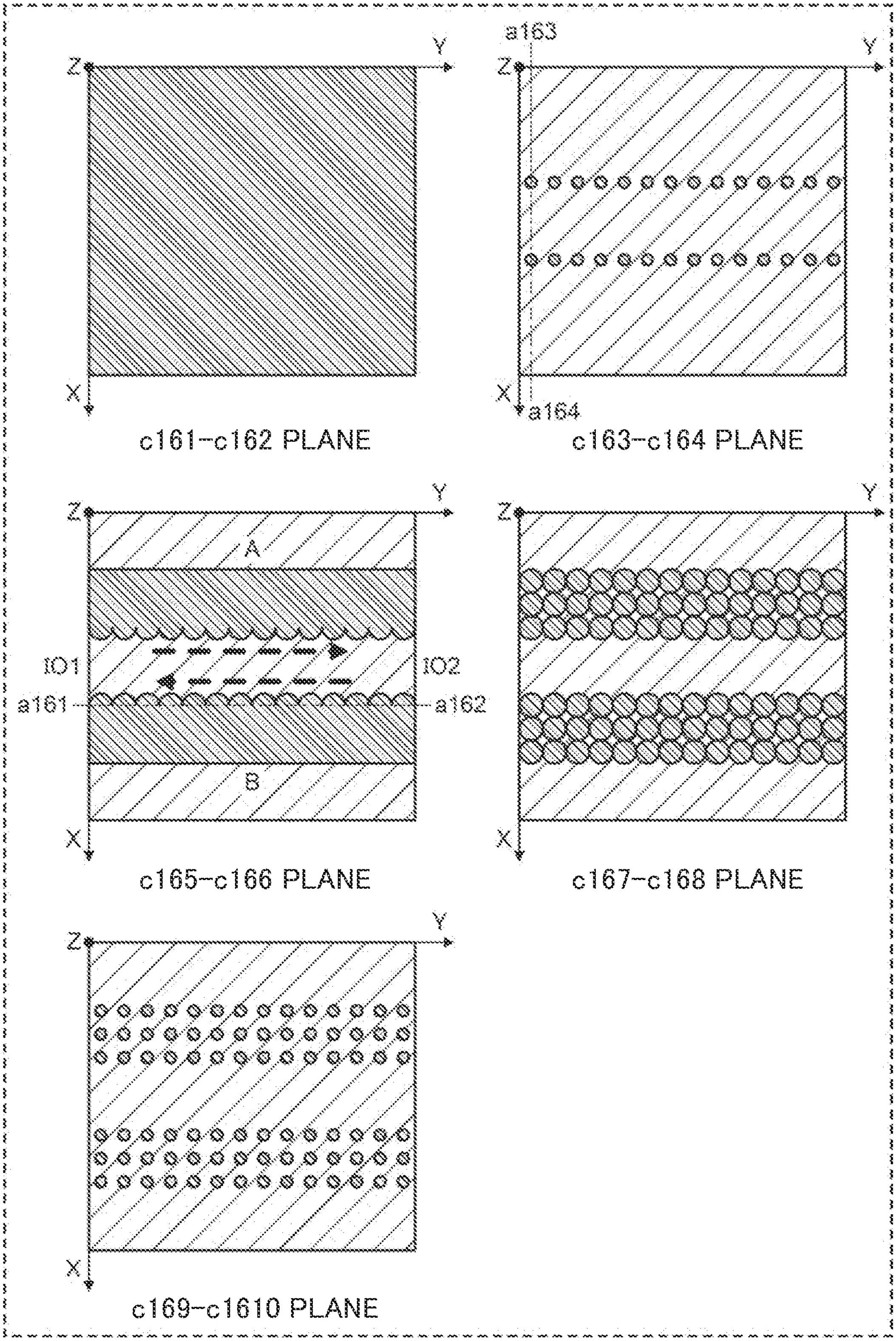
FIG. 16C provides sectional views illustrating the example of the post-wall waveguide with the stubs of Embodiment 9 changed to the EBGs as viewed in the Z-axis direction.
Figure 16D:
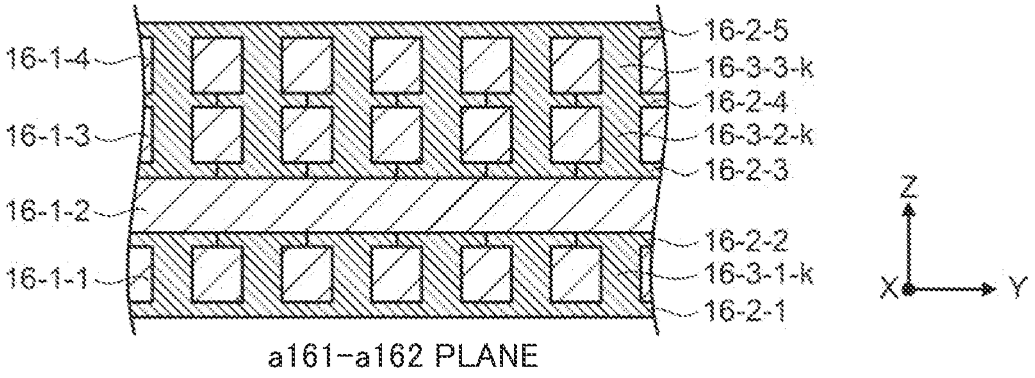
FIG. 16D is a partial sectional view illustrating the example of the post-wall waveguide with the stubs of Embodiment 9 changed to the EBGs as viewed in the X-axis direction.

FIG. 16A is a perspective view illustrating the example of post-wall waveguide 160 according to Modification 2. FIG. 16B is a sectional view of a163-a164 plane illustrating the example of post-wall waveguide 160 as viewed in the Y-axis direction. FIG. 16C provides a sectional view of c161-c162 plane, a sectional view of c163-c164 plane, a sectional view of c165-c166 plane, a sectional view of c167-c168 plane, and a sectional view of c169-c1610 plane illustrating the example of post-wall waveguide 160 as viewed in the Z-axis direction. FIG. 16D is a partial sectional view of a161-a162 plane illustrating the example of post-wall waveguide 160 as viewed in the X-axis direction.

In the present modification, the four layers of dielectric layers 13-1-1 to 13-1-4 in Embodiment 9 are replaced with four layers of dielectric layers 16-1-1 to 16-1-4, respectively, and the five layers of conductor layers 13-2-1 to 13-2-5 in Embodiment 9 are replaced with five layers of conductor layers 16-2-1 to 16-2-5, respectively. Moreover, in the present modification, the two sets of vias 13-3-1-*k* to 13-3-3-*k* (k is any integer satisfying 1≤k≤N) in Embodiment 9 are replaced with two sets of vias 16-3-1-*k* to 16-3-3-*k* (k is any integer satisfying 1≤k≤N), respectively.

In the present modification, instead of the two sets of stubs 13-4-1-*i* to 13-4-2-*i* in Embodiment 9, one or more rows of mushroom-shaped EBGs may be disposed along post-wall waveguide 160 as illustrated in FIG. 16C. By disposition of the EBGs in this way, radiation of electromagnetic waves can be suppressed, and the radiation loss can be reduced.

Further Modifications

Although the dielectric layer is used in the above-described embodiments, a semiconductor layer may be used instead of the dielectric layer.

In the above-described embodiments, the example in which the number of dielectric layers is four and the number of conductor layers is five has been described; however, the number of dielectric layers may be any number of two or more, and the number of conductor layers may be any number of three or more.

In the above-described embodiments, the example in which the vias and the stubs are disposed at equal intervals has been described; however, the vias and the stubs may be disposed at unequal intervals. For example, in a bend portion, the interval between the vias may be eased (increased).

In Embodiments 1 to 3 described above, the example in which the number of vias formed in each dielectric layer is the same has been described; however, the number of vias formed in each dielectric layer may be the same or different.

Moreover, in Embodiments 1 to 3 described above, the number of vias formed in each dielectric layer included in via group A constituting the conductor wall and the number of vias formed in each dielectric layer included in via group B constituting the conductor wall may be the same or different.

Moreover, in Embodiments 1 to 3 described above, the example in which the vias are not stacked across two or more dielectric layers among the four dielectric layers has been described; however, the vias may not be stacked across three or more dielectric layers among the four dielectric layers (for example, some of the vias may be stacked across two dielectric layers).

In Embodiments 4 to 6 described above, the example in which the number of rows of via group A and via group B is two has been described; however, the number of rows may be three or more. Also in this case, in order to suppress leakage of electromagnetic waves, it is desirable to dispose the vias included in each row so as not to form straight lines parallel to the X-axis illustrated in the various drawings.

Moreover, in Embodiments 4 to 6 described above, the number of rows of via group A and the number of rows of via group B may be the same or different. For example, the number of rows of via group A may be one, and the number of rows of via group B may be three.

Moreover, in Embodiments 4 to 6 described above, the example in which the number of vias included in each of the two rows of via group A (or via group B) is the same has been described; however, the number of vias included in each row may be different. Also in this case, in order to suppress leakage of electromagnetic waves, it is desirable to dispose the vias included in each row so as not to form straight lines parallel to the X-axis illustrated in the various drawings.

Moreover, in Embodiments 4 to 6 described above, the example in which the vias are not stacked across two or more dielectric layers among the four dielectric layers has been described; however, the vias may not be stacked across three or more dielectric layers among the four dielectric layers (for example, some of the vias may be stacked across two dielectric layers).

In Embodiments 7 to 9 described above, the example in which the vias are not stacked across three or more dielectric layers among the four dielectric layers has been described; however, the vias may not be stacked across two or more dielectric layers among the four dielectric layers.

Moreover, for example, in via group A and via group B constituting the conductor walls, any combination of the configuration of the conductor layer (via land) described in Embodiments 1, 4, and 7, the configuration of the conductor layer (linear) described in Embodiments 2, 5, and 8, and the configuration of the conductor layer (linear and stub) described in Embodiments 3, 6, and 9 may be employed. For example, the via land configuration and the linear configuration may be mixed, the via land configuration and the linear and stub configuration may be mixed, the linear configuration and the linear and stub configuration may be mixed, or the via land configuration, the linear configuration, and the linear and stub configuration may be mixed.

Moreover, the portion described as using a solid conductor may be provided with a slit formed by omitting a portion of the conductor, or a large number of slits may be disposed in a lattice shape.

Moreover, the length of the waveguide (transmission line) is any length, and the number of vias is not limited.

Note that when a waveguide is constituted using a conductor layer and vias, the waveguide may be affected by both a positional deviation of the vias and a pattern deviation of the conductor layer. Thus, when stubs are used in the conductor layer, the waveguide may be constituted without the vias. When the vias are omitted and the waveguide is constituted with the pattern of the conductor layer having the stubs, the positional deviation of the vias can be eliminated, and hence machining accuracy can be improved.

Summary of Embodiments

A waveguide according to an embodiment of the present disclosure includes three or more conductor layers that are stacked; two or more dielectric layers that are stacked, each being formed between two conductor layers adjacent to each other among the three or more conductor layers; and a first via group and a second via group each including one or more vias disposed in at least one dielectric layer of the two or more dielectric layers. The first via group and the second via group are arrayed in parallel. Among the vias included in the first via group and the second via group, the via disposed in at least one of the two or more dielectric layers differs in position on a plane of the dielectric layer from the via disposed in the remaining dielectric layer(s). With this configuration, since the vias are not fully stacked, it is possible to reduce the risk of breakage due to thermal expansion caused by full-stacking of the vias and to suppress a decrease in reliability and a deterioration in yield during waveguide manufacturing.

Although the embodiments have been described above with reference to the drawings, the present disclosure is not limited to these examples. Obviously, a person skilled in the art would arrive variations and modification examples within a scope described in claims. It is understood that these variations and modifications are within the technical scope of the present disclosure. Moreover, any combination of features of the above-mentioned embodiments may be made without departing from the spirit of the disclosure.

The disclosure content of the description, drawings and abstract included in the application of Japanese Patent Application No. 2022-007114, filed on Jan. 20, 2022 is incorporated herein by reference in its entirety.

INDUSTRIAL APPLICABILITY

One embodiment of the present disclosure is applicable to a waveguide that transmits a high-frequency signal.

REFERENCE SIGNS LIST

20 Post-wall waveguide
2-1-1 to 2-1-4 Dielectric layer
2-2-1 to 2-2-5 Conductor layer
**2-3-1-*k* to 2-3-4-*k*** Via
30 Post-wall waveguide
3-1-1 to 3-1-4 Dielectric layer
3-2-1 to 3-2-5 Conductor layer
**3-3-1-*k* to 3-3-4-*k*** Via
40 Post-wall waveguide
4-1-1 to 4-1-4 Dielectric layer
4-2-1 to 4-2-5 Conductor layer
**4-3-1-*k* to 4-3-4-*k*** Via
50 Post-wall waveguide
5-1-1 to 5-1-4 Dielectric layer
5-2-1 to 5-2-5 Conductor layer
**5-3-1-*k* to 5-3-4-*k*** Via
**5-4-1-*i* to 5-4-2-*i*** Stub
70 Post-wall waveguide
7-1-1 to 7-1-4 Dielectric layer
7-2-1 to 7-2-5 Conductor layer
**7-3-1-*k* to 7-3-4-*k*, 7-3-5-*k* to 7-3-8-*k*** Via
8-1-1 to 8-1-4 Dielectric layer
80 Post-wall waveguide
8-2-1 to 8-2-5 Conductor layer
**8-3-1-*k* to 8-3-4-*k*, 8-3-5-*k* to 8-3-8-*k*** Via
90 Post-wall waveguide
9-1-1 to 9-1-4 Dielectric layer
9-2-1 to 9-2-5 Conductor layer
**9-3-1-*k* to 9-3-4-*k*, 9-3-5-*k* to 9-3-8-*k*** Via
**9-4-1-*i* to 9-4-2-*i*** Stub
110 Post-wall waveguide
11-1-1 to 11-1-4 Dielectric layer
11-2-1 to 11-2-5 Conductor layer
**11-3-1-*k* to 11-3-3-*k*** Via
120 Post-wall waveguide
12-1-1 to 12-1-4 Dielectric layer
12-2-1 to 12-2-5 Conductor layer
**12-3-1-*k* to 12-3-3-*k*** Via
130 Post-wall waveguide
13-1-1 to 13-1-4 Dielectric layer
13-2-1 to 13-2-5 Conductor layer
**13-3-1-*k* to 13-3-3-*k*** Via
**13-4-1-*i* to 13-4-2-*i*** Stub
160 Post-wall waveguide
16-1-1 to 16-1-4 Dielectric layer
16-2-1 to 16-2-5 Conductor layer
**16-3-1-*k* to 16-3-3-*k*** Via

The invention claimed is:

1. A waveguide, comprising:
three or more conductor layers that are stacked;
two or more dielectric layers that are stacked, each being formed between adjacent two of the three or more conductor layers; and
a first via group and a second via group each including one or more vias disposed in at least one of the two or more dielectric layers, wherein:
the first via group and the second via group are arrayed in parallel to each other, and
among the vias included in the first via group and the second via group, a via disposed in at least one of the two or more dielectric layers differs in position on a plane of the dielectric layer from a via disposed in remaining one or more of the two or more dielectric layers.

2. The waveguide according to claim 1, wherein one of the first via group and the second via group includes one or more rows, each of the one or more rows including a plurality of vias, the plurality of vias being at least a portion of the one or more vias of the one of the first via group and the second via group.

3. The waveguide according to claim 1, wherein each of the first via group and the second via group is connected by a linear conductor in any one of inner layers among the three or more conductor layers.

4. The waveguide according to claim 3, further comprising a plurality of stubs disposed at the linear conductor along a longitudinal direction of the linear conductor.

5. A waveguide, comprising:
three or more conductor layers that are stacked;
two or more dielectric layers that are stacked, each being formed between adjacent two of the three or more conductor layers; and
a first via group and a second via group each including one or more vias disposed in at least one of the two or more dielectric layers, wherein:

the first via group and the second via group are arrayed in parallel to each other, and neither the first via group nor the second via group is disposed in at least one of the two or more dielectric layers.

6. The waveguide according to claim 5, wherein one of the first via group and the second via group includes one or more rows, each of the one or more rows including a plurality of vias, the plurality of vias being at least a portion of the one or more vias of the one of the first via group and the second via group.

7. The waveguide according to claim 5, wherein each of the first via group and the second via group is connected by a linear conductor in any one of inner layers among the three or more conductor layers.

8. The waveguide according to claim 7, further comprising a plurality of stubs disposed at the linear conductor along a longitudinal direction of the linear conductor.

* * * * *